United States Patent
Chen et al.

(10) Patent No.: US 11,539,975 B2
(45) Date of Patent: Dec. 27, 2022

(54) MOTION VECTOR PREDICTION METHOD BASED ON AFFINE MOTION MODEL AND DEVICE

(71) Applicant: Huawei Technologies Co., Ltd., Shenzhen (CN)

(72) Inventors: Huanbang Chen, Shenzhen (CN); Haitao Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/196,642

(22) Filed: Mar. 9, 2021

(65) Prior Publication Data
US 2021/0235105 A1 Jul. 29, 2021

Related U.S. Application Data

(63) Continuation of application No. PCT/CN2019/091364, filed on Jun. 14, 2019.

(30) Foreign Application Priority Data

Sep. 10, 2018 (CN) .......... 201811051662.6
Sep. 19, 2018 (CN) .......... 201811096702.9

(51) Int. Cl.
*H04N 19/513* (2014.01)
*H04N 19/176* (2014.01)
(Continued)

(52) U.S. Cl.
CPC ......... *H04N 19/513* (2014.11); *H04N 19/105* (2014.11); *H04N 19/149* (2014.11); *H04N 19/176* (2014.11)

(58) Field of Classification Search
CPC .. H04N 19/105; H04N 19/149; H04N 19/176; H04N 19/513; H04N 19/52
See application file for complete search history.

(56) References Cited

U.S. PATENT DOCUMENTS

2004/0151392 A1 8/2004 Miyakoshi et al.
2017/0332095 A1 11/2017 Zou et al.
(Continued)

FOREIGN PATENT DOCUMENTS

| CN | 103004198 A | 3/2013 |
|---|---|---|
| CN | 103299639 A | 9/2013 |

(Continued)

OTHER PUBLICATIONS

Zhou, "Non-CE4:A study on the affine merge mode," Joint Video Experts Team (JVET) of ITU-T SG 16 WP and ISO/IEC JTC1/SC 29/WG11, 11th Meeting: Ljubljana, SI, Document: JVET-K0052-V1, total 8 pages (Jul. 10-18, 2018). (Year: 2018).*

(Continued)

*Primary Examiner* — Jessica M Prince
(74) *Attorney, Agent, or Firm* — Leydig, Voit & Mayer, Ltd.

(57) ABSTRACT

A motion vector prediction method based on an affine motion model and a device are provided. The method includes: obtaining one spatial reference block of a to-be-processed picture block; determining a plurality of preset subblock locations of the spatial reference block; obtaining motion vectors corresponding to preset pixel locations of the to-be-processed picture block that are extrapolated from motion vectors corresponding to the preset subblock locations; and obtaining motion vectors corresponding to a plurality of subblock locations of the to-be-processed picture block that are interpolated from the motion vectors corresponding to the preset pixel locations. According to this application, prediction accuracy in coding can be improved, and coding efficiency can be improved.

25 Claims, 13 Drawing Sheets

(51) Int. Cl.
   *H04N 19/105*   (2014.01)
   *H04N 19/149*   (2014.01)

(56) References Cited

U.S. PATENT DOCUMENTS

| | | | |
|---|---|---|---|
| 2018/0098063 A1* | 4/2018 | Chen | H04N 19/176 |
| 2018/0192047 A1 | 7/2018 | Lv et al. | |
| 2018/0192069 A1* | 7/2018 | Chen | H04N 19/176 |

FOREIGN PATENT DOCUMENTS

| | | |
|---|---|---|
| CN | 106303543 A | 1/2017 |
| CN | 108432250 A | 8/2018 |
| WO | 2017130696 A1 | 8/2017 |
| WO | 2017156705 A1 | 9/2017 |
| WO | 2017157259 A1 | 9/2017 |
| WO | 2018061563 A1 | 4/2018 |

OTHER PUBLICATIONS

Hsiao et al., "CE2-related: Simplifications for inherited affine candidates," Joint Video Experts Team (JVET) of ITU-T SG 16 WP 3 and ISO/IEC JTC 1/SC 29/WG 11, 13th Meeting: Marrakech, MA, Document: JVET-M0168-v1, Total 8 pages (Jan. 9-18, 2019).
Huang et al., "CE2-related: Alignment of affine control-point motion vector and subblock motion vector," Joint Video Experts Team (JVET) of ITU-T SG 16 WP 3 and ISO/IEC JTC 1/SC 29/WG 11, 13th Meeting: Marrakech, MA, Document: JVET-M0110, Total 4 pages (Jan. 9-18, 2019).
ZHOU "Non-CE4: A study on the affine merge mode," Joint Video Experts Team (JVET) of ITU-T SG 16 WP 3 and ISO/IEC JTC 1/SC 29/WG 11, 11th Meeting: Ljubljana, SI, Document: JVET-K0052-v1, Total 8 pages (Jul. 10-18, 2018).
Zhou et al., "A Study on the Affine Merge Mode (JVET-K0052)," JVET Meeting: Jul. 11, 2018-Jul. 18, 2018 Ljubljana; (The Joint Video Exploration Team of ISO/IEC JTC1/SC29/WG11 and ITU-T SG.16) No. JVET-K0052, Total 13 pages.
Chen et al., "Description of SDR, HDR and 360° video coding technology proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting: San Diego, US, Document: JVET-J0025 v2, Total 135 pages (Apr. 10-20, 2018).
Chen et al., "Algorithm Description of Joint Exploration Test Model 7 (JEM7)," Joint Video Exploration (JVET) of Itu-TSG 16 WP 3 and ISO/IEC JTC 1/SC 29/WG 11, 7th Meeting: Torino, Document: JVET-G1001-v1, Total 48 pages (Jul. 13-21, 2017).
"Line Transmission of Non-Telephone Signals, Video Codec for Audiovisual Services AT p x 64 kbits," ITU-T Recommendation H.261, ITU-T Telecommunication Standardization Sector of ITU, Total 29 pages, International Telecommunication Union, Geneva, Switzerland (Mar. 1993).
"Series H: Audiovisual and Multimedia Systems, Infrastructure of audiovisual services—Coding of moving video. Information technology—Generic coding of moving pictures and associated audio information: Video: Frame packing arrangement signalling for 3D content," ITU-T Telecommunication Standardization Sector of ITU, H.262 Amendment 4, Total 238 pages, International Telecommunication Union, Geneva, Switzerland (Feb. 2012).
"Series H: Audiovisual and Multimedia Systems, Infrastructure of audiovisual services—Coding of moving Video. Video coding for low bit rate communication," ITU-T Recommendation H.263, ITU-T Telecommunication Standardization Sector of ITU, Total 226 pages, International Telecommunication Union, Geneva, Switzerland (Jan. 2005).
"Series H: Audiovisual and Multimedia Systems, Infrastructure of audiovisual services—Coding of moving video. Advanced video coding for generic audiovisual services," Recommendation ITU-T H.264, ITU-T Telecommunication Standardization Sector of ITU, Total 812 pages, International Telecommunication Union, Geneva, Switzerland (Apr. 2017).
"Series H: Audiovisual and Multimedia Systems, Infrastructure of audiovisual services—Coding of moving video. High efficiency video coding," Recommendation ITU-T H.265, ITU-T Telecommunication Standardization Sector of ITU, Total 692 pages, International Telecommunication Union, Geneva, Switzerland (Feb. 2018).
CN201811096702.9, Office Action/Search Report, dated Jun. 8, 2022.
Yang et al., "Description of CE4: Inter prediction and motion vector coding," Joint Video Experts Team (JVET) of ITU-T SG 16 WP 3 and ISO/IEC JTC 1/SC 29/WG 11, 10th Meeting: San Diego, US, Document: JVET-J1024r2, Total 46 pages (Apr. 10-20, 2018).
Yang et al., "Description of CE4: Inter prediction and motion vector coding," Joint Video Experts Team (JVET) of ITU-T SG 16 WP 3 and ISO/IEC JTC 1/SC 29/WG 11, 10th Meeting: San Diego, US, Document: JVET-J1024, pp. 1-44 (Apr. 10-20, 2018).
Zhou et al., "Non-CE4: A study on the affine merge mode," Joint Video Experts Team (JVET) of ITU-T SG 16 WP 3 and ISO/IEC JTC 1/SC 29/WG 11, 11th Meeting: Ljubljana, SI, Document: JVET-K0052-v2, pp. 1-10 (Jul. 10-18, 2018).
CN201811096702.9, Notice of Allowance/Search Report, dated Nov. 2, 2022.

\* cited by examiner

MOTION VECTOR PREDICTION METHOD BASED ON AFFINE MOTION MODEL AND DEVICE

CROSS-REFERENCE TO RELATED APPLICATIONS

This application is a continuation of International Application No. PCT/CN2019/091364, filed on Jun. 14, 2019, which claims priority to Chinese Patent Application No. 201811096702.9, filed on Sep. 19, 2018, and Chinese Patent Application No. 201811051662.6, filed on Sep. 10, 2018. All of the aforementioned patent applications are hereby incorporated by reference in their entireties

TECHNICAL FIELD

Embodiments of the present invention relate to the video coding field, and in particular, to a motion vector prediction method based on an affine motion model and a device.

BACKGROUND

Video coding (video encoding and decoding) is applied to a wide range of digital video applications, for example, broadcast digital TV, video transmission over the internet and mobile networks, real-time conversational applications such as video chatting and video conferencing, DVD and Blu-ray discs, and security applications of video content collection and editing systems and camcorders.

With development of a block-based hybrid video coding method in the H.261 standard in 1990, new video coding technologies and tools have been developed and form a basis for new video coding standards. Other video coding standards include MPEG-1 video, MPEG-2 video, ITU-T H.262/MPEG-2, ITU-T H.263, ITU-T H.264/MPEG-4 Part 10: advanced video coding (AVC), ITU-T H.265/high efficiency video coding (HEVC), and extensions, for example, scalability and/or 3D (three-dimensional) extensions of these standards. As video creation and use become increasingly widespread, video traffic has become the biggest burden for communications networks and data storage. Therefore, compared to that of previous standards, one of the goals of most video coding standards is to reduce a bit rate without sacrificing picture quality. Although the latest high efficiency video coding (HEVC) can achieve a video compression rate about twice that in AVC without sacrificing the picture quality, there is still an urgent need for a new technology to further improve video compression in comparison with HEVC.

SUMMARY

Embodiments of the present invention provide a motion vector prediction method based on an affine motion model and a device, to improve prediction accuracy in video coding, and improve coding efficiency.

According to a first aspect, the present invention provides a motion vector prediction method based on an affine motion model. The method is described from a perspective of an encoder side or a decoder side, and includes: obtaining one spatial reference block of a to-be-processed picture block, where the to-be-processed picture block is obtained by partitioning a video picture, and the spatial reference block is a decoded block that is spatially neighboring to the to-be-processed picture block. On the encoder side, the to-be-processed picture block is a current affine encoding block (affine coding block), and the spatial reference block is a neighboring affine encoding block (affine coding block). On the decoder side, the to-be-processed picture block is a current affine decoding block (affine coding block), and the spatial reference block is a neighboring afime decoding block (affine coding block). For ease of description, the to-be-processed picture block may be generally referred to as a current block, and the spatial reference block may be generally referred to as a neighboring block. Then, preset subblock locations of two or more subblocks of the spatial reference block are determined. Each subblock has a corresponding preset subblock location, and the preset subblock location is consistent with a location used to calculate a motion vector of the subblock during coding. To be specific, for a subblock of the neighboring affine coding block, a motion vector of a pixel at a preset location in the subblock is used to represent motion vectors of all pixels in the subblock. Subsequently, motion vectors corresponding to preset pixel locations of the to-be-processed picture block are extrapolated from motion vectors corresponding to the preset subblock locations of the two or more subblocks of the spatial reference block, where the preset pixel locations are control points of the to-be-processed picture block. Then, an affine motion model of the current block is formed based on the motion vectors corresponding to the preset pixel locations of the current block, and motion vectors corresponding to a plurality of subblock locations of the to-be-processed picture block are interpolated.

The interpolated motion vectors corresponding to the plurality of subblock locations are separately used to predict a plurality of subblocks.

It can be learned that, according to the embodiments of the present invention, motion vectors of control points of the current block are derived by using motion vectors of at least two subblocks of the neighboring block, instead of using motion vectors of control points of the neighboring block, and then motion vectors of subblocks of the current block are derived based on the motion vectors of the control points. The motion vectors of the control points of the current block do not need to be stored subsequently. To be specific, the motion vectors of the control points of the current block are used only to derive the motion vectors of the subblocks of the current coding block, but not used for motion vector prediction of the neighboring block. Therefore, in the solutions of the present invention, only the motion vectors of the subblocks need to be stored, and motion compensation is performed by using the motion vectors of the subblocks. This resolves a motion vector storage problem, and avoids a case in which a motion vector inconsistent with that used for another subblock is used to perform motion compensation on a subblock in which a control point is located, so that prediction accuracy is improved.

Based on the first aspect, in a possible implementation, two subblocks in the spatial reference block may be determined, and a distance between two preset subblock locations corresponding to the two subblocks is S, where S is 2 raised to the power of K, and K is a nonnegative integer. This helps implement subsequent motion vector derivation in a shift manner, so that implementation complexity is reduced.

Based on the first aspect, in a possible implementation, the preset subblock location may be a location of a top-left pixel in the subblock, a location of a geometric center of the subblock, a location of a pixel closest to a geometric center in the subblock, a location of a top-right pixel in the subblock, or the like.

Based on the first aspect, in a possible implementation, availability of one or more candidate reference blocks that are of the current block and that are at preset spatial locations may be determined in a preset order, and then the first available candidate reference block in the preset order is obtained and used as the spatial reference block. The candidate reference blocks at the preset spatial locations include a directly top neighboring picture block, a directly left neighboring picture block, a top-right neighboring picture block, a bottom-left neighboring picture block, and a top-left neighboring picture block of the to-be-processed picture block. For example, the availability of the candidate reference blocks is successively checked in the following order: the directly left neighboring picture block→the directly top neighboring picture block→the top-right neighboring picture block→the bottom-left neighboring picture block→the top-left neighboring picture block, until the first available candidate reference block is determined.

Specifically, whether the candidate reference block is available may be determined according to the following method: When the candidate reference block and the to-be-processed picture block are in a same picture region, and the candidate reference block is coded based on the affine motion model, the candidate reference block is determined to be available.

Based on the first aspect, in a possible implementation, if the affine motion model of the current block is a 4-parameter affine motion model, the plurality of preset subblock locations of the spatial reference block include a first preset location (x4+M/2, y4+N/2) and a second preset location (x4+M/2+P, y4+N/2), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, K is a nonnegative integer, K is less than U, and U is the width of the spatial reference block. This can help implement subsequent motion vector derivation in a shift manner, so that implementation complexity is reduced.

Based on the first aspect, in a possible implementation, if the affine motion model of the current block is a 4-parameter affine motion model, the plurality of preset subblock locations include a first preset location (x4+M/2, y4+N/2) and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, Q is 2 raised to the power of R, R is a nonnegative integer, Q is less than V, and V is the height of the spatial reference block. This helps implement subsequent motion vector derivation in a shift manner, so that implementation complexity is reduced.

In an example, if the affine motion model of the current block is a 6-parameter affine motion model, the plurality of preset subblock locations include a first preset location (x4+M/2, y4+N/2), a second preset location (x4+M/2+P, y4+N/2), and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, Q is 2 raised to the power of R, K and R are nonnegative integers, P is less than U, Q is less than V, U is the width of the spatial reference block, and V is the height of the spatial reference block. This helps implement subsequent motion vector derivation in a shift manner, so that implementation complexity is reduced.

In another example, when a top boundary of the current block coincides with a top boundary of a coding tree unit (CTU) including the current block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the current block.

Based on the first aspect, in a possible implementation, when a left boundary of the current block coincides with a left boundary of a coding tree unit (CTU) including the current block, and the spatial reference block is directly on the left of the current block, on the top-left of the current block, or on the bottom-left of the current block, at least two of subblocks corresponding to the plurality of preset subblock locations are adjacent to the left boundary of the current block.

Based on the first aspect, in a possible implementation, a candidate control point motion vector of the current block is determined by using an improved inherited control point motion vector prediction method. To be specific, motion vectors of preset pixel locations of the current block are extrapolated from motion vectors of at least two subblocks of the neighboring affine coding block (or the neighboring affine decoding block). The preset pixel locations are control points of the current block. For example, if the affine motion model of the current block is the 4-parameter affine motion model, the control points of the current block may be a top-left pixel and a top-right pixel in the current block. If the affine motion model of the current block is the 6-parameter affine motion model, the control points of the current block may be a top-left pixel, a top-right pixel, and a bottom-left pixel in the current block.

Based on the first aspect, in a possible implementation, if the affine motion model of the current block is the 4-parameter affine motion model, the control points of the current block may include at least two of a top-left pixel location of the to-be-processed picture block, a top-right pixel location of the to-be-processed picture block, and a bottom-left pixel location of the to-be-processed picture block, and obtaining the motion vectors corresponding to the preset pixel locations of the to-be-processed picture block that are extrapolated from the motion vectors corresponding to the preset subblock locations includes: obtaining, through calculation according to the following formulas, the motion vectors corresponding to the preset pixel locations of the to-be-processed picture block:

$$\begin{cases} vx_0 = vx_4 + \frac{(vx_5 - vx_4)}{P} \times (x_0 - x_4 - M/2) - \\ \quad \frac{(vy_5 - vy_4)}{P} \times (y_0 - y_4 - N/2) \\ vy_0 = vy_4 + \frac{(vy_5 - vy_4)}{P} \times (x_0 - x_4 - M/2) + \\ \quad \frac{(vx_5 - vx_4)}{P} \times (y_0 - y_4 - N/2) \end{cases};$$

$$\begin{cases} vx_1 = vx_4 + \frac{(vx_5 - vx_4)}{P} \times (x_1 - x_4 - M/2) - \\ \quad \frac{(vy_5 - vy_4)}{P} \times (y_1 - y_4 - N/2) \\ vy_1 = vy_4 + \frac{(vy_5 - vy_4)}{P} \times (x_1 - x_4 - M/2) + \\ \quad \frac{(vx_5 - vx_4)}{P} \times (y_1 - y_4 - N/2) \end{cases}; \text{ and}$$

-continued $$\begin{cases} vx_2 = vx_4 + \dfrac{(vx_5 - vx_4)}{P} \times (x_2 - x_4 - M/2) - \\ \qquad \dfrac{(vy_5 - vy_4)}{P} \times (y_2 - y_4 - N/2) \\ vy_2 = vy_4 + \dfrac{(vy_5 - vy_4)}{P} \times (x_2 - x_4 - M/2) + \\ \qquad \dfrac{(vx_5 - vx_4)}{P} \times (y_2 - y_4 - N/2) \end{cases}.$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

Based on the first aspect, in a possible implementation, if the affine motion model of the current block is the 6-parameter affine motion model, the control points of the current block may include a top-left pixel location of the to-be-processed picture block, a top-right pixel location of the to-be-processed picture block, and a bottom-left pixel location of the to-be-processed picture block, and obtaining the motion vectors corresponding to the preset pixel locations of the to-be-processed picture block that are extrapolated from the motion vectors corresponding to the preset subblock locations includes: obtaining, through calculation according to the following formulas, the motion vectors corresponding to the preset pixel locations of the to-be-processed picture block:

$$\begin{cases} vx_0 = vx_4 + \dfrac{(vx_5 - vx_4)}{P} \times (x_0 - x_4 - M/2) + \\ \qquad \dfrac{(vx_6 - vx_4)}{Q} \times (y_0 - y_4 - N/2) \\ vy_0 = vy_4 + \dfrac{(vy_5 - vy_4)}{P} \times (x_0 - x_4 - M/2) + \\ \qquad \dfrac{(vy_6 - vy_4)}{Q} \times (y_0 - y_4 - N/2) \end{cases};$$

$$\begin{cases} vx_1 = vx_4 + \dfrac{(vx_5 - vx_4)}{P} \times (x_1 - x_4 - M/2) + \\ \qquad \dfrac{(vx_6 - vx_4)}{Q} \times (y_1 - y_4 - N/2) \\ vy_1 = vy_4 + \dfrac{(vy_5 - vy_4)}{P} \times (x_1 - x_4 - M/2) + \\ \qquad \dfrac{(vy_6 - vy_4)}{Q} \times (y_1 - y_4 - N/2) \end{cases}; \text{and}$$

$$\begin{cases} vx_2 = vx_4 + \dfrac{(vx_5 - vx_4)}{P} \times (x_2 - x_4 - M/2) + \\ \qquad \dfrac{(vx_6 - vx_4)}{Q} \times (y_2 - y_4 - N/2) \\ vy_2 = vy_4 + \dfrac{(vy_5 - vy_4)}{P} \times (x_2 - x_4 - M/2) + \\ \qquad \dfrac{(vy_6 - vy_4)}{Q} \times (y_2 - y_4 - N/2) \end{cases}.$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $vx_6$ is a horizontal component of a motion vector corresponding to the third preset location, $vy_6$ is a vertical component of the motion vector corresponding to the third preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

Based on the first aspect, in a possible implementation, for each subblock of the current block (one subblock may be equivalent to one motion compensation unit, and the width and the height of the subblock are less than the width and the height of the current block), motion information of a pixel at a preset location in the motion compensation unit may be used to represent motion information of all pixels in the motion compensation unit. It is assumed that a size of the motion compensation unit is M×N, the pixel at the preset location may be a center pixel (M/2, N/2), a top-left pixel (0, 0), a top-right pixel (M×1, 0), or a pixel at another location in the motion compensation unit. In this case, a motion vector of each subblock in the current block may be obtained based on control point motion information of the current block and a currently used affine motion model, and subsequently, motion compensation may be performed based on the motion vector of the subblock to obtain a predicted pixel value of the subblock.

Based on the first aspect, in a possible implementation, if the affine motion model of the current block is the 4-parameter affine motion model, the preset pixel locations include the top-left pixel location of the to-be-processed picture block and the top-right pixel location of the to-be-processed picture block, and obtaining the motion vectors corresponding to the plurality of subblock locations of the to-be-processed picture block that are interpolated from the motion vectors corresponding to the preset pixel locations includes: obtaining, through calculation according to the following formula, the motion vectors corresponding to the plurality of subblock locations of the to-be-processed picture block:

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases}.$$

Herein, W is the width of the to-be-processed picture block, vx is a horizontal component of a motion vector corresponding to (x, y) in the plurality of subblock locations, and vy is a vertical component of the motion vector corresponding to (x, y) in the plurality of subblock locations.

Based on the first aspect, in a possible implementation, if the affine motion model of the current block is the 6-parameter affine motion model, obtaining the motion vectors corresponding to the plurality of subblock locations of the to-be-processed picture block that are interpolated from the motion vectors corresponding to the preset pixel locations includes: obtaining, through calculation according to the following formula, the motion vectors corresponding to the plurality of subblock locations of the to-be-processed picture block:

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases}.$$

Herein, W is the width of the to-be-processed picture block, H is the height of the to-be-processed picture block, vx is a horizontal component of a motion vector corresponding to (x, y) in the plurality of subblock locations, and vy is a vertical component of the motion vector corresponding to (x, y) in the plurality of subblock locations.

According to a second aspect, an embodiment of the present invention provides a device. The device includes: a reference block obtaining module, configured to obtain one spatial reference block of a to-be-processed picture block in video data; a subblock determining module, configured to determine a plurality of preset subblock locations of the spatial reference block; a first calculation module, configured to obtain motion vectors corresponding to preset pixel locations of the to-be-processed picture block that are extrapolated from motion vectors corresponding to the preset subblock locations; and a second calculation module, configured to obtain motion vectors corresponding to a plurality of subblock locations of the to-be-processed picture block that are interpolated from the motion vectors corresponding to the preset pixel locations.

In a specific embodiment, the modules of the device may be configured to implement the method described in the first aspect.

According to a third aspect, an embodiment of the present invention provides a video decoding device. The device includes:

a memory, configured to store video data in a form of a bitstream; and a decoder, configured to: obtain one spatial reference block of a to-be-processed picture block in the video data; determine a plurality of preset subblock locations of the spatial reference block; obtain motion vectors corresponding to preset pixel locations of the to-be-processed picture block that are extrapolated from motion vectors corresponding to the preset subblock locations; and obtain motion vectors corresponding to a plurality of subblock locations of the to-be-processed picture block that are interpolated from the motion vectors corresponding to the preset pixel locations, where the interpolated motion vectors corresponding to the plurality of subblock locations are separately used to predict a plurality of subblocks.

Based on the third aspect, in a possible embodiment, the decoder is specifically configured to: determine, in a preset order, availability of one or more candidate reference blocks that are of the to-be-processed picture block and that are at preset spatial locations; and obtain the first available candidate reference block in the preset order, where the first available candidate reference block is used as the spatial reference block.

Based on the third aspect, in a possible embodiment, when the candidate reference block and the to-be-processed picture block are in a same picture region, and the candidate reference block is coded based on an affine motion model, the candidate reference block is determined to be available.

Based on the third aspect, in a possible embodiment, the candidate reference blocks at the preset spatial locations include a directly top neighboring picture block, a directly left neighboring picture block, a top-right neighboring picture block, a bottom-left neighboring picture block, and a top-left neighboring picture block of the to-be-processed picture block.

The decoder is specifically configured to successively check the availability of the candidate reference blocks in the following order: the directly left neighboring picture block→the directly top neighboring picture block→the top-right neighboring picture block→the bottom-left neighboring picture block→the top-left neighboring picture block, until the first available candidate reference block is determined.

The subblock location of the spatial reference block or the to-be-processed picture block is a location of a top-left pixel in a subblock; a location of a geometric center of a subblock; or a location of a pixel closest to a geometric center in a subblock.

Based on the third aspect, in a possible embodiment, a distance between two of the plurality of preset subblock locations is S, where S is 2 raised to the power of K, and K is a nonnegative integer.

Based on the third aspect, in a possible embodiment, the affine motion model is a 4-parameter affine motion model, and the plurality of preset subblock locations include a first preset location (x4+M/2, y4+N/2) and a second preset location (x4+M/2+P, y4+N/2), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, K is a nonnegative integer, K is less than U, and U is the width of the spatial reference block.

Based on the third aspect, in a possible embodiment, the affine motion model is a 4-parameter affine motion model, and the plurality of preset subblock locations include a first preset location (x4+M/2, y4+N/2) and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, Q is 2 raised to the power of R, R is a nonnegative integer, Q is less than V, and V is the height of the spatial reference block.

Based on the third aspect, in a possible embodiment, the affine motion model is the 4-parameter affine motion model, the preset pixel locations include at least two of a top-left pixel location of the to-be-processed picture block, a top-right pixel location of the to-be-processed picture block, and a bottom-left pixel location of the to-be-processed picture block, and the decoder is specifically configured to obtain, through calculation according to the following formulas, the motion vectors corresponding to the preset pixel locations of the to-be-processed picture block:

$$\begin{cases} vx_0 = vx_4 + \frac{(vx_5 - vx_4)}{P} \times (x_0 - x_4 - M/2) - \\ \quad \frac{(vy_5 - vy_4)}{P} \times (y_0 - y_4 - N/2) \\ vy_0 = vy_4 \frac{(vy_5 - vy_4)}{P} \times (x_0 - x_4 - M/2) + \\ \quad \frac{(vx_5 - vx_4)}{P} \times (y_0 - y_4 - N/2) \end{cases} ;$$

$$\begin{cases} vx_1 = vx_4 + \frac{(vx_5 - vx_4)}{P} \times (x_1 - x_4 - M/2) - \\ \quad \frac{(vy_5 - vy_4)}{P} \times (y_1 - y_4 - N/2) \\ vy_1 = vy_4 \frac{(vy_5 - vy_4)}{P} \times (x_1 - x_4 - M/2) + \\ \quad \frac{(vx_5 - vx_4)}{P} \times (y_1 - y_4 - N/2) \end{cases} ; \text{and}$$

$$\begin{cases} vx_2 = vx_4 + \frac{(vx_5 - vx_4)}{P} \times (x_2 - x_4 - M/2) - \\ \quad \frac{(vy_5 - vy_4)}{P} \times (y_2 - y_4 - N/2) \\ vy_2 = vy_4 \frac{(vy_5 - vy_4)}{P} \times (x_2 - x_4 - M/2) + \\ \quad \frac{(vx_5 - vx_4)}{P} \times (y_2 - y_4 - N/2) \end{cases} .$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

Based on the third aspect, in a possible embodiment, the affine motion model is the 4-parameter affine motion model, the preset pixel locations include the top-left pixel location of the to-be-processed picture block and the top-right pixel location of the to-be-processed picture block, and the decoder is specifically configured to obtain, through calculation according to the following formula, the motion vectors corresponding to the plurality of subblock locations of the to-be-processed picture block:

$$\begin{cases} vx = \frac{vx_1 - vx_0}{W} x - \frac{vy_1 - vy_0}{W} y + vx_0 \\ vy = \frac{vy_1 - vy_0}{W} x + \frac{vx_1 - vx_0}{W} y + vy_0 \end{cases} .$$

Herein, W is the width of the to-be-processed picture block, vx is a horizontal component of a motion vector corresponding to (x, y) in the plurality of subblock locations, and vy is a vertical component of the motion vector corresponding to (x, y) in the plurality of subblock locations.

Based on the third aspect, in a possible embodiment, the affine motion model is a 6-parameter affine motion model, and the plurality of preset subblock locations include a first preset location (x4+M/2, y4+N/2), a second preset location (x4+M/2+P, y4+N/2), and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, Q is 2 raised to the power of R, K and R are nonnegative integers, P is less than U, Q is less than V, U is the width of the spatial reference block, and V is the height of the spatial reference block.

Based on the third aspect, in a possible embodiment, the affine motion model is the 6-parameter affine motion model, the preset pixel locations include a top-left pixel location of the to-be-processed picture block, a top-right pixel location of the to-be-processed picture block, and a bottom-left pixel location of the to-be-processed picture block, and the decoder is specifically configured to obtain, through calculation according to the following formulas, the motion vectors corresponding to the reset pixel locations of the to-be-processed picture block:

$$\begin{cases} vx_0 = vx_4 + \dfrac{(vx_5 - vx_4)}{P} \times (x_0 - x_4 - M/2) + \\ \qquad \dfrac{(vx_6 - vx_4)}{Q} \times (y_0 - y_4 - N/2) \\ vy_0 = vy_4 \dfrac{(vy_5 - vy_4)}{P} \times (x_0 - x_4 - M/2) + \\ \qquad \dfrac{(vy_6 - vy_4)}{Q} \times (y_0 - y_4 - N/2) \end{cases};$$

$$\begin{cases} vx_1 = vx_4 + \dfrac{(vx_5 - vx_4)}{P} \times (x_1 - x_4 - M/2) + \\ \qquad \dfrac{(vx_6 - vx_4)}{Q} \times (y_1 - y_4 - N/2) \\ vy_1 = vy_4 \dfrac{(vy_5 - vy_4)}{P} \times (x_1 - x_4 - M/2) + \\ \qquad \dfrac{(vy_6 - vy_4)}{Q} \times (y_1 - y_4 - N/2) \end{cases}; \text{and}$$

$$\begin{cases} vx_2 = vx_4 + \dfrac{(vx_5 - vx_4)}{P} \times (x_2 - x_4 - M/2) + \\ \qquad \dfrac{(vx_6 - vx_4)}{Q} \times (y_2 - y_4 - N/2) \\ vy_2 = vy_4 + \dfrac{(vy_5 - vy_4)}{P} \times (x_2 - x_4 - M/2) + \\ \qquad \dfrac{(vy_6 - vy_4)}{Q} \times (y_2 - y_4 - N/2) \end{cases}$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $vx_6$ is a horizontal component of a motion vector corresponding to the third preset location, $vy_6$ is a vertical component of the motion vector corresponding to the third preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

Based on the third aspect, in a possible embodiment, the affine motion model is the 6-parameter affine motion model, and the decoder is specifically configured to obtain, through calculation according to the following formula, the motion vectors corresponding to the plurality of subblock locations of the to-be-processed picture block:

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases}.$$

Herein, W is the width of the to-be-processed picture block, H is the height of the to-be-processed picture block, vx is a horizontal component of a motion vector corresponding to (x, y) in the plurality of subblock locations, and vy is a vertical component of the motion vector corresponding to (x, y) in the plurality of subblock locations.

Based on the third aspect, in a possible embodiment, when a top boundary of the to-be-processed picture block coincides with a top boundary of a coding tree unit CTU including the to-be-processed picture block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the to-be-processed picture block.

Based on the third aspect, in a possible embodiment, when a left boundary of the to-be-processed picture block coincides with a left boundary of a coding tree unit CTU including the to-be-processed picture block, and the spatial reference block is directly on the left of the to-be-processed picture block, on the top-left of the to-be-processed picture block, or on the bottom-left of the to-be-processed picture block, at least two of subblocks corresponding to the plurality of preset subblock locations are adjacent to the left boundary of the to-be-processed picture block.

The method described in the first aspect of the present invention may be performed by the device according to the third aspect of the present invention. Other features and implementations of the method according to the first aspect of the present invention directly depend on functionalities and different implementations of the device according to the third aspect of the present invention.

According to a fourth aspect, an embodiment of the present invention provides a video encoding device. The device includes:

a memory, configured to store video data in a form of a bitstream; and an encoder, configured to: obtain one spatial reference block of a to-be-processed picture block in the video data; determine a plurality of preset subblock locations of the spatial reference block; obtain motion vectors corresponding to preset pixel locations of the to-be-processed picture block that are extrapolated from motion vectors corresponding to the preset subblock locations; and obtain motion vectors corresponding to a plurality of subblock locations of the to-be-processed picture block that are interpolated from the motion vectors corresponding to the preset pixel locations, where the interpolated motion vectors corresponding to the plurality of subblock locations are separately used to predict a plurality of subblocks.

For specific function implementation of the encoder, refer to the function description of the decoder described in the third aspect. Details are not described herein again.

The method according to the first aspect of the present invention may be performed by the device described in the fourth aspect of the present invention. Other features and implementations of the method according to the first aspect of the present invention directly depend on functionalities and different implementations of the device according to the fourth aspect of the present invention.

According to a fifth aspect, the present invention relates to a video stream decoding apparatus, including a processor and a memory. The memory stores an instruction, and the instruction enables the processor to perform the method according to the first aspect.

According to a sixth aspect, an embodiment of the present invention provides a video stream decoding apparatus, including a processor and a memory. The memory stores an instruction, and the instruction enables the processor to perform the method according to the first aspect.

According to a seventh aspect, an embodiment of the present invention provides a video stream encoding apparatus, including a processor and a memory. The memory stores an instruction, and the instruction enables the processor to perform the method according to the first aspect.

According to an eighth aspect, an embodiment of the present invention provides a computer-readable storage medium. The computer-readable storage medium stores an instruction, and when the instruction is executed, one or more processors are enabled to encode video data. The instruction enables the one or more processors to perform the method described in any possible embodiment of the first aspect.

According to a ninth aspect, an embodiment of the present invention provides a computer program including program code. When the program code is run on a computer, the method described in any possible embodiment of the first aspect is performed.

It can be learned that the improved inherited control point motion vector prediction method is used in the embodiments of the present invention. In the improved inherited control point motion vector prediction method, motion vectors of control points of the current block are derived by using motion vectors of at least two subblocks of the neighboring block, instead of using motion vectors of control points of the neighboring block, then motion vectors of subblocks of the current block are derived based on the motion vectors of the control points, and prediction for the current block is implemented through motion compensation. The motion vectors of the control points of the current block do not need to be stored subsequently. To be specific, the motion vectors of the control points of the current block are used only to derive the motion vectors of the subblocks of the current coding block, but not used for motion vector prediction of the neighboring block. Therefore, in the solutions of the present invention, only the motion vectors of the subblocks need to be stored, and motion compensation is performed by using the motion vectors of the subblocks. This resolves a motion vector storage problem, and avoids a case in which a motion vector inconsistent with that used for another subblock is used to perform motion compensation on a subblock in which a control point is located, so that prediction accuracy is improved.

BRIEF DESCRIPTION OF DRAWINGS

To describe the technical solutions in the embodiments of the present invention more clearly, the following describes the accompanying drawings for describing the embodiments of the present invention.

DESCRIPTION OF EMBODIMENTS

Figure 1A:
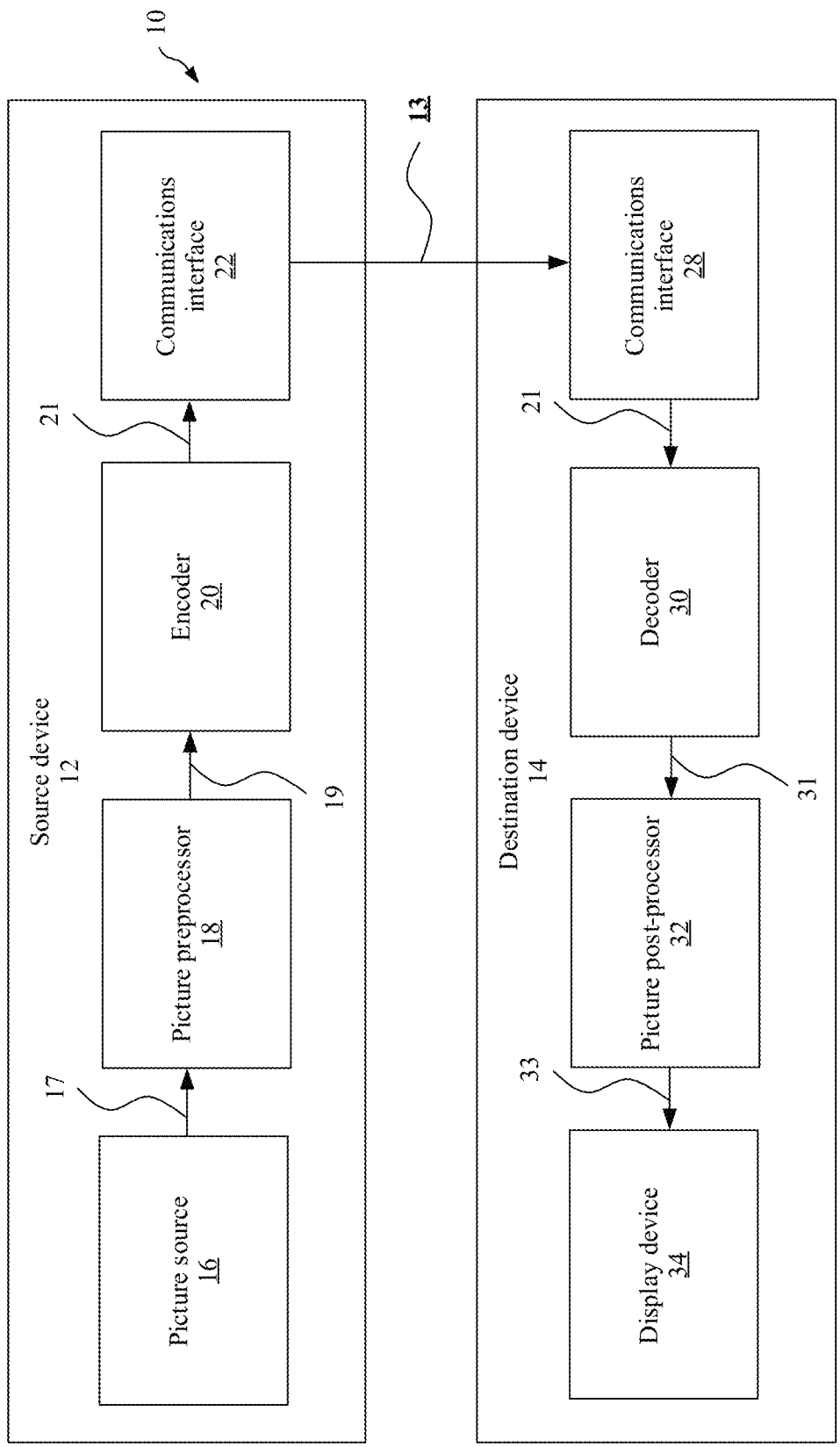
FIG. 1A is a block diagram of an example of a video encoding and decoding system 10 for implementing an embodiment of the present invention.

The following describes the embodiments of the present invention with reference to the accompanying drawings in the embodiments of the present invention. In the following description, reference is made to the accompanying drawings that form a part of this disclosure and show, by way of illustration, specific aspects of the embodiments of the present invention or specific aspects in which the embodiments of the present invention may be used. It should be understood that the embodiments of the present invention may be used in other aspects, and may include structural or logical changes not depicted in the accompanying drawings. Therefore, the following detailed description shall not be understood in a limiting sense, and the scope of the present invention is defined by the appended claims. For example, it should be understood that disclosed content in combination with a described method may also hold true for a corresponding device or system configured to perform the method and vice versa. For example, if one or more specific method steps are described, a corresponding device may include one or more units such as function units, to perform the described one or more method steps (for example, one unit performing the one or more steps, or a plurality of units each performing one or more of the plurality of steps), even if such one or more units are not explicitly described or illustrated in the accompanying drawings. In addition, for example, if a specific apparatus is described based on one or more units such as function units, a corresponding method may include one step used to perform functionality of the one or more units (for example, one step used to perform the functionality of the one or more units, or a plurality of steps each used to perform functionality of one or more of a plurality of units), even if such one or more steps are not explicitly described or illustrated in the accompanying drawings. Further, it should be understood that features of the various example embodiments and/or aspects described in this specification may be combined with each other, unless specifically noted otherwise.

The technical solutions in the embodiments of the present invention may not only be applied to existing video coding standards (for example, standards such as H.264 and HEVC), but also be applied to future video coding standards (for example, the H.266 standard). Terms used in the embodiments of the present invention are only used to explain specific embodiments of the present invention, but are not intended to limit the present invention. The following first briefly describes some concepts that may be used in the embodiments of the present invention.

Video coding usually refers to processing a sequence of pictures that constitute a video or a video sequence. In the video coding field, the terms "picture", "frame", and "image" may be used as synonyms. Video coding in this specification refers to video encoding or video decoding. Video encoding is performed on a source side, and usually includes processing (for example, through compression) an original video picture to reduce an amount of data for representing the video picture, for more efficient storage and/or transmission. Video decoding is performed on a destination side, and usually includes inverse processing relative to an encoder to reconstruct the video picture. "Coding" of a video picture in the embodiments should be understood as "encoding" or "decoding" of a video sequence. A combination of an encoding part and a decoding part is also referred to as coding (encoding and decoding).

A video sequence includes a series of pictures, a picture is further partitioned into slices, and a slice is further partitioned into blocks. Video coding is performed by block. In some new video coding standards, the concept "block" is further extended. For example, a macroblock (MB) is introduced in the H.264 standard. The macroblock may further be partitioned into a plurality of prediction blocks that can be used for predictive coding (partition). In the high efficiency video coding (HEVC) standard, basic concepts such as "coding unit" (CU), "prediction unit" (PU), and "transform unit" (TU) are used. A plurality of block units are obtained through function division, and are described by using a new tree-based structure. For example, a CU may be partitioned into smaller CUs based on a quadtree, and the smaller CU may further be partitioned, to generate a quadtree structure. The CU is a basic unit for partitioning and encoding a coded picture. A PU and a TU also have similar tree structures. The PU may correspond to a prediction block, and is a basic unit for predictive coding. The CU is further partitioned into a plurality of PUs in a partitioning mode. The TU may correspond to a transform block, and is a basic unit for transforming a prediction residual. However, in essence, all of the CU, the PU, and the TU are conceptually blocks (or picture blocks).

For example, in HEVC, a CTU is partitioned into a plurality of CUs by using a quadtree structure represented as a coding tree. A decision on whether to encode a picture region through inter (temporal) or intra (spatial) prediction is made at a CU level. Each CU may be further partitioned into one, two, or four PUs based on a PU partitioning type. In one PU, a same prediction process is applied, and related information is transmitted to a decoder on a PU basis. After obtaining a residual block by applying the prediction process based on the PU partitioning type, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular.

In this specification, for ease of description and understanding, a to-be-encoded picture block in a current coded picture may be referred to as a current block. For example, in encoding, the current block is a block that is being encoded, and in decoding, the current block is a block that is being decoded. A decoded picture block, in a reference picture, used to predict the current block is referred to as a reference block. To be specific, the reference block is a block that provides a reference signal for the current block, and the reference signal represents a pixel value in the picture block. A block that is in the reference picture and that provides a prediction signal for the current block may be referred to as a prediction block. The prediction signal represents a pixel value, a sampling value, or a sampling signal in the prediction block. For example, after a plurality of reference blocks are traversed, an optimal reference block is found. The optimal reference block provides prediction for the current block, and is referred to as a prediction block.

In a case of lossless video coding, an original video picture may be reconstructed. To be specific, a reconstructed video picture has same quality as the original video picture (assuming that no transmission loss or other data loss occurs during storage or transmission). In a case of lossy video coding, further compression is performed through, for example, quantization, to reduce an amount of data for representing a video picture, but the video picture cannot be completely reconstructed at a decoder side. To be specific, quality of a reconstructed video picture is lower or poorer than that of the original video picture.

Several H.261 video coding standards are for "lossy hybrid video coding" (to be specific, spatial and temporal prediction in a sample domain is combined with 2D transform coding for applying quantization in a transform domain). Each picture of a video sequence is usually partitioned into a set of non-overlapping blocks, and coding is usually performed at a block level. To be specific, at an encoder side, a video is usually processed, that is, encoded, at a block (video block) level. For example, a prediction block is generated through spatial (intra) prediction and temporal (inter) prediction, the prediction block is subtracted from a current block (block being processed or to be processed) to obtain a residual block, and the residual block is transformed in the transform domain and quantized to reduce an amount of data that is to be transmitted (compressed). At a decoder side, an inverse processing part relative to an encoder is applied to an encoded block or a compressed block to reconstruct the current block for representation. Furthermore, the encoder duplicates a processing loop of a decoder, so that the encoder and the decoder generate same prediction (for example, intra prediction and inter prediction) and/or reconstruction, to process, that is, to encode, subsequent blocks.

The following describes a system architecture to which the embodiments of the present invention are applied. FIG.

1A is a schematic block diagram of an example of a video encoding and decoding system 10 to which the embodiments of the present invention are applied. As shown in FIG. 1A, the video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. In various implementation solutions, the source device 12, the destination device 14, or both the source device 12 and the destination device 14 may include one or more processors and a memory coupled to the one or more processors. The memory may include but is not limited to a RAM, a ROM, an EEPROM, a flash memory, or any other medium that can be used to store desired program code in a form of an instruction or a data structure accessible to a computer, as described in this specification. The source device 12 and the destination device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

A communication connection between the source device 12 and the destination device 14 may be implemented through a link 13, and the destination device 14 may receive the encoded video data from the source device 12 through the link 13. The link 13 may include one or more media or apparatuses capable of moving the encoded video data from the source device 12 to the destination device 14. In an example, the link 13 may include one or more communications media that enable the source device 12 to directly transmit the encoded video data to the destination device 14 in real time. In this example, the source device 12 may modulate the encoded video data according to a communications standard (for example, a wireless communications protocol), and may transmit modulated video data to the destination device 14. The one or more communications media may include a wireless communications medium and/or a wired communications medium, for example, a radio frequency (RF) spectrum or one or more physical transmission cables. The one or more communications media may be a part of a packet-based network, and the packet-based network is, for example, a local area network, a wide area network, or a global network (for example, the internet). The one or more communications media may include a router, a switch, a base station, or another device that facilitates communication from the source device 12 to the destination device 14.

The source device 12 includes an encoder 20. Optionally, the source device 12 may further include a picture source 16, a picture preprocessor 18, and a communications interface 22. In a specific implementation form, the encoder 20, the picture source 16, the picture preprocessor 18, and the communications interface 22 may be hardware components in the source device 12, or may be software programs in the source device 12. Descriptions are separately provided as follows:

The picture source 16 may include or be any type of picture capturing device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processor, a computer, or a server. The interface may be any type of interface, for example, a wired or wireless interface or an optical interface, according to any proprietary or standardized interface protocol.

A picture may be considered as a two-dimensional array or matrix of picture elements. The picture element in the array may also be referred to as a sample. Quantities of samples in horizontal and vertical directions (or axes) of the array or the picture define a size and/or resolution of the picture. For representation of color, three color components are usually used. To be specific, the picture may be represented as or include three sample arrays. For example, in an RBG format or color space, the picture includes corresponding red, green, and blue sample arrays. However, in video coding, each pixel is usually represented in a luminance/chrominance format or color space. For example, a picture in a YUV format includes a luminance component indicated by Y (sometimes indicated by L alternatively) and two chrominance components indicated by U and V. The luminance (luma) component Y represents brightness or gray level intensity (for example, both are the same in a gray-scale picture), and the two chrominance (chroma) components U and V represent chrominance or color information components. Correspondingly, the picture in the YUV format includes a luminance sample array of luminance sample values (Y) and two chrominance sample arrays of chrominance values (U and V). A picture in an RGB format may be transformed or converted into a YUV format and vice versa. This process is also referred to as color conversion or transformation. If a picture is monochrome, the picture may include only a luminance sample array. In this embodiment of the present invention, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from an RGB format to a YUV format), color correction, or de-noising.

The encoder 20 (or referred to as a video encoder 20) is configured to receive the preprocessed picture data 19, and process the preprocessed picture data 19 in a related prediction mode (such as a prediction mode in the embodiments of this specification), to provide encoded picture data 21 (structural details of the encoder 20 are further described below based on FIG. 2, FIG. 4, or FIG. 5). In some embodiments, the encoder 20 may be configured to perform various embodiments described below, to implement encoder-side application of a motion vector prediction method described in the present invention.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30. Optionally, the destination device 14 may further include a communications interface 28, a picture post-processor 32, and a display device 34. Descriptions are separately provided as follows:

The communications interface 28 may be configured to receive the encoded picture data 21 from the source device 12 or any other source. The any other source is, for example, a storage device. The storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection. The any type of network is, for example, a wired or wireless network or any combination thereof, or any type of private or public network or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bi-directional communications interfaces, and may be configured to, for example, send and receive messages to establish a connection, and acknowledge and exchange any other information related to a communication link and/or data transmission such as encoded picture data transmission.

The decoder 30 (or referred to as a video decoder 30) is configured to receive the encoded picture data 21 and provide decoded picture data 31 or a decoded picture 31 (structural details of the decoder 30 are further described below based on FIG. 3, FIG. 4, or FIG. 5). In some embodiments, the decoder 30 may be configured to perform various embodiments described below, to implement decoder-side application of a motion vector prediction method described in the present invention.

The picture post-processor 32 is configured to post-process the decoded picture data 31 (also referred to as reconstructed picture data) to obtain post-processed picture data 33. The post-processing performed by the picture post-processor 32 may include color format conversion (for example, from a YUV format to an RGB format), color correction, trimming, re-sampling, or any other processing. The picture post-processor 32 may be further configured to transmit the post-processed picture data 33 to the display device 34.

The display device 34 is configured to receive the post-processed picture data 33 to display a picture to, for example, a user or a viewer. The display device 34 may be or may include any type of display for presenting a reconstructed picture, for example, an integrated or external display or monitor. For example, the display may include a liquid crystal display (LCD), an organic light-emitting diode (OLED) display, a plasma display, a projector, a micro LED display, a liquid crystal on silicon (LCoS), a digital light processor (DLP), or any type of other display.

Although FIG. 1A depicts the source device 12 and the destination device 14 as separate devices, a device embodiment may alternatively include both the source device 12 and the destination device 14 or functionalities of both the source device 12 and the destination device 14, that is, the source device 12 or a corresponding functionality and the destination device 14 or a corresponding functionality. In such an embodiment, the source device 12 or the corresponding functionality and the destination device 14 or the corresponding functionality may be implemented by using same hardware and/or software, separate hardware and/or software, or any combination thereof.

Based on the descriptions, a person skilled in the art can definitely learn that existence and (exact) division of functionalities of different units or functionalities of the source device 12 and/or the destination device 14 shown in FIG. 1A may vary depending on an actual device and application. The source device 12 and the destination device 14 may include any of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (such as a content service server or a content delivery server), a broadcast receiver device, or a broadcast transmitter device, and may use or not use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discrete logic, hardware, or any combination thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors.

In some cases, the video encoding and decoding system 10 shown in FIG. 1A is merely an example and the techniques of this application may be applied to video coding settings (for example, video encoding or video decoding) that do not necessarily include any data communication between an encoding device and a decoding device. In another example, data may be retrieved from a local memory, streamed over a network, or the like. A video encoding device may encode the data and store the data into a memory, and/or a video decoding device may retrieve the data from the memory and decode the data. In some examples, devices that only encode data and store the data in the memory and/or retrieve the data from the memory and decode the data and that do not communicate with each other perform encoding and decoding.

Figure 1B:
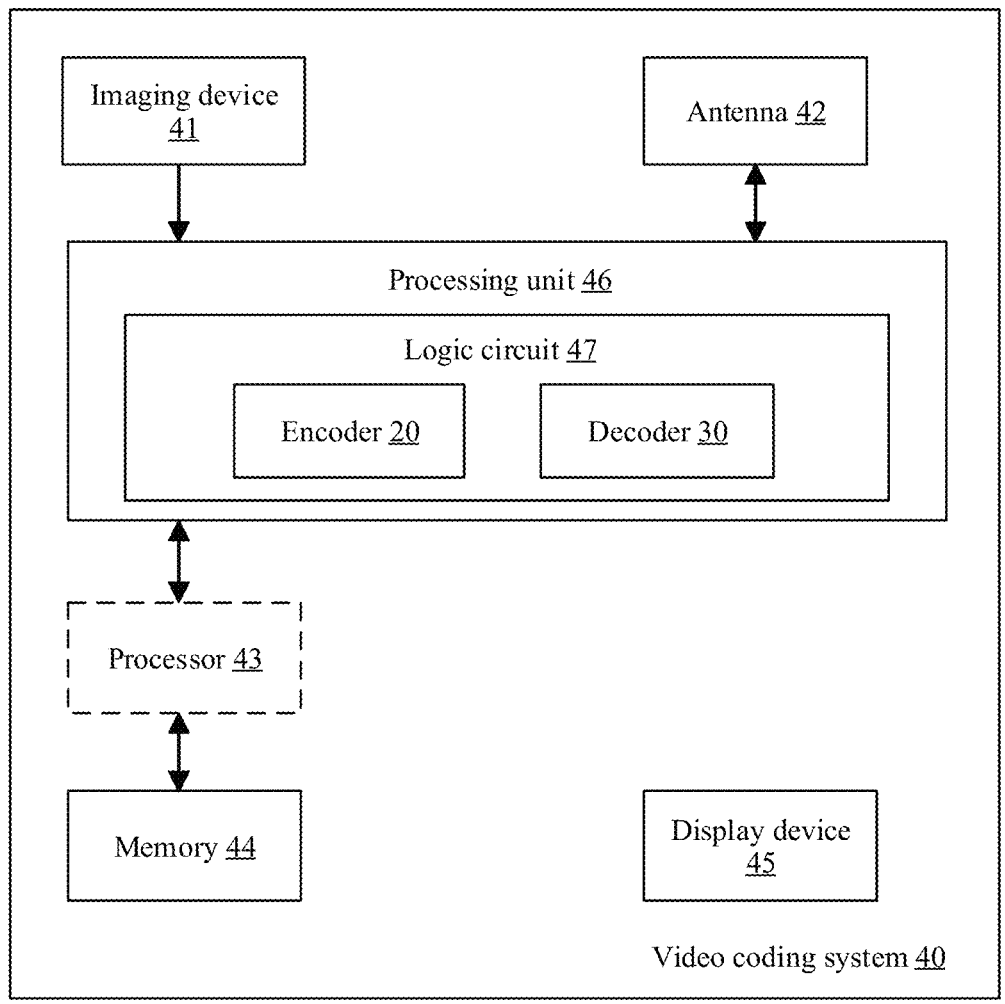
FIG. 1B is a block diagram of an example of a video coding system 40 for implementing an embodiment of the present invention.
Figure 2:
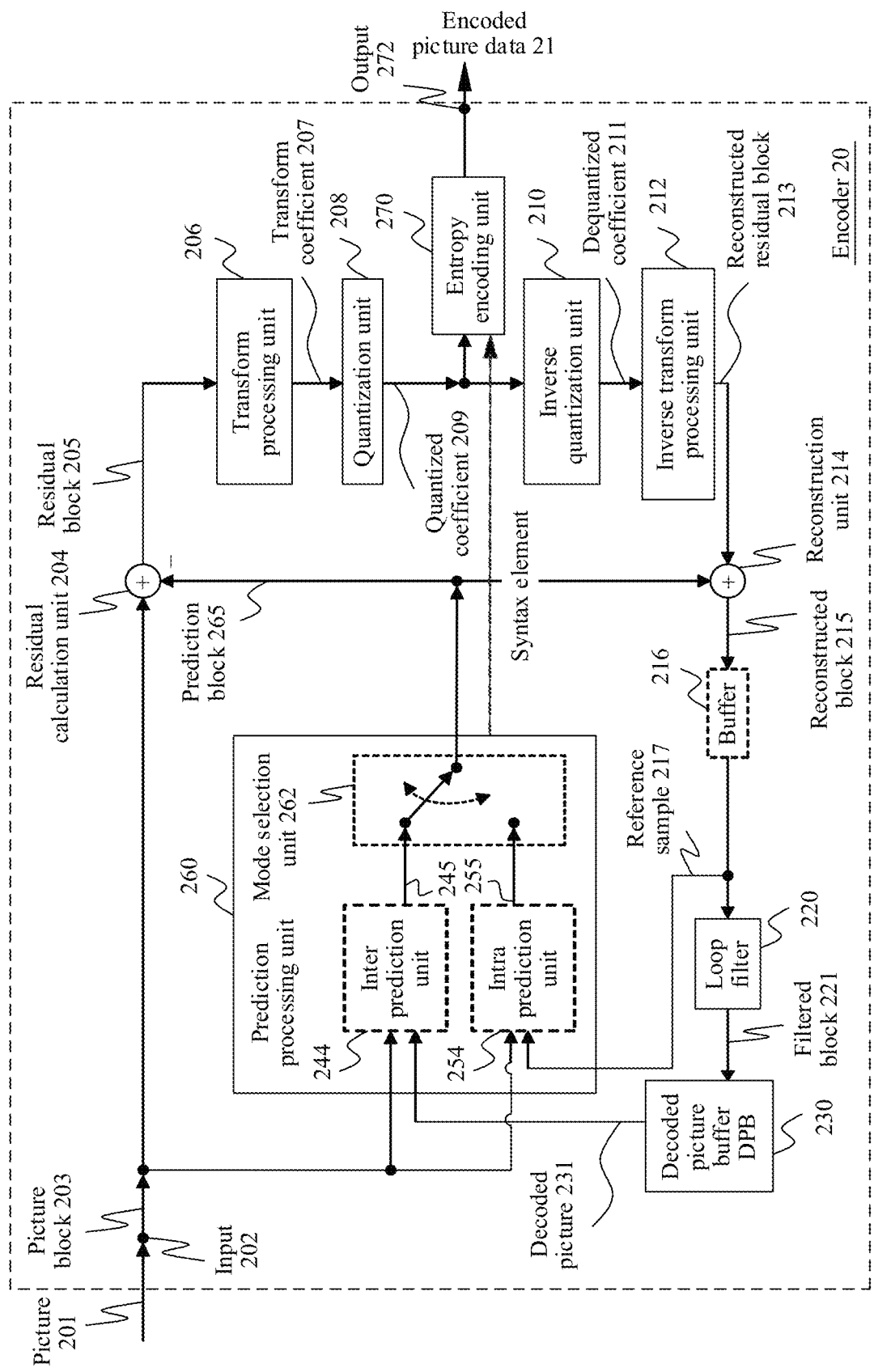
FIG. 2 is a block diagram of an example structure of an encoder 20 for implementing an embodiment of the present invention.
Figure 3:
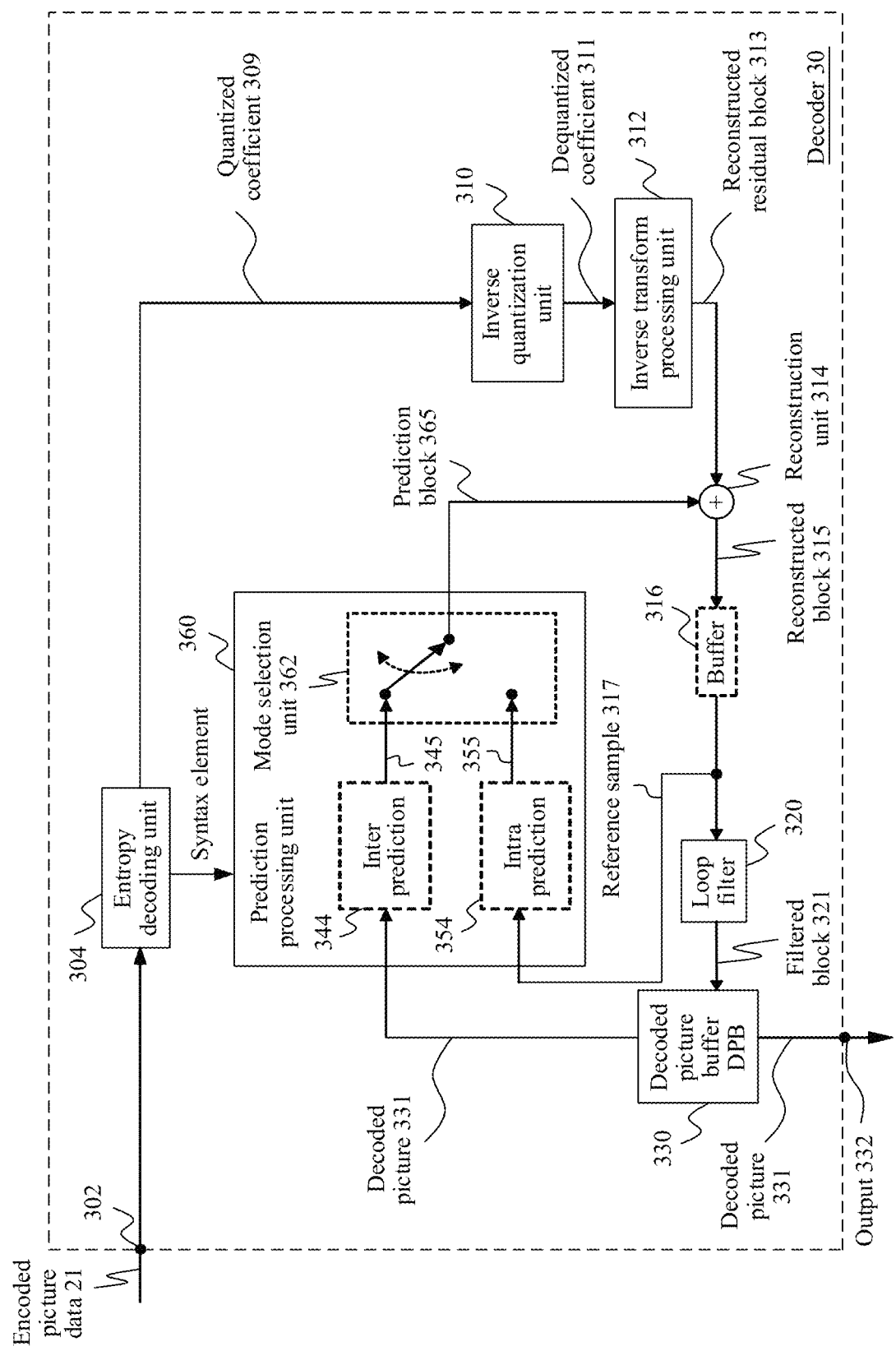
FIG. 3 is a block diagram of an example structure of a decoder 30 for implementing an embodiment of the present invention.

FIG. 1B is an illustrative diagram of an example of a video coding system 40 including an encoder 20 in FIG. 2 and/or a decoder 30 in FIG. 3 according to an example embodiment. The video coding system 40 can implement a combination of various technologies in the embodiments of the present invention. In the illustrated implementation, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some examples, the antenna 42 may be configured to transmit or receive an encoded bitstream of video data. In addition, in some examples, the display device 45 may be configured to present the video data. In some examples, the logic circuit 47 may be implemented by the processing unit 46. The processing unit 46 may include application-specific integrated circuit (ASIC) logic, a graphics processor, a general-purpose processor, or the like. The video coding system 40 may also include the optional processor 43. The optional processor 43 may similarly include application-specific integrated circuit (ASIC) logic, a graphics processor, a general-purpose processor, or the like. In some examples, the logic circuit 47 may be implemented by hardware, for example, video coding dedicated hardware, and the processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-restrictive example, the memory 44 may be implemented by cache memory. In some examples, the logic circuit 47 may access the memory 44 (for example, for implementing a picture buffer). In other examples, the logic circuit 47 and/or the processing unit 46 may include a memory (for example, a cache) for implementing a picture buffer.

In some examples, the encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the encoder 20 implemented by using the logic circuit 47, to implement various modules that are described with reference to FIG. 2 and/or any other encoder system or subsystem described in this specification. The logic circuit may be configured to perform various operations described in this specification.

In some examples, the decoder 30 may be implemented by the logic circuit 47 in a similar manner, to implement various modules that are described with reference to the decoder 30 in FIG. 3 and/or any other decoder system or subsystem described in this specification. In some examples, the decoder 30 implemented by using the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the decoder 30 implemented by using the logic circuit 47, to implement various modules that are described with reference to FIG. 3 and/or any other decoder system or subsystem described in this specification.

In some examples, the antenna 42 may be configured to receive an encoded bitstream of video data. As described, the encoded bitstream may include data, an indicator, an index value, mode selection data, or the like that is related to video frame encoding and that is described in this specification, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that, in this embodiment of the present invention, for the example described with reference to the encoder 20, the decoder 30 may be configured to perform an inverse process. With regard to signaling a syntax element, the decoder 30 may be configured to receive and parse such a syntax element and correspondingly decode related video data. In some examples, the encoder 20 may entropy-encode the syntax element into an encoded video bitstream. In such examples, the decoder 30 may parse the syntax element and correspondingly decode the related video data.

It should be noted that, a motion vector prediction method based on an affine motion model according to the embodiments of the present invention is mainly used in an inter prediction process. This process exists for both the encoder 20 and the decoder 30. The encoder 20 and the decoder 30 in the embodiments of the present invention may be an encoder and a decoder corresponding to video standard protocols such as H.263, H.264, HEVV, MPEG-2, MPEG-4, VP8, and VP9 or next-generation video standard protocols (such as H.266).

FIG. 2 is a schematic/conceptual block diagram of an example of an encoder 20 for implementing an embodiment of the present invention. In the example in FIG. 2, the encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, via an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding, for distinguishing the current picture from other pictures, for example, previously encoded and/or decoded pictures in a same video sequence, namely, the video sequence that also includes the current picture).

An embodiment of the encoder 20 may include a partitioning unit (not depicted in FIG. 2), configured to partition the picture 201 into a plurality of blocks such as the picture block 203. The picture 201 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 260 of the encoder 20 may be configured to perform any combination of the partitioning technologies described above.

Like the picture 201, the picture block 203 is also or may be considered as a two-dimensional array or matrix of samples with sample values, although a size of the picture block 203 is smaller than a size of the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. Quantities of samples in horizontal and vertical directions (or axes) of the picture block 203 define a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided below), for example, by subtracting sample values of the prediction block 265 from sample values of the picture block 203 sample by sample (pixel by pixel), to obtain the residual block 205 in a sample domain.

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints. For example, the scale factor is a power of two for a shift operation, a bit depth of the transform coefficient, and a tradeoff between accuracy and implementation costs. For example, a specific scale factor is specified for the inverse transform by, for example, the inverse transform processing unit 212 on a decoder 30 side (and for a corresponding inverse transform by, for example, the inverse transform processing unit 212 on an encoder 20 side), and correspondingly, a corresponding scale factor may be specified for the forward transform by the transform processing unit 206 on the encoder 20 side.

The quantization unit 208 is configured to quantize the transform coefficients 207 to obtain quantized transform coefficients 209, for example, by applying scalar quantization or vector quantization. The quantized transform coefficient 209 may also be referred to as a quantized transform coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step size corresponds to finer quantization, and a larger quantization step size corresponds to coarser quantization. An appropriate quantization step size may be indicated by a quantization parameter (QP). For example, the quantization parameter may be an index to a predefined set of appropriate quantization step sizes. For example, a smaller quantization parameter may correspond to finer quantization (a smaller quantization step size) and a larger quantization parameter may correspond to coarser quantization (a larger quantization step size), and vice versa. The quantization may include division by a quantization step size and corresponding quantization or inverse quantization, for example, performed by the inverse quantization unit 210, or may include multiplication by a quantization step size. In embodiments according to some standards such as HEVC, a quantization parameter may be used to determine the quantization step size. Generally, the quantization step size may be calculated based on a quantization parameter by using a fixed point approximation of an equation including division. Additional scale factors may be introduced for quantization and dequantization to restore a norm of a residual block, where the norm of the residual block may be modified because of a scale used in the fixed point approximation of the equation for the quantization step size and the quantization parameter. In an example implementation, a scale of the inverse transform may be combined with a scale of the dequantization. Alternatively, a customized quantization table may be used and signaled from an encoder to a decoder, for example, in a bitstream. The quantization is a lossy operation, where a larger quantization step size indicates a higher loss.

The inverse quantization unit 210 is configured to apply the inverse quantization of the quantization unit 208 to a quantized coefficient to obtain a dequantized coefficient 211, for example, apply, based on or by using a same quantization step size as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, a reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 (or briefly referred to as a "buffer" 216) of, for example, a line buffer 216, is configured to buffer or store the reconstructed block 215 and a corresponding sample value, for example, for intra prediction. In other embodiments, the encoder may be configured to use unfiltered reconstructed blocks and/or corresponding sample values stored in the buffer unit 216 for any type of estimation and/or prediction, for example, intra prediction.

For example, in an embodiment, the encoder 20 may be configured so that the buffer unit 216 is configured to store not only the reconstructed block 215 used for the intra prediction unit 254 but also a reconstructed block (not shown in FIG. 2) used for the loop filter unit 220 and/or so that, for example, the buffer unit 216 and the decoded picture buffer 230 form one buffer. In another embodiment, a filtered block 221 and/or a block or sample (not shown in FIG. 2) from the decoded picture buffer 230 are/is used as an input or a basis for the intra prediction unit 254.

The loop filter unit 220 (or briefly referred to as a "loop filter" 220) is configured to filter the reconstructed block 215 to obtain the filtered block 221, to smooth pixel transition or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another configuration, the loop filter unit 220 may be implemented as a post filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that the decoder 30 can receive and apply the same loop filter parameter for decoding.

The decoded picture buffer (DPB) 230 may be a reference picture memory that stores reference picture data for use in video data encoding by the encoder 20. The DPB 230 may include any one of a variety of memory devices such as a dynamic random access memory (DRAM) (including a synchronous DRAM (SDRAM), a magnetoresistive RAM (MRAM), or a resistive RAM (RRAM)), or other types of memory devices. The DPB 230 and the buffer 216 may be provided by a same memory device or separate memory devices. In an example, the decoded picture buffer (DPB) 230 is configured to store the filtered block 221. The decoded picture buffer 230 may further be configured to store other previously filtered blocks, for example, previously reconstructed and filtered blocks 221, of the same current picture or of different pictures, for example, previously reconstructed pictures, and may provide complete previously reconstructed, that is, decoded, pictures (and corresponding reference blocks and samples) and/or a partially reconstructed current picture (and corresponding reference blocks and samples), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the picture block 203 (a current picture block 203 of the current picture 201) and reconstructed picture data, for example, reference samples of the same (current) picture from the buffer 216 and/or reference picture data 231 of one or more previously decoded pictures from the decoded picture buffer 230, and to process such data for prediction, that is, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion at least satisfies a prediction mode selection criterion.

The following describes in detail prediction processing (for example, performed by the prediction processing unit 260) and mode selection (for example, performed by the mode selection unit 262) performed by an example of the encoder 20.

As described above, the encoder 20 is configured to determine or select an optimal or optimum prediction mode from a set of (predetermined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

In a possible implementation, a set of inter prediction modes depends on available reference pictures (that is, for example, at least some decoded pictures stored in the DPB 230, as described above) and other inter prediction parameters, for example, depends on whether the entire reference picture or only a part of the reference picture, for example, a search window region around a region of the current block, is used for searching for an optimal matching reference block, and/or for example, depends on whether pixel interpolation such as half-pixel and/or quarter-pixel interpolation is applied. The set of inter prediction modes may include, for example, an advanced motion vector prediction (AMVP) mode and a merge mode. During specific implementation, the set of inter prediction modes may include an AMVP mode based on a control point and a merge mode based on a control point that are improved in the embodiments of the present invention. In an example, the intra prediction unit 254 may be configured to perform any combination of inter prediction technologies described below.

In addition to the foregoing prediction modes, a skip mode and/or a direct mode may also be applied in the embodiments of the present invention.

The prediction processing unit 260 may be further configured to partition the picture block 203 into smaller block partitions or subblocks, for example, by iteratively using quadtree (QT) partitioning, binary tree (BT) partitioning, ternary tree (TT) partitioning, or any combination thereof, and perform, for example, prediction on each of the block partitions or subblocks. Mode selection includes selection of a tree structure of the partitioned picture block 203 and selection of a prediction mode used for each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and the previously decoded pictures 231, or in other words, the current picture and the previously decoded pictures 231 may be a part of or form a sequence of pictures forming the video sequence.

For example, the encoder 20 may be configured to select a reference block from a plurality of reference blocks of a same picture or different pictures in a plurality of other pictures and provide, for the motion estimation unit (not shown in FIG. 2), a reference picture and/or provide an offset (a spatial offset) between a location (coordinates X and Y) of the reference block and a location of the current block as an inter prediction parameter. The offset is also referred to as a motion vector (MV).

The motion compensation unit is configured to obtain the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to encode a picture block. Upon receiving a motion vector for a PU of the current picture block, a motion compensation unit 246 may locate a prediction block to which the motion vector points in a reference picture list. The motion compensation unit 246 may further generate syntax elements associated with a block and a video slice, for decoding a picture block of the video slice by the decoder 30.

Specifically, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In a possible application scenario, if there is only one inter prediction mode, the inter prediction parameter may alternatively not be carried in the syntax element. In this case, the decoder 30 may directly perform decoding in a default prediction mode. It may be understood that the inter prediction unit 244 may be configured to perform any combination of inter prediction technologies.

The intra prediction unit 254 is configured to obtain, for example, receive, the picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra prediction mode for a block, the intra prediction unit 254 is further configured to provide an intra prediction parameter, that is, information indicating the selected intra prediction mode for the block, for the entropy encoding unit 270. In an example, the intra prediction unit 254 may be configured to perform any combination of intra prediction technologies.

Specifically, the intra prediction unit 254 may transmit syntax elements to the entropy encoding unit 270, and the syntax elements include the intra prediction parameter (such as indication information of selection of an intra prediction mode used for prediction of the current block after traversal of a plurality of intra prediction modes). In a possible application scenario, if there is only one intra prediction mode, the intra prediction parameter may alternatively not be carried in the syntax element. In this case, the decoder 30 may directly perform decoding in a default prediction mode.

The entropy encoding unit 270 is configured to apply (or avoid applying) an entropy coding algorithm or scheme (for example, a variable-length coding (VLC) scheme, a context-adaptive VLC (CAVLC) scheme, an arithmetic coding scheme, context-adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized residual coefficient 209, the inter prediction parameter, the intra prediction parameter, and/or the loop filter parameter, to obtain encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy-encode another syntax element for a current video slice being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 combined into a single unit.

Specifically, in the embodiments of the present invention, the encoder 20 may be configured to implement a motion vector prediction method based on an affine motion model in the following embodiments.

FIG. 3 is a schematic/conceptual block diagram of an example of a decoder 30 for implementing an embodiment of the present invention. The video decoder 30 is configured to receive encoded picture data (for example, an encoded bitstream) 21 encoded by, for example, the encoder 20, to obtain a decoded picture 331. In a decoding process, the video decoder 30 receives video data from the video encoder 20, for example, an encoded video bitstream that represents a picture block of an encoded video slice and an associated syntax element.

In the example in FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding process that is roughly inverse to the encoding process described with respect to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 210. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may resemble the inter prediction unit 244 in function, and the intra prediction unit 354 may resemble the intra prediction unit 254 in function. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When the video slice is encoded into an intra-encoded (I) slice, the intra prediction unit 354 of the prediction processing unit 360 is configured to generate the prediction block 365 for a picture block of the current video slice based on a signaled intra prediction mode and data of a previously decoded block of a current frame or picture. When the video frame is encoded into an inter-encoded (namely, B or P) slice, the inter prediction unit 344 (for example, a motion compensation unit) of the prediction processing unit 360 is configured to generate the prediction block 365 for a video block of the current video slice based on a motion vector and the another syntax element that is received from the entropy decoding unit 304. For inter prediction, the prediction block may be generated from one of reference pictures in one reference picture list. The video decoder 30 may construct reference frame lists: a list 0 and a list 1, by using a default construction technology based on reference pictures stored in the DPB 330.

The prediction processing unit 360 is configured to determine prediction information for the video block of the current video slice by parsing the motion vector and the another syntax element, and use the prediction information to generate the prediction block for the current video block being decoded. In an example of the present invention, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of the reference picture lists for the slice, a motion vector for each inter encoded video block in the slice, an inter prediction status of each inter encoded video block in the slice, and other information, to decode the video block in the current video slice. In another example of this disclosure, the syntax elements received by the video decoder 30 from a bitstream include syntax elements in one or more of an adaptive parameter set (APS), a sequence parameter set (SPS), a picture parameter set (PPS), or a slice header.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice to determine a quantization degree that should be applied and an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (in a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 3, in another configuration, the loop filter unit 320 may be implemented as a post filter.

Then, a decoded video block 321 in a given frame or picture is stored in the decoded picture buffer 330 that stores a reference picture used for subsequent motion compensation.

The decoder 30 is configured to, for example, output the decoded picture 331 via an output 332, for presentation or viewing to a user.

Another variant of the video decoder 30 may be used to decode a compressed bitstream. For example, the decoder 30 may generate an output video stream without the loop filter unit 320. For example, a non-transform based decoder 30 can inverse-quantize a residual signal directly without the inverse transform processing unit 312 for some blocks or frames. In another implementation, the video decoder 30 may have the inverse quantization unit 310 and the inverse transform processing unit 312 combined into a single unit.

Specifically, in the embodiments of the present invention, the decoder 30 is configured to implement a motion vector prediction method based on an affine motion model in the following embodiments.

Figure 4:
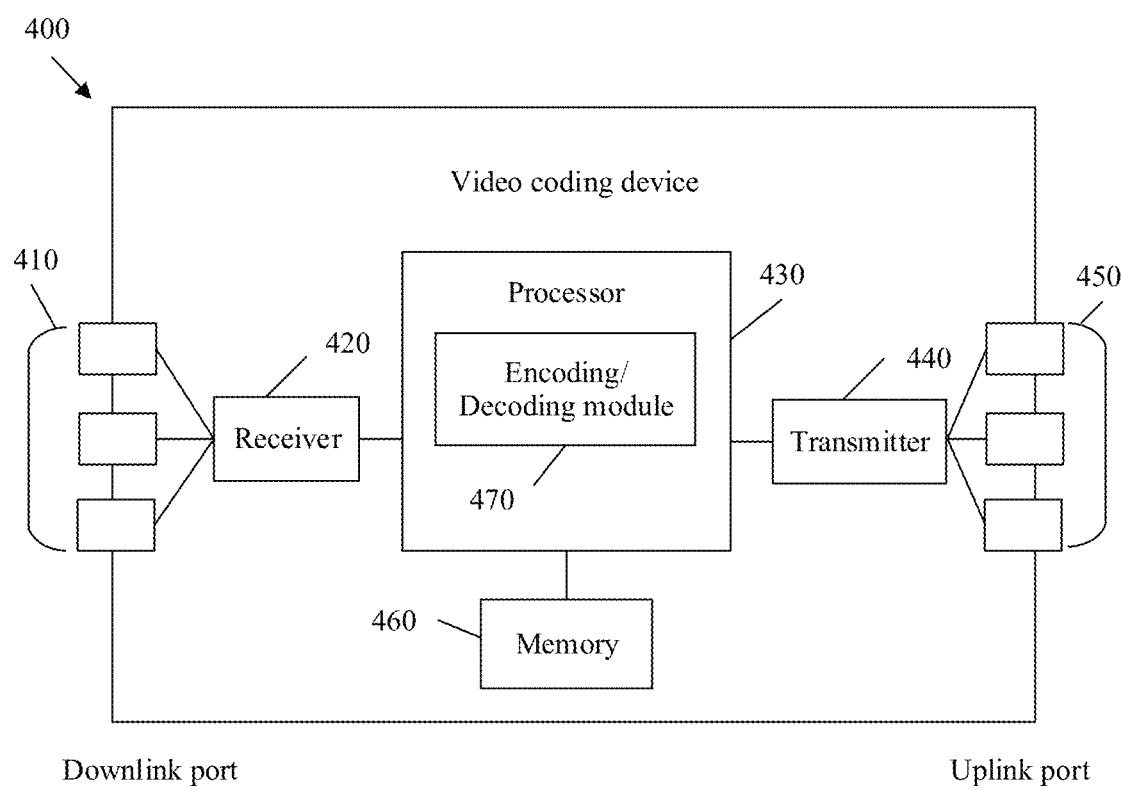
FIG. 4 is a block diagram of an example of a video coding device 400 for implementing an embodiment of the present invention.

FIG. 4 is a schematic structural diagram of a video coding device 400 (for example, a video encoding device 400 or a video decoding device 400) according to an embodiment of the present invention. The video coding device 400 is suitable for implementing the embodiments described in this specification. In an embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: an ingress port 410 and a receiving unit (Rx) 420 for receiving data; a processor, a logic unit, or a central processing unit (CPU) 430 for processing data; a transmitter unit (Tx) 440 and an egress port 450 for transmitting data; and a memory 460 for storing data. The video coding device 400 may further include an optical-to-electrical conversion component and an electrical-to-optical (EO) component coupled to the ingress port 410, the receiver unit 420, the transmitter unit 440, and the egress port 450 for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress port 410, the receiver unit 420, the transmitter unit 440, the egress port 450, and the memory 460. The processor 430 includes a coding module 470 (for example, an encoding module 470 or a decoding module 470). The encoding/decoding module 470 implements the embodiments disclosed in this specification, to implement the motion vector prediction method provided in the embodiments of the present invention. For example, the encoding/decoding module 470 implements, processes, or provides various coding operations. Therefore, the encoding/decoding module 470 substantially improves functions of the video coding device 400 and affects transform of the video coding device 400 to a different state. Alternatively, the encoding/decoding module 470 is implemented as an instruction stored in the memory 460 and executed by the processor 430.

The memory 460 includes one or more disks, tape drives, and solid-state drives, and may be used as an overflow data storage device, to store programs when such programs are selected for execution, and to store instructions and data that are read during program execution. The memory 460 may be volatile and/or nonvolatile, and may be a read-only memory (ROM), a random access memory (RAM), a ternary content-addressable memory (TCAM), and/or a static random access memory (SRAM).

Figure 5:
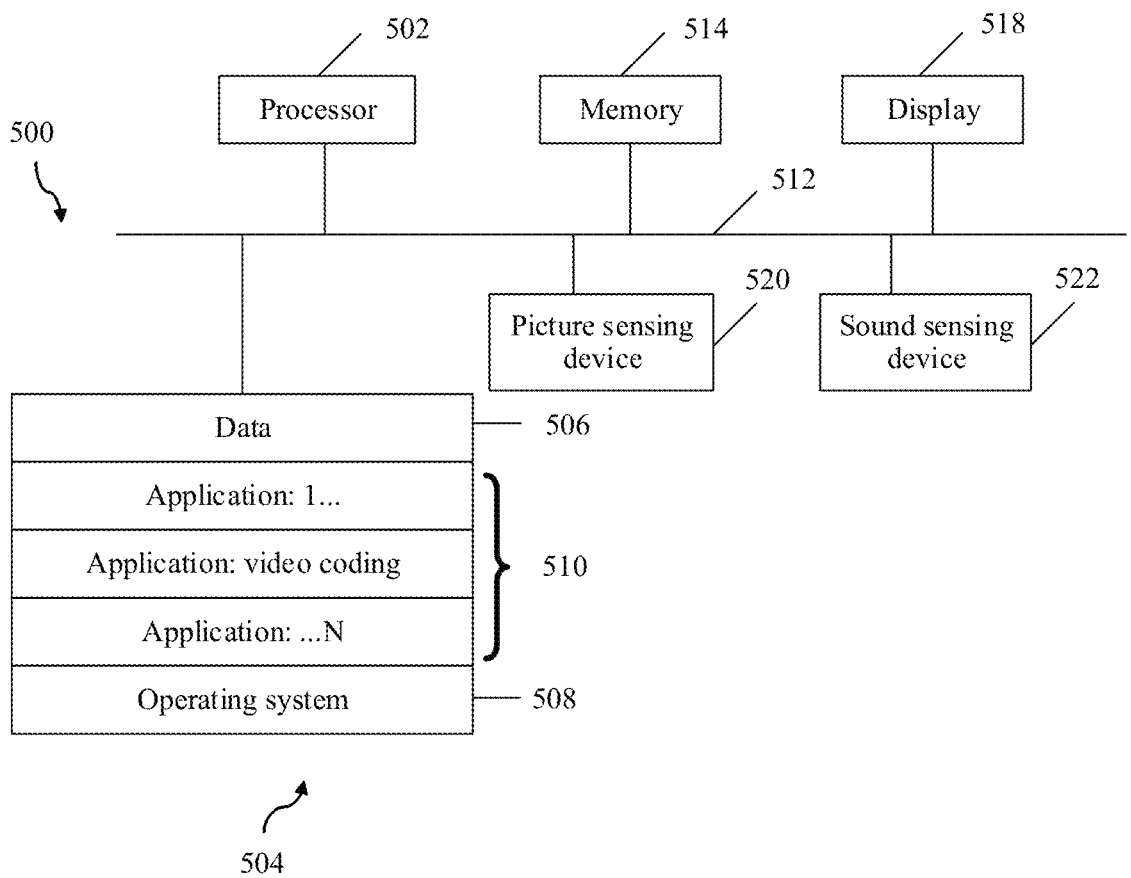
FIG. 5 is a block diagram of another example of an encoding apparatus or a decoding apparatus for implementing an embodiment of the present invention.

FIG. 5 is a simplified block diagram of an apparatus 500 that may be used as either or two of the source device 12 and the destination device 14 in FIG. 1A according to an example embodiment. The apparatus 500 may implement the technologies in this application. The apparatus 500 configured to implement motion vector prediction may be in a form of a computing system including a plurality of computing devices, or may be in a form of a single computing device such as a mobile phone, a tablet computer, a laptop computer, a notebook computer, or a desktop computer.

A processor 502 in the apparatus 500 may be a central processing unit. Alternatively, the processor 502 may be any other type of device or a plurality of devices that can control or process information and that are existing or to be developed in the future. As shown in the figure, although the disclosed implementations may be practiced by using a single processor such as the processor 502, advantages in speed and efficiency may be achieved by using more than one processor.

In an implementation, a memory 504 in the apparatus 500 may be a read-only memory (ROM) device or a random access memory (RAM) device. Any other suitable type of storage device may be used as the memory 504. The memory 504 may include code and data 506 accessed by the processor 502 through a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video coding application that performs the method described in this specification. The apparatus 500 may further include an additional memory in a form of a secondary memory 514. The secondary memory 514 may be, for example, a memory card used together with a mobile computing device. Because a video communication session may include a large amount of information, the information may be fully or partially stored in the secondary memory 514 and loaded onto the memory 504 for processing as required.

The apparatus 500 may further include one or more output devices, for example, a display 518. In an example, the display 518 may be a touch sensitive display that combines a display with a touch sensitive element that is operable to sense a touch input. The display 518 may be coupled to the processor 502 through the bus 512. In addition to the display 518, another output device that allows a user to program the apparatus 500 or otherwise use the apparatus 500 may further be provided, or another output device may be provided as an alternative to the display 518. When the output device is or includes a display, the display may be implemented in different manners, including a liquid crystal display (LCD), a cathode-ray tube (CRT) display, and a plasma display or light-emitting diode (LED) display such as an organic LED (OLED) display.

The apparatus 500 may further include or be connected to a picture sensing device 520. The picture sensing device 520 is, for example, a camera or any other picture sensing device 520 that can sense a picture and that is existing or to be developed in the future. The picture is, for example, a picture of a user that operates the apparatus 500. The picture sensing device 520 may be placed directly facing the user that operates the apparatus 500. In an example, a location and an optical axis of the picture sensing device 520 may be configured, so that a field of view of the picture sensing device 520 includes a region adjacent to the display 518 and the display 518 that can be seen from the region.

The apparatus 500 may further include or be connected to a sound sensing device 522. The sound sensing device 522 is, for example, a microphone or any other sound sensing device that can sense a sound near the apparatus 500 and that is existing or to be developed in the future. The sound sensing device 522 may be placed directly facing the user that operates the apparatus 500, and may be configured to receive a sound, for example, a voice or another sound, made by the user when the user operates the apparatus 500.

Although the processor 502 and the memory 504 of the apparatus 500 are depicted in FIG. 5 as being integrated into a single unit, another configuration may be alternatively used. Running of the processor 502 may be distributed in a plurality of machines (each machine has one or more processors) that can be directly coupled, or distributed in a local region or another network. The memory 504 may be distributed in a plurality of machines. For example, the memory 504 is a network-based memory or memories in a plurality of machines that run the apparatus 500. Although depicted as a single bus herein, the bus 512 of the apparatus 500 may include a plurality of buses. Further, the secondary memory 514 may be directly coupled to another component of the apparatus 500 or may be accessed through a network. In addition, the secondary memory 514 may include a single integrated unit, for example, one memory card, or a plurality of units, for example, a plurality of memory cards. Therefore, the apparatus 500 may be implemented in a plurality of configurations.

To better understand the technical solutions in the embodiments of the present invention, the following further describes an inter prediction mode, a non-translational motion model, an inherited control point motion vector prediction method, and a constructed control point motion vector prediction method in the embodiments of the present invention.

(1) Inter prediction mode. In HEVC, two inter prediction modes are used: an advanced motion vector prediction (AMVP) mode and a merge mode.

In the AMVP mode, spatially or temporally neighboring encoded blocks (denoted as neighboring blocks) of a current block are first traversed. A candidate motion vector list (which may also be referred to as a motion information candidate list) is constructed based on motion information of the neighboring blocks. Then, an optimal motion vector is determined in the candidate motion vector list based on rate-distortion costs, and candidate motion information with minimum rate-distortion costs is used as a motion vector predictor (MVP) of the current block. Locations and a traversal order of the neighboring blocks are predefined. The rate-distortion costs are obtained through calculation according to a formula (1), where J represents the rate-distortion costs RD costs, SAD is a sum of absolute differences (SAD) between an original pixel value and a predicted pixel value obtained through motion estimation by using a candidate motion vector predictor, R represents a bit rate, and λ represents a Lagrange multiplier. An encoder side transfers an index value of the selected motion vector predictor in the candidate motion vector list and a reference frame index value to a decoder side. Further, motion search is performed in an MVP-centered neighboring domain, to obtain an actual motion vector of the current block. The encoder side transfers a difference (motion vector difference) between the MVP and the actual motion vector to the decoder side.

$$J = SAD + \lambda R \qquad (1)$$

Figure 6:
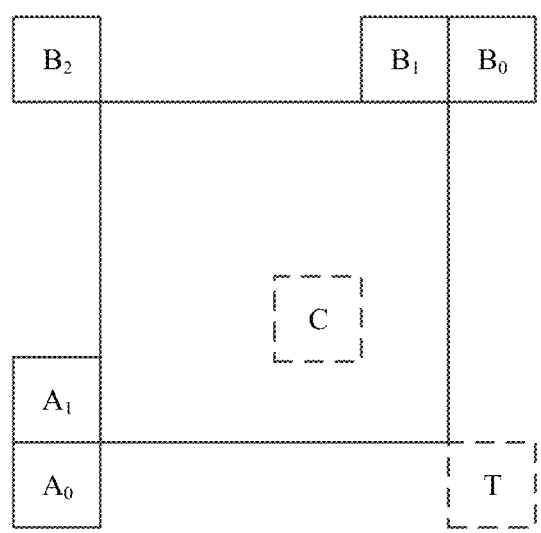
FIG. 6 is a schematic diagram of a scenario in which an example operation is performed on a current block.

In the merge mode, a candidate motion vector list is first constructed based on motion information of spatially or temporally neighboring encoded blocks of a current block. Then, rate-distortion costs are calculated to determine optimal motion information in the candidate motion vector list as motion information of the current block, and an index value (denoted as a merge index, the same below) of a location of the optimal motion information in the candidate motion vector list is transferred to the decoder side. Spatial candidate motion information and temporal candidate motion information of the current block are shown in FIG. 6. The spatial candidate motion information is from five spatially neighboring blocks (A0, A1, B0, B1, and B2). If a neighboring block is unavailable (the neighboring block does not exist, or the neighboring block is not encoded, or a prediction mode used for the neighboring block is not the inter prediction mode), motion information of the neighboring block is not added to the candidate motion vector list. The temporal candidate motion information of the current block is obtained after an MV of a collocated block in a reference frame is scaled based on picture order counts (POC) of the reference frame and a current frame. Whether a block at a location T in the reference frame is available is first determined. If the block is unavailable, a block at a location C is selected.

Similar to the AMVP mode, in the merge mode, locations and a traversal order of the neighboring blocks are also predefined. In addition, the locations and the traversal order of the neighboring blocks may be different in different modes.

It can be learned that a candidate motion vector list needs to be maintained in both the AMVP mode and the merge mode. Before new motion information is added to the candidate list each time, whether same motion information already exists in the list is first checked. If the same motion information exists in the list, the motion information is not added to the list. This checking process is referred to as pruning of the candidate motion vector list. Pruning of the list is to avoid the same motion information in the list, to avoid redundant rate-distortion cost calculation.

During inter prediction in HEVC, same motion information is used for all pixels in a coding block (in other words, motion of all the pixels in the coding block is consistent), and then motion compensation is performed based on the motion information, to obtain predicted values of the pixels in the coding block. However, in the coding block, not all pixels have a same motion characteristic. Using the same motion information may result in inaccurate motion compensation prediction and more residual information.

In other words, in an existing video coding standard, block-matching motion estimation based on a translational motion model is used. However, in the real world, there are a variety of movements. Many objects, for example, a rotating object, a roller coaster rotating in different directions, fireworks, and some stunts in movies, are not in translational motion. If these moving objects, especially those in a UGC scenario, are encoded by using a block motion compensation technology based on the translational motion model in the existing coding standard, coding efficiency is greatly affected. Therefore, the non-translational motion model, for example, an affine motion model, is introduced to further improve the coding efficiency.

Based on this, in terms of different motion models, the AMVP mode may be divided into a translational model-based AMVP mode and a non-translational model-based AMVP mode, and the merge mode may be divided into a translational model-based merge mode and a non-translational motion model-based merge mode.

(2) Non-translational motion model. In non-translational motion model-based prediction, a same motion model is used on an encoder side and a decoder side to derive motion information of each motion compensation subunit in a current block, and motion compensation is performed based on the motion information of the motion compensation subunit to obtain a prediction block, so as to improve prediction efficiency. The motion compensation subunit in the embodiments of the present invention may be a pixel or a pixel block that is obtained through partitioning according to a specific method and whose size is $N_1 \times N_2$, where both $N_1$ and $N_2$ are positive integers, and $N_1$ may be equal to $N_2$ or may not be equal to $N_2$.

Common non-translational motion models include a 4-parameter affine motion model and a 6-parameter affine motion model, and in a possible application scenario, there is also an 8-parameter bilinear model. Descriptions are separately provided below.

The 4-parameter affine motion model is shown in the following formula (2):

$$\begin{cases} vx = a_1 + a_3 x + a_4 y \\ vy = a_2 - a_4 x + a_3 y \end{cases} \quad (2)$$

The 4-parameter affine motion model may be represented by motion vectors of two pixels and coordinates of the two pixels relative to a top-left pixel of a current block. A pixel used to represent a motion model parameter is referred to as a control point. If pixels in the top-left corner (0, 0) and the top-right corner (W, 0) are used as control points, motion vectors (vx0, vy0) and (vx1, vy1) of the control points in the top-left corner and the top-right corner of the current block are first determined. Then, motion information of each motion compensation subunit of the current block is obtained according to the following formula (3), where (x, y) is coordinates of the motion compensation subunit relative to the top-left pixel of the current block, and W represents the width of the current block.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \quad (3)$$

The 6-parameter affine motion model is shown in the following formula (4):

$$\begin{cases} vx = a_1 + a_3 x + a_4 y \\ vy = a_2 + a_5 x + a_6 y \end{cases} \quad (4)$$

The 6-parameter affine motion model may be represented by motion vectors of three pixels and coordinates of the three pixels relative to a top-left pixel of a current block. If pixels in the top-left corner (0, 0), the top-right corner (W, 0), and the bottom-left corner (0, H) are used as control points, motion vectors (vx0, vy0), (vx1, vy1), and (vx2, vy2) of the control points in the top-left corner, the top-right corner, and the bottom-left corner of the current block are first determined. Then, motion information of each motion compensation subunit of the current block is obtained according to the following formula (5), where (x, y) is coordinates of the motion compensation subunit relative to the top-left pixel of the current block, and W and H respectively represent the width and the height of the current block.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \quad (5)$$

The 8-parameter bilinear model is shown in the following formula (6):

$$\begin{cases} vx = a_1 + a_3 x + a_4 y + a_7 xy \\ vy = a_2 + a_5 x + a_6 y + a_8 xy \end{cases} \quad (6)$$

The 8-parameter bilinear model may be represented by motion vectors of four pixels and coordinates of the four pixels relative to a top-left pixel of a current coding block. If pixels in the top-left corner (0, 0), the top-right corner (W, 0), the bottom-left corner (0, H), and the bottom-right corner (W, H) are used as control points, motion vectors (vx0, vy0), (vx1, vy1), (vx2, vy2), and (vx3, vy3) of the control points in the top-left corner, the top-right corner, the bottom-left corner, and the bottom-right corner of the current coding block are first determined. Then, motion information of each motion compensation subunit of the current coding block is derived according to the following formula (7), where (x, y) is coordinates of the motion compensation subunit relative to the top-left pixel of the current coding block, and W and H respectively represent the width and the height of the current coding block.

$$\begin{cases} v_x = \dfrac{v_{1x} - v_{0x}}{W} x + \dfrac{v_{2x} - v_{0x}}{H} y + \dfrac{v_{3x} + v_{0x} - v_{1x} - v_{2x}}{WH} y + v_{0x} \\ v_y = \dfrac{v_{1y} - v_{0y}}{W} x + \dfrac{v_{2y} - v_{0y}}{H} y + \dfrac{v_{3y} + v_{0y} - v_{1y} - v_{2y}}{WH} y + v_{0y} \end{cases} \quad (7)$$

A coding block predicted by using an affine motion model may also be referred to as an affine coding block. It can be learned from the foregoing description that the affine motion model is directly related to motion information of a control point of the affine coding block.

Usually, the motion information of the control point of the affine coding block may be obtained in an affine motion model-based AMVP mode or an affine motion model-based merge mode. Further, in the affine motion model-based AMVP mode or the affine motion model-based merge mode, the motion information of the control point of the current coding block may be obtained according to an inherited control point motion vector prediction method or a constructed control point motion vector prediction method. The following further describes the two methods.

(3) Inherited control point motion vector prediction method. In the inherited control point motion vector prediction method, a candidate control point motion vector of a current block is determined by using a motion model of a neighboring encoded affine coding block of the current block.

Figure 7:
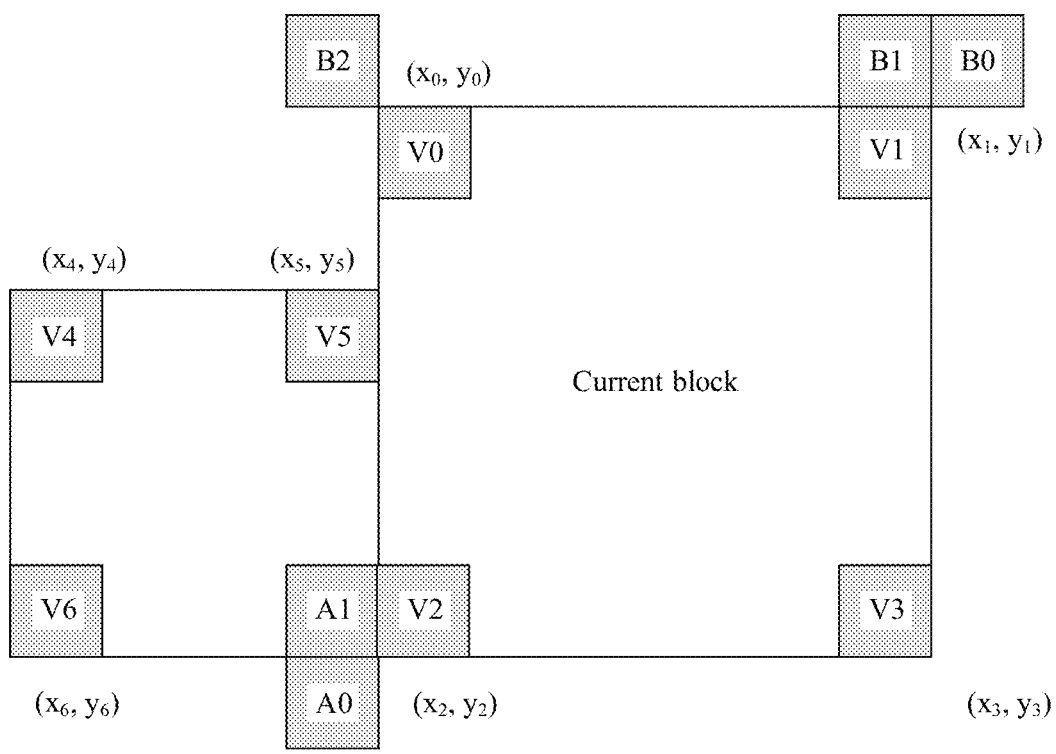
FIG. 7 is a schematic diagram of a scenario in which another example operation is performed on a current block.

A current block shown in FIG. 7 is used as an example. Neighboring-location blocks of the current block are traversed in specified order, for example, A1→B1→B0→A0→B2, to find an affine coding block in which a neighboring-location block of the current block is located, and obtain motion information of a control point of the affine coding block. Further, a control point motion vector (for a merge mode) or a control point motion vector predictor (for an AMVP mode) is derived for the current block by using a motion model constructed based on the motion information of the control point of the affine coding block. The order A1→B1→B0→A0→B2 is merely used as an example. An order of another combination is also applicable to the embodiments of the present invention. In addition, the neighboring-location blocks are not limited to A1, B1, B0, A0, and B2. The neighboring-location block may be a pixel, or may be a pixel block that is of a preset size and that is obtained through partitioning according to a specific method, for example, a 4×4 pixel block, a 4×2 pixel block, or a pixel block of another size. This is not limited. The affine coding block is an encoded block that is neighboring to the current block and that is predicted by using the affine motion model in an encoding phase (which may also be briefly referred to as a neighboring affine coding block).

The following uses A1 shown in FIG. 7 as an example to describe a process of determining the candidate control point motion vector of the current block. Other cases are deduced by analogy.

If a coding block in which A1 is located is a 4-parameter affine coding block (that is, the affine coding block is predicted by using a 4-parameter affine motion model), a motion vector (vx4, vy4) of the top-left corner (x4, y4) of the affine coding block and a motion vector (vx5, vy5) of the top-right corner (x5, y5) of the affine coding block are obtained.

Then, a motion vector (vx0, vy0) of the top-left corner (x0, y0) of the current affine coding block is obtained through calculation according to the following formula (8):

$$\begin{cases} vx_0 = vx_4 + \frac{(vx_5 - vx_4)}{x_5 - x_4} \times (x_0 - x_4) - \frac{(vy_5 - vy_4)}{x_5 - x_4} \times (y_0 - y_4) \\ vy_0 = vy_4 + \frac{(vy_5 - vy_4)}{x_5 - x_4} \times (x_0 - x_4) + \frac{(vx_5 - vx_4)}{x_5 - x_4} \times (y_0 - y_4) \end{cases} \quad (8)$$

A motion vector (vx1, vy1) of the top-right corner (x1, y1) of the current affine coding block is obtained through calculation according to the following formula (9):

$$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vy_4 + \frac{(vy_5 - vy_4)}{x_5 - x_4} \times (x_1 - x_4) + \frac{(vx_5 - vx_4)}{x_5 - x_4} \times (y_1 - y_4) \end{cases} \quad (9)$$

A combination of the motion vector (vx0, vy0) of the top-left corner (x0, y0) of the current block and the motion vector (vx1, vy1) of the top-right corner (x1, y1) of the current block that are obtained based on the affine coding block in which A1 is located is the candidate control point motion vector of the current block.

If a coding block in which A1 is located is a 6-parameter affine coding block (that is, the affine coding block is predicted by using a 6-parameter affine motion model), a motion vector (vx4, vy4) of the top-left corner (x4, y4) of the affine coding block, a motion vector (vx5, vy5) of the top-right corner (x5, y5) of the affine coding block, and a motion vector (vx6, vy6) of the bottom-left corner (x6, y6) of the affine coding block are obtained.

Then, a motion vector (vx0, vy0) of the top-left corner (x0, y0) of the current block is obtained through calculation according to the following formula (10):

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (10)$$

A motion vector (vx1, vy1) of the top-right corner (x1, y1) of the current block is obtained through calculation according to the following formula (11):

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_4} \times (y_1 - y_4) \end{cases} \quad (11)$$

A motion vector (vx2, vy2) of the bottom-left corner (x2, y2) of the current block is obtained through calculation according to the following formula (12):

$$\begin{cases} vx_2 = vx_4 + \frac{(vx_5 - vx_4)}{x_5 - x_4} \times (x_2 - x_4) + \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_4} \times (y_2 - y_4) \end{cases} \quad (12)$$

A combination of the motion vector (vx0, vy0) of the top-left corner (x0, y0) of the current block, the motion vector (vx1, vy1) of the top-right corner (x1, y1) of the current block, and the motion vector (vx2, vy2) of the bottom-left corner (x2, y2) of the current block that are obtained based on the affine coding block in which A1 is located is the candidate control point motion vector of the current block.

It should be noted that another motion model, candidate location, and search and traversal order are also applicable to the embodiments of the present invention. Details are not described in the embodiments of the present invention.

It should be noted that a method for representing motion models of a neighboring coding block and a current coding block by using other control points is also applicable to the embodiments of the present invention. Details are not described herein.

(4) Constructed control point motion vector prediction method. In the constructed control point motion vector prediction method, motion vectors of neighboring encoded blocks of a control point of a current block are combined into a motion vector of the control point of the current affine coding block, and there is no need to consider whether the neighboring encoded blocks are affine coding blocks. Constructed control point motion vector prediction methods in different prediction modes (an affine motion model-based AMVP mode and an affine motion model-based merge mode) are different, and are separately described below.

A constructed control point motion vector prediction method based on the affine motion model-based AMVP mode is first described.

Figure 8:
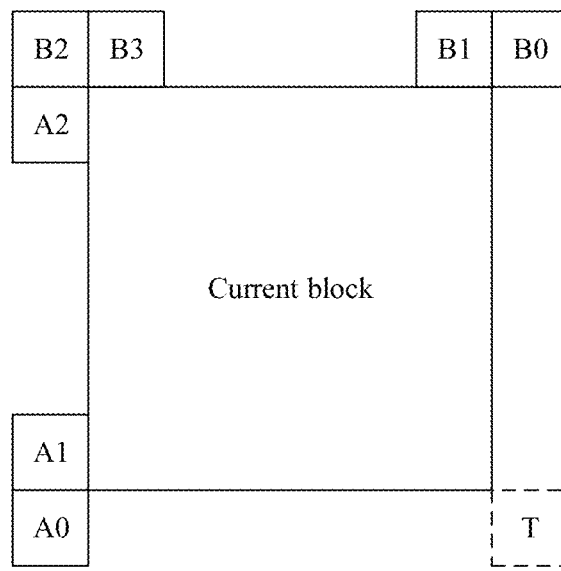
FIG. 8 is a schematic diagram of a scenario in which another example operation is performed on a current block.

FIG. 8 is used as an example to describe the constructed control point motion vector prediction method, to determine motion vectors of the top-left corner and the top-right corner of a current block by using motion information of a neighboring encoded block of the current coding block. It should be noted that FIG. 8 is merely an example.

If the current block is a 4-parameter affine coding block (that is, the current block is predicted by using a 4-parameter affine motion model), a motion vector of an encoded block A2, B2, or B3 neighboring to the top-left corner may be used as a candidate motion vector of the motion vector of the top-left corner of the current block, and a motion vector of an encoded block B1 or B0 neighboring to the top-right corner may be used as a candidate motion vector of the motion vector of the top-right corner of the current block. The candidate motion vectors of the top-left corner and the top-right corner are combined to constitute a plurality of 2-tuples. Motion vectors, of two encoded blocks, included in a 2-tuple may be used as candidate control point motion vectors of the current block. For the plurality of 2-tuples, refer to the following (13A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \\ \{v_{B3}, v_{B0}\} \quad (13A)$$

Herein, $v_{A2}$ represents the motion vector of A2, $v_{B1}$ represents the motion vector of B1, $v_{B0}$ represents the motion vector of B0, $v_{B2}$ represents the motion vector of B2, and $v_{B3}$ represents the motion vector of B3.

If the current block is a 6-parameter affine coding block (that is, the current block is predicted by using a 6-parameter affine motion model), a motion vector of an encoded block A2, B2, or B3 neighboring to the top-left corner may be used as a candidate motion vector of the motion vector of the top-left corner of the current block, a motion vector of an encoded block B1 or B0 neighboring to the top-right corner may be used as a candidate motion vector of the motion vector of the top-right corner of the current block, and a motion vector of an encoded block A0 or A1 neighboring to the bottom-left corner may be used as a candidate motion vector of a motion vector of the bottom-left corner of the current block. The candidate motion vectors of the top-left corner, the top-right corner, and the bottom-left corner are combined to constitute a plurality of triplets. Motion vectors, of three encoded blocks, included in a triplet may be used as candidate control point motion vectors of the current block. For the plurality of triplets, refer to the following formulas (13B) and (13C):

$$\{v_{A2}, v_{B1}, v_{A0}\}, \{v_{A2}, v_{B0}, v_{A0}\}, \{v_{B2}, v_{B1}, v_{A0}\}, \{v_{B2}, v_{B0}, v_{A0}\}, \{v_{B3}, v_{B1}, v_{A0}\}, \{v_{B3}, v_{B0}, v_{A0}\} \quad (13B)$$

$$\{v_{A2}, v_{B1}, v_{A1}\}, \{v_{A2}, v_{B0}, v_{A1}\}, \{v_{B2}, v_{B1}, v_{A1}\}, \{v_{B2}, v_{B0}, v_{A1}\}, \{v_{B3}, v_{B1}, v_{A1}\}, \{v_{B3}, v_{B0}, v_{A1}\} \quad (13C)$$

Herein, $v_{A2}$ represents the motion vector of A2, $v_{B1}$ represents the motion vector of B1, $v_{B0}$ represents the motion vector of B0, $v_{B2}$ represents the motion vector of B2, $v_{B3}$ represents the motion vector of B3, $v_{A0}$ represents the motion vector of A0, and $v_{A1}$ represents the motion vector of A1.

It should be noted that another control point motion vector combination method is also applicable to the embodiments of the present invention, and details are not described herein.

It should be noted that a method for representing motion models of a neighboring coding block and a current coding block by using other control points is also applicable to the embodiments of the present invention. Details are not described herein.

A constructed control point motion vector prediction method based on the affine motion model-based merge mode is described below.

Figure 9:
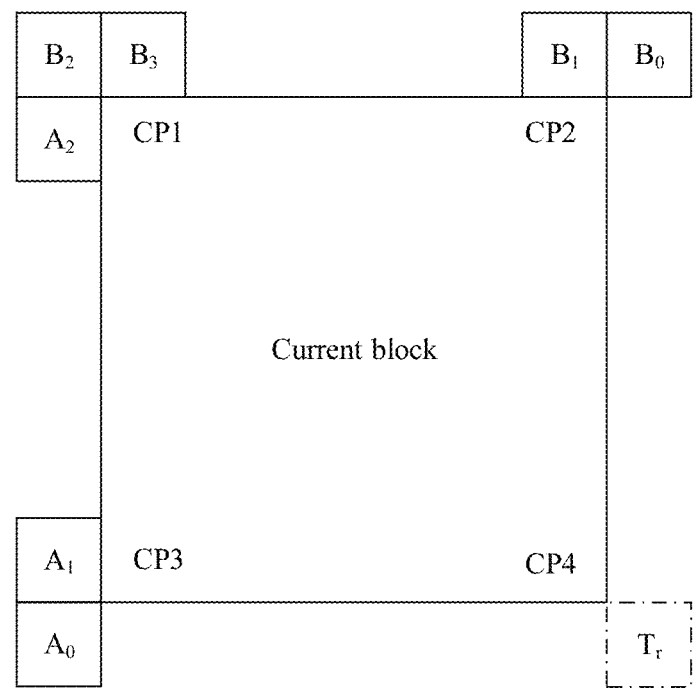
FIG. 9 is a schematic diagram of a scenario in which another example operation is performed on a current block.

FIG. 9 is used as an example to describe the constructed control point motion vector prediction method, to determine motion vectors of the top-left corner and the top-right corner of a current block by using motion information of a neighboring encoded block of the current coding block. It should be noted that FIG. 9 is merely an example.

As shown in FIG. 9, CPk (k=1, 2, 3, or 4) represents the $k^{th}$ control point. A0, A1, A2, B0, B1, B2, and B3 are spatial neighboring locations of the current block and are used to predict CP1, CP2, or CP3. T is a temporal neighboring location of the current block and is used to predict CP4. It is assumed that coordinates of CP1, CP2, CP3, and CP4 are (0, 0), (W, 0), (H, 0), and (W, H) respectively, where W and H represent the width and the height of the current block. In this case, motion information of each control point of the current block is obtained in the following order:

1. For CP1, a check order is B2-A2-B3. If B2 is available, motion information of B2 is used. If B2 is unavailable, A2 and B3 are checked. If motion information of all the three locations is unavailable, motion information of CP1 cannot be obtained.

2. For CP2, a check order is B0-B1. If B0 is available, motion information of B0 is used for CP2. If B0 is unavailable, B1 is checked. If motion information of both the locations is unavailable, motion information of CP2 cannot be obtained.

3. For CP3, a check order is A0-A1.

4. For CP4, motion information of T is used.

Herein, that X is available means that a block at a location X (X is A0, A1, A2, B0, B1, B2, B3, or T) is already encoded and an inter prediction mode is used for the block. Otherwise, the location X is unavailable. It should be noted that another method for obtaining control point motion information is also applicable to the embodiments of the present invention. Details are not described herein.

Then, control point motion information of the current block is combined to obtain constructed control point motion information.

If the 4-parameter affine motion model is used for the current block, motion information of two control points of the current block is combined to constitute a 2-tuple, to construct the 4-parameter affine motion model. A combination of the two control points may be {CP1, CP4}, {CP2, CP3}, {CP1, CP2}, {CP2, CP4}, {CP1, CP3}, or {CP3, CP4}. For example, a 4-parameter affine motion model constructed by using a 2-tuple including the control points CP1 and CP2 may be denoted as Affine (CP1, CP2).

If the 6-parameter affine motion model is used for the current block, motion information of three control points of the current block is combined to constitute a triplet, to construct the 6-parameter affine motion model. A combination of the three control points may be {CP1, CP2, CP4}, {CP1, CP2, CP3}, {CP2, CP3, CP4}, or {CP1, CP3, CP4}.

For example, a 6-parameter affine motion model constructed by using a triplet including the control points CP1, CP2, and CP3 may be denoted as Affine (CP1, CP2, CP3).

If an 8-parameter bilinear model is used for the current block, motion information of four control points of the current block is combined to constitute a quadruple, to construct the 8-parameter bilinear model. An 8-parameter bilinear model constructed by using a quadruple including the control points CP1, CP2, CP3, and CP4 is denoted as Bilinear (CP1, CP2, CP3, CP4).

In the embodiments of the present invention, for ease of description, a combination of motion information of two control points (or two encoded blocks) is referred to as a 2-tuple for short, a combination of motion information of three control points (or three encoded blocks) is referred to as a triplet for short, and a combination of motion information of four control points (or four encoded blocks) is referred to as a quadruple for short.

These models are traversed in a preset order. If motion information of a control point corresponding to a combination model is unavailable, it is considered that the model is unavailable. If motion information of a control point corresponding to a combination model is available, a reference frame index of the model is determined, and a motion vector of the control point is scaled. If motion information of all control points after scaling is consistent, the model is invalid. If it is determined that all motion information of control points controlling the model is available, and the model is valid, the motion information of the control points used to construct the model is added to a motion information candidate list.

A method for scaling a control point motion vector is shown in the following formula (14):

$$MV_s = \frac{CurPoc - DesPoc}{CurPoc - SrcPoc} \times MV \qquad (14)$$

Herein, CurPoc represents a POC of a current frame, DesPoc represents a POC of a reference frame of a current block, SrcPoc represents a POC of a reference frame of a control point, $MV_s$ represents a motion vector obtained through scaling, and MV represents a motion vector of the control point.

It should be noted that different combinations of control points may be converted into control points at a same location.

For example, a 4-parameter affine motion model obtained based on a combination of {CP1, CP4}, {CP2, CP3}, {CP2, CP4}, {CP1, CP3}, or {CP3, CP4} is represented by {CP1, CP2} or {CP1, CP2, CP3} after conversion. A conversion method is: substituting a motion vector and coordinate information of a control point into the foregoing formula (2), to obtain a model parameter; and then substituting coordinate information of {CP1, CP2} into the foregoing formula (3), to obtain motion vectors of CP1 and CP2.

More directly, conversion may be performed according to the following formulas (15) to (23), where W represents the width of the current block, and H represents the height of the current block. In the formulas (15) to (23), $(vx_0, vy_0)$ represents the motion vector of CP1, $(vx_1, vy_1)$ represents the motion vector of CP2, $(vx_2, vy_2)$ represents the motion vector of CP3, and $(vx_3, vy_3)$ represents the motion vector of CP4.

{CP1, CP2} may be converted into {CP1, CP2, CP3} according to the following formula (15). In other words, the motion vector of CP3 in {CP1, CP2, CP3} may be determined according to the formula (15):

$$\begin{cases} vx_2 = -\dfrac{vy_1 - vy_0}{W} H + vx_0 \\ vy_2 = +\dfrac{vx_1 - vx_0}{W} H + vy_0 \end{cases} \qquad (15)$$

{CP1, CP3} may be converted into {CP1, CP2} or {CP1, CP2, CP3} according to the following formula (16):

$$\begin{cases} vx_1 = +\dfrac{vy_2 - vy_0}{H} W + vx_0 \\ vy_1 = -\dfrac{vx_2 - vx_0}{H} W + vy_0 \end{cases} \qquad (16)$$

{CP2, CP3} may be converted into {CP1, CP2} or {CP1, CP2, CP3} according to the following formula (17):

$$\begin{cases} vx_0 = \dfrac{vx_2 - vx_1}{W*W + H*H} W*W - \dfrac{vy_2 - vy_1}{W*W + H*H} H*W + vx_1 \\ vy_0 = \dfrac{vy_2 - vy_1}{W*W + H*H} W*W + \dfrac{vx_2 - vx_1}{W*W + H*H} H*W + vy_1 \end{cases} \qquad (17)$$

{CP1, CP4} may be converted into {CP1, CP2} or {CP1, CP2, CP3} according to the following formula (18) or (19):

$$\begin{cases} vx_1 = \dfrac{vx_3 - vx_0}{W*W + H*H} W*W + \dfrac{vy_3 - vy_0}{W*W + H*H} H*W + vx_0 \\ vy_1 = \dfrac{vy_3 - vy_0}{W*W + H*H} W*W - \dfrac{vx_3 - vx_0}{W*W + H*H} H*W + vy_0 \end{cases} \qquad (18)$$

$$\begin{cases} vx_2 = \dfrac{vx_3 - vx_0}{W*W + H*H} H*H - \dfrac{vy_3 - vy_0}{W*W + H*H} H*W + vx_0 \\ vy_2 = \dfrac{vy_3 - vy_0}{W*W + H*H} W*H + \dfrac{vx_3 - vx_0}{W*W + H*H} H*H + vy_0 \end{cases} \qquad (19)$$

{CP2, CP4} may be converted into {CP1, CP2} according to thefollowing formula (20), and {CP2, CP4} may be converted into {CP1, CP2, CP3} according to the following formulas (20) and (21):

$$\begin{cases} vx_0 = -\dfrac{vy_3 - vy_1}{H} W + vx_1 \\ vy_0 = +\dfrac{vx_3 - vx_1}{H} W + vy_1 \end{cases} \qquad (20)$$

$$\begin{cases} vx_2 = -\dfrac{vy_3 - vy_1}{H} W + vx_3 \\ vy_2 = +\dfrac{vx_3 - vx_1}{H} W + vy_3 \end{cases} \qquad (21)$$

{CP3, CP4} may be converted into {CP1, CP2} according to the following formula (22), and {CP3, CP4} may be converted into {CP1, CP2, CP3} according to the following formulas (22) and (23):

$$\begin{cases} vx_0 = +\dfrac{vy_3 - vy_2}{W} H + vx_2 \\ vy_0 = -\dfrac{vx_3 - vx_2}{W} H + vy_2 \end{cases} \qquad (22)$$

$$\begin{cases} vx_1 = +\dfrac{vy_3 - vy_2}{W}H + vx_3 \\ vy_1 = -\dfrac{vx_3 - vx_2}{W}H + vy_3 \end{cases} \quad (23)$$

For example, a 6-parameter affine motion model obtained based on a combination {CP1, CP2, CP4}, {CP2, CP3, CP4}, or {CP1, CP3, CP4} is represented by {CP1, CP2, CP3} after conversion. A conversion method is: substituting a motion vector and coordinate information of a control point into the foregoing formula (4), to obtain a model parameter; and then substituting coordinate information of {CP1, CP2, CP3} into the foregoing formula (5), to obtain motion vectors of CP1, CP2, and CP3.

More directly, conversion may be performed according to the following formulas (24) to (26), where W represents the width of the current block, and H represents the height of the current block. In the formulas (24) to (26), $(vx_0, vy_0)$ represents the motion vector of CP1, $(vx_1, vy_1)$ represents the motion vector of CP2, $(vx_2, vy_2)$ represents the motion vector of CP3, and $(vx_3, vy_3)$ represents the motion vector of CP4.

{CP1, CP2, CP4} may be converted into {CP1, CP2, CP3} according to a formula (24):

$$\begin{cases} vx_2 = vx_3 + vx_0 - vx_1 \\ vy_2 = vy_3 + vy_0 - vy_1 \end{cases} \quad (24)$$

{CP2, CP3, CP4} may be converted into {CP1, CP2, CP3} according to a formula (25):

$$\begin{cases} vx_0 = vx_1 + vx_2 - vx_3 \\ vy_0 = vy_1 + vy_2 - vy_3 \end{cases} \quad (25)$$

{CP1, CP3, CP4} may be converted into {CP1, CP2, CP3} according to a formula (26):

$$\begin{cases} vx_1 = vx_3 + vx_0 - vx_2 \\ vy_1 = vy_3 + vy_0 - vy_2 \end{cases} \quad (26)$$

In a specific embodiment, after currently constructed control point motion information is added to a candidate motion vector list, if a length of the candidate list is less than a maximum list length (for example, MaxAffineNumMrgCand), these combinations are traversed in a preset order, and an obtained valid combination is used as candidate control point motion information. If the candidate motion vector list is empty, the candidate control point motion information is added to the candidate motion vector list. If the candidate motion vector list is not empty, motion information in the candidate motion vector list is successively traversed, and whether motion information that is the same as the candidate control point motion information exists in the candidate motion vector list is checked. If no motion information that is the same as the candidate control point motion information exists in the candidate motion vector list, the candidate control point motion information is added to the candidate motion vector list.

For example, a preset order is as follows: Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are 10 combinations in total.

If control point motion information corresponding to a combination is unavailable, it is considered that the combination is unavailable. If a combination is available, a reference frame index of the combination is determined (when there are two control points, a minimum reference frame index is selected as the reference frame index of the combination; or when there are more than two control points, a reference frame index with a maximum presence frequency is selected as the reference frame index of the combination, and if a plurality of reference frame indices have a same presence frequency, a minimum reference frame index is selected as the reference frame index of the combination). Control point motion vectors are scaled. If motion information of all control points after scaling is consistent, the combination is invalid.

Optionally, in the embodiments of the present invention, the candidate motion vector list may alternatively be padded. For example, after the foregoing traversal process, if the length of the candidate motion vector list is less than the maximum list length (for example, MaxAffineNumMrgCand), the candidate motion vector list may be padded until the list length is equal to the maximum list length.

Padding may be performed by using a zero motion vector padding method, or by using a method for combining or weighted-averaging existing candidate motion information in the existing list. It should be noted that another method for padding the candidate motion vector list is also applicable to the embodiments of the present invention. Details are not described herein.

Based on the foregoing description, the following further describes the affine motion model-based AMVP mode (Affine AMVP mode) and the affine motion model-based merge mode (Affine Merge mode).

The affine motion model-based AMVP mode is first described.

For the affine motion model-based advanced motion vector prediction mode, a candidate motion vector list in the affine motion model-based AMVP mode may be constructed by using an inherited control point motion vector prediction method and/or a constructed control point motion vector prediction method. In the embodiments of the present invention, the candidate motion vector list in the affine motion model-based AMVP mode may be referred to as a control point motion vector predictor candidate list. Control point motion vector predictors in the list include two candidate control point motion vectors (for example, in a case in which a 4-parameter affine motion model is used for a current block) or three candidate control point motion vectors (for example, in a case in which a 6-parameter affine motion model is used for a current block).

In a possible application scenario, the control point motion vector predictor candidate list may further be pruned and sorted according to a particular rule, and may be truncated or padded to obtain control point motion vector predictors of a particular quantity.

Then, on an encoder side, an encoder (for example, the foregoing encoder 20) obtains a motion vector of each motion compensation subunit of a current coding block by using each control point motion vector predictor in the control point motion vector predictor candidate list according to the formula (3), (5), or (7). Further, the encoder obtains a pixel value of a corresponding location in a reference frame to which the motion vector of each motion compensation subunit points, and uses the pixel value as a predicted value of the motion compensation subunit to perform affine motion model-based motion compensation. An average value of differences between original values and predicted values of all pixels in the current coding block is calculated. A control point motion vector predictor corresponding to a minimum average value is selected as an optimal control point motion vector predictor, and used as motion vector predictors of two, three, or four control points of the current coding block. In addition, on the encoder side, a control point motion vector predictor may further be used as a start search point to perform motion search within a specific search range to obtain a control point motion vector (CPMV), and a difference (control point motion vector differences, CPMVD) between the control point motion vector and the control point motion vector predictor is calculated. Then, the encoder encodes an index value indicating a location of the control point motion vector predictor in the control point motion vector predictor candidate list and the CPMVD into a bitstream, and transfers the bitstream to a decoder side.

On the decoder side, a decoder (for example, the foregoing decoder 30) parses the bitstream to obtain the index value and the control point motion vector difference (CPMVD), determines the control point motion vector predictor (CPMVP) in the control point motion vector predictor candidate list based on the index value, and adds the CPMVP and the CPMVD to obtain the control point motion vector.

The following describes the affine motion model-based merge mode.

For the affine motion model-based merge mode, a control point motion vector merge candidate list may be constructed by using an inherited control point motion vector prediction method and/or a constructed control point motion vector prediction method.

In a possible application scenario, the control point motion vector merge candidate list may be pruned and sorted according to a particular rule, and may be truncated or padded to obtain control point motion vectors of a particular quantity.

Then, on an encoder side, an encoder (for example, the foregoing encoder 20) obtains a motion vector of each motion compensation subunit (pixel or pixel block that is obtained through partitioning according to a particular method and whose size is $N_1 \times N_2$) of a current coding block by using each control point motion vector in the merge candidate list according to the formula (3), (5), or (7). Further, the encoder obtains a pixel value of a location in a reference frame to which the motion vector of each motion compensation subunit points, and uses the pixel value as a predicted value of the motion compensation subunit to perform affine motion compensation. An average value of differences between original values and predicted values of all pixels in the current coding block is calculated. A control point motion vector corresponding to a minimum average value is selected as motion vectors of two, three, or four control points of the current coding block. An index value indicating a location of the control point motion vector in the candidate list is encoded into a bitstream and sent to a decoder side.

On the decoder side, a decoder (for example, the foregoing decoder 30) parses the bitstream to obtain the index value, and determines the control point motion vector (CPMV) in the control point motion vector merge candidate list based on the index value.

In addition, it should be noted that, in the embodiments of the present invention, "at least one" means one or more, and "a plurality of" means two or more than two. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between the associated objects. The term "at least one of the following items (pieces)" or an expression similar to the term indicates any combination of the items, and includes a single item (piece) or any combination of a plurality of items (pieces). For example, at least one of a, b, or c may indicate: a, b, c, a-b, a-c, b-c, or a-b-c, where a, b, and c may be singular or plural.

In the embodiments of the present invention, an encoder side may use a syntax element to indicate, to a decoder side, an inter prediction mode of a current block, an affine motion model used for the current block, and other related information.

For a part of a currently used syntax structure of the inter prediction mode used for parsing the current block, refer to Table 1. It should be noted that a syntax element in the syntax structure may be alternatively represented by another identifier. This is not specifically limited in the embodiments of the present invention.

TABLE 1

| coding_unit(x0,y0,cbWidth,cbHeight) { | Descriptor (descriptor) |
|---|---|
| ... | |
| merge_flag[x0][y0] | ae(v) |
| if(merge_flag[ x0 ][ y0 ] ) { | |
| if ( allowAffineMerge ) | |
| affine_merge_flag[ x0 ][ y0 ] | ae(v) |
| if( MaxNumMergeCand > 1 && affine_merge_flag[ x0 ][ y0 ] == 0) | |
| merge_idx[ x0 ][ y0 ] | ae(v) |
| if( MaxNumAffineMergeCand > 1 && affine_merge_flag[ x0 ][ y0 ]) | |
| affine_merge_idx[ x0 ][ y0 ] | ae(v) |
| } else { | |
| if( slice_type = = B ) | |
| inter_pred_idc[ x0 ][ y0 ] | ae(v) |
| if( allowAffineInter ) { | |
| affine_inter_flag[ x0 ][ y0 ] | ae(v) |
| if( affine_inter_flag[ x0 ][ y0 ] ) | |
| affine_type_flag[ x0 ][ y0 ] | ae(v) |
| } | |
| MotionModelIdc[ x0 ][ y0 ] = affine_inter_flag[ x0 ][ y0 ] + affine_type_flag[ x0 ][ y0 ] | |
| if( inter_pred_idc[ x0 ][ y0 ] != PRED_L1 ) { | |
| if( num_ref_idx_l0_active_minus1 > 0 ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) { | |
| mvd_coding( x0, y0, 0, 1 ) | |
| if(MotionModelIdc[ x0 ][ y0 ] > 1 ) | |
| mvd_coding( x0, y0, 0, 2 ) | |
| } | |
| mvp_l0_flag[ x0 ][ y0 ] | ae(v) |
| } | |
| if( inter_pred_idc[ x0 ][ y0 ] != PRED_L0 ) { | |
| if( num_ref_idx_l1_active_minus1 > 0 ) | |
| ref_idx_l1[ x0 ][ y0 ] | ae(v) |
| mvd_coding( x0, y0, 1, 0 ) | |
| if( MotionModelIdc[ x0 ][ y0 ] > 0 ) { | |
| mvd_coding( x0, y0, 1, 1 ) | |
| if( MotionModelIdc[ x0 ][ y0 ] > 1 ) | |

TABLE 1-continued

| coding_unit(x0,y0,cbWidth,cbHeight) { | Descriptor (descriptor) |
|---|---|
|     mvd_coding( x0, y0, 1, 2 ) | |
|     } | |
|     mvp_l1_flag[ x0 ][ y0 ] | ae(v) |
|     } | |
| } | |
| ... | |
| } | |

In Table 1, ae(v) represents a syntax element encoded through context-adaptive binary arithmetic coding (context-adaptive binary arithmetic coding, CABAC).

A syntax element merge_flag[x0][y0] may be used to indicate whether the merge mode is used for the current block. For example, when merge_flag[x0][y0]=1, it indicates that the merge mode is used for the current block; or when merge_flag[x0] [y0]=0, it indicates that the merge mode is not used for the current block. x0 and y0 represent coordinates of the current block in a video picture.

A variable allowAffmneMerge may be used to indicate whether the current block satisfies a condition for using the affmne motion model-based merge mode. For example, allowAffmneMerge=0 indicates that the condition for using the affmne motion model-based merge mode is not satisfied, and allowAffmneMerge=1 indicates that the condition for using the affmne motion model-based merge mode is satisfied. The condition for using the affmne motion model-based merge mode may be: Both the width and the height of the current block are greater than or equal to 8. cbWidth represents the width of the current block, and cbHeight represents the height of the current block. In other words, when cbWidth<8 or cbHeight<8, allowAffmneMerge=0; or when cbWidth≥8 and cbHeight≥8, allowAffmneMerge=1.

A variable allowAffmneInter may be used to indicate whether the current block satisfies a condition for using the affmne motion model-based AMVP mode. For example, allowAffineInter=0 indicates that the condition for using the affmne motion model-based AMVP mode is not satisfied, and allowAffineInter=1 indicates that the condition for using the affine motion model-based AMVP mode is satisfied. The condition for using the affine motion model-based AMVP mode may be: Both the width and the height of the current block are greater than or equal to 16. In other words, when cbWidth<16 or cbHeight<16, allowAffineInter=0; or when cbWidth≥16 and cbHeight≥16, allowAffineInter=1.

A syntax element affine_merge_flag[x0][y0] may be used to indicate whether the affine motion model-based merge mode is used for the current block. A type (slice_type) of a slice in which the current block is located is a P type or a B type. For example, affine_merge_flag[x0][y0]=1 indicates that the affine motion model-based merge mode is used for the current block; and affine_merge_flag[x0][y0]=0 indicates that the affine motion model-based merge mode is not used for the current block, but a translational motion model-based merge mode may be used.

A syntax element merge_idx[x0][y0] may be used to indicate an index for a merge candidate list.

A syntax element affine_merge_idx[x0][y0] may be used to indicate an index for an affine merge candidate list.

A syntax element affine_inter_flag[x0][y0] may be used to indicate whether the affine motion model-based AMVP mode is used for the current block when the slice in which the current block is located is a P-type slice or a B-type slice.

For example, affine_inter_flag[x0][y0]=0 indicates that the affine motion model-based AMVP mode is used for the current block, and affine_inter_flag[x0][y0]=1 indicates that the affine motion model-based AMVP mode is not used for the current block, but a translational motion model-based AMVP mode may be used.

A syntax element affine_type_flag[x0][y0] may be used to indicate whether the 6-parameter affine motion model is used to perform motion compensation for the current block when the slice in which the current block is located is a P-type slice or a B-type slice. affine_type_flag[x0][y0]=0 indicates that the 6-parameter affine motion model is not used to perform motion compensation for the current block, and only the 4-parameter affine motion model may be used to perform motion compensation. affine_type_flag[x0][y0]=1 indicates that the 6-parameter affine motion model is used to perform motion compensation for the current block.

Variables MaxNumMergeCand and MaxAffineNumMrgCand are used to represent a maximum list length, and indicate a maximum length of a constructed candidate motion vector list. inter_pred_idc[x0][y0] is used to indicate a prediction direction. PRED_L1 is used to indicate backward prediction. num_ref_idx_l0_active_minus1 indicates a quantity of reference frames in a forward reference frame list, and ref_idx_l0[x0][y0] indicates an index value for a forward reference frame of the current block. mvd_coding(x0, y0, 0, 0) indicates a first motion vector difference. mvp_l0_flag [x0][y0] indicates an index value for a forward MVP candidate list. PRED_L0 indicates forward prediction. num_ref_idx_l1_active_minus1 indicates a quantity of reference frames in a backward reference frame list. ref_idx_l1 [x0][y0] indicates an index value for a backward reference frame of the current block, and mvp_l1_flag[x0][y0] indicates an index value for a backward MVP candidate list.

As shown in Table 2, when MotionModelIdc[x0][y0]=1, it indicates that the 4-parameter affine motion model is used; when MotionModelIdc[x0][y0]=2, it indicates that the 6-parameter affine motion model is used; or when MotionModelIdc[x0][y0]=0, it indicates that the translational motion model is used.

TABLE 2

| MotionModelIdc[ x0 ][ y0 ] | Motion model for motion compensation |
|---|---|
| 0 | Translational motion |
| 1 | 4-parameter affine motion |
| 2 | 6-parameter affine motion |

It should be noted that Table 1 and Table 2 are merely examples. In actual application, Table 1 and Table 2 may include more or less content. For example, MotionModelIdc [x0][y0] in Table 2 may alternatively include another value, and the value may be used to indicate that an 8-parameter bilinear model is used, or the like.

In an existing method, after obtaining a motion vector of each subblock of a current block in an inter prediction mode, an encoder side or a decoder side needs to store the motion vector for subsequent motion compensation. In addition, the obtained motion vector is further used for another subsequent decoding process, for example, used for motion vector prediction in a neighboring block decoding process or filtering strength decision in deblocking filtering. An obtained motion vector of a control point of the current block also needs to be stored, so that the motion vector is used subsequently when an inherited control point motion vector prediction method is used for a neighboring to-be-encoded/decoded block. Therefore, in this case, for the current block, there are two types of motion vectors: the motion vector of each subblock and the motion vector of the control point. In an existing solution, to avoid storing the two types of motion vectors, the motion vector of the control point is used to overwrite a motion vector of a subblock in which the control point is located. For example, if an affine motion model used for a current affine coding block is a 4-parameter affine motion model, motion vectors of a top-left subblock and a top-right subblock are set to motion vectors of a top-left control point and a top-right control point. For example, if an affine motion model used for a current affine coding block is a 6-parameter affine motion model, motion vectors of a top-left subblock, a top-right subblock, and a bottom-left subblock are set to motion vectors of a top-left control point, a top-right control point, and a bottom-left control point. In this method, although a motion vector storage problem is resolved, because a motion vector inconsistent with that used for another subblock is used to perform motion compensation for the subblock in which the control point is located, prediction is inaccurate, and coding efficiency is reduced.

To overcome disadvantages in the prior art, resolve a motion vector storage problem, improve prediction accuracy in a coding process, and improve coding efficiency, the foregoing inherited control point motion vector prediction method is improved in the embodiments of the present invention.

In an improved inherited control point motion vector prediction method provided in the embodiments of the present invention, in a process of determining a candidate control point motion vector of a current block, candidate control point motion vectors of the current block are derived by using motion vectors of at least two subblocks of a neighboring affine coding block (or neighboring affine decoding block), instead of using motion vectors of control points of the neighboring affine coding block (or neighboring affine decoding block). After a motion vector of a subblock of each neighboring affine coding block (or neighboring affine decoding block) is derived, a motion vector of a control point does not need to be stored. To be specific, the motion vector of the control point of the current block is only used to derive a motion vector of a subblock of the current block, but is not used for motion vector prediction for another to-be-processed neighboring block subsequently. Therefore, in the solutions of the present invention, only the motion vector of the subblock needs to be stored, and motion compensation is performed by using the motion vector of the subblock. This resolves a motion vector storage problem, and improves prediction accuracy and coding efficiency.

The neighboring affine coding block is an encoded block that is neighboring to the current block and that is predicted by using an affine motion model in an encoding phase, and the neighboring affine decoding block is a decoded block that is neighboring to the current block and that is predicted by using the affine motion model in a decoding phase. In this specification, for the current block, W may be used to represent the width of the current block, and H may be used to represent the height of the current block. For the neighboring affine coding block, U may be used to represent the width of the neighboring affine coding block, and V may be used to represent the height of the neighboring affine coding block.

The following further describes in detail some specific implementations of the improved inherited control point motion vector prediction method. It should be noted that, the following describes the improved inherited control point motion vector prediction method from a perspective of a decoder side. For the improved inherited control point motion vector prediction method on an encoder side, refer to the following description for implementation. For brevity of the specification, details are not described again.

Some examples of the improved inherited control point motion vector prediction method are first described when the neighboring affine coding block is a 4-parameter affine coding block.

In an example, if the neighboring affine coding block is a 4-parameter affine coding block, motion vectors of two subblocks in the neighboring affine coding block and coordinates of center points of the two subblocks are obtained (where a distance between horizontal coordinates of the center points of the subblocks is P, and vertical coordinates of the center points of the subblocks are the same), to form a 4-parameter affine motion model to derive a motion vector of a control point of a current affine coding block, where P is less than the width U of the neighboring affine coding block, and P is a power of 2.

In another example, if the neighboring affine coding block is a 4-parameter affine coding block, motion vectors of two subblocks in the neighboring affine coding block and coordinates of center points of the two subblocks are obtained (where a distance between vertical coordinates of the center points of the subblocks is Q, and horizontal coordinates of the center points of the subblocks are the same), to form a 4-parameter affine motion model to derive a motion vector of a control point of a current affine coding block, where Q is less than the height V of the neighboring affine coding block, and Q is a power of 2.

Some examples of the improved inherited control point motion vector prediction method are subsequently described when the neighboring affine coding block is a 6-parameter affine coding block.

In an example, if the neighboring affine coding block is a 6-parameter affine coding block, motion vectors of two subblocks (for example, referred to as a first subblock and a second subblock) in the neighboring affine coding block and coordinates of center points of the two subblocks are obtained (where a distance between horizontal coordinates of the center points of the subblocks is P, and vertical coordinates of the center points of the subblocks are the same), and then a motion vector of a subblock in the neighboring affine coding block and coordinates of a center point of the subblock are obtained (where a horizontal coordinate of the center point of the subblock is the same as a horizontal coordinate of a center point of the first subblock, and a distance between a vertical coordinate of the center point of the subblock and a vertical coordinate of the center point of the first subblock is Q), to form a 6-parameter affine motion model to derive a motion vector of a control point of a current affine coding block, where P is less than the width U of the neighboring affine coding block, P is a power of 2, Q is less than the height V of the neighboring affine coding block, and Q is a power of 2.

In another example, if the neighboring affine coding block is a 6-parameter affine coding block, motion vectors of two subblocks (for example, referred to as a first subblock and a second subblock) in the neighboring affine coding block and coordinates of center points of the two subblocks are obtained (where a distance between horizontal coordinates of the center points of the subblocks is P, and vertical coordinates of the center points of the subblocks are the same), and then a motion vector of a subblock in the neighboring affine coding block and coordinates of a center point of the subblock are obtained (where a horizontal coordinate of the center point of the subblock is the same as a horizontal coordinate of a center point of the second subblock, and a distance between a vertical coordinate of the center point of the subblock and a vertical coordinate of the center point of the second subblock is Q), to form a 6-parameter affine motion model to derive a motion vector of a control point of a current affine coding block, where P is less than the width U of the neighboring affine coding block, P is a power of 2, Q is less than the height V of the neighboring affine coding block, and Q is a power of 2.

In another example, a parameter type of the neighboring affine coding block is not considered, but motion vectors of two subblocks (for example, referred to as a first subblock and a second subblock) in the neighboring affine coding block and coordinates of center points of the two subblocks are directly obtained (where a distance between horizontal coordinates of the center points of the subblocks is P, and vertical coordinates of the center points of the subblocks are the same), and then a motion vector of a subblock in the neighboring affine coding block and coordinates of a center point of the subblock are obtained (where a horizontal coordinate of the center point of the subblock is the same as a horizontal coordinate of a center point of the first subblock, and a distance between a vertical coordinate of the center point of the subblock and a vertical coordinate of the center point of the first subblock is Q), to form a 6-parameter affine motion model to derive a motion vector of a control point of a current affine coding block, where P is less than the width U of the neighboring affine coding block, P is a power of 2, Q is less than the height V of the neighboring affine coding block, and Q is a power of 2.

It should be noted that, in the embodiments of the present invention, the distance between the center points of the two subblocks is a power of 2. This helps implement motion vector derivation in a shift manner, so that implementation complexity is reduced.

It should be further noted that, in the foregoing examples, the center point of the subblock is merely used for ease of description. In actual application, a coordinate location, of the subblock, used for the neighboring affine coding block (which may be briefly referred to as a preset subblock location of the neighboring affine coding block) needs to be consistent with a location used to calculate a motion vector of the subblock in coding (to be specific, for the subblock of the neighboring affine coding block, a motion vector of a pixel at a preset location in the subblock is used to represent motion vectors of all pixels in the subblock). Therefore, there may be various types of preset subblock locations. For example, the preset subblock location is a location of a top-left pixel in the subblock of the neighboring affine coding block. To be specific, if the top-left pixel is used to calculate the motion vector of the subblock in coding, coordinates of the top-left pixel of the subblock should also be used in the foregoing examples. For another example, the preset subblock location is a location of a pixel closest to a geometric center in the subblock of the neighboring affine coding block. For another example, the preset subblock location is a location of a top-right pixel in the subblock of the neighboring affine coding block.

For ease of description, a subblock center point is used as an example for description in the following examples. For an implementation of another subblock location, refer to the description. Details are not described again.

In a possible application scenario of the embodiments of the present invention, an affine coding block use condition may be limited, so that the neighboring affine coding block can be partitioned into at least two subblocks in a horizontal direction and partitioned into at least two subblocks in a vertical direction. For example, it is assumed that a size of the subblock is M×N, where M is an integer such as 4, 8, or 16, and N is an integer such as 4, 8, or 16. In this case, an allowed size of the affine coding block is that the width W is greater than or equal to 2M and the height H is greater than or equal to 2N. When a size of a current coding unit does not satisfy the affine coding block use condition, an affine-related syntax element, such as affine_inter_flag or affine_merge_flag in Table 1, may not need to be parsed.

Figure 10:
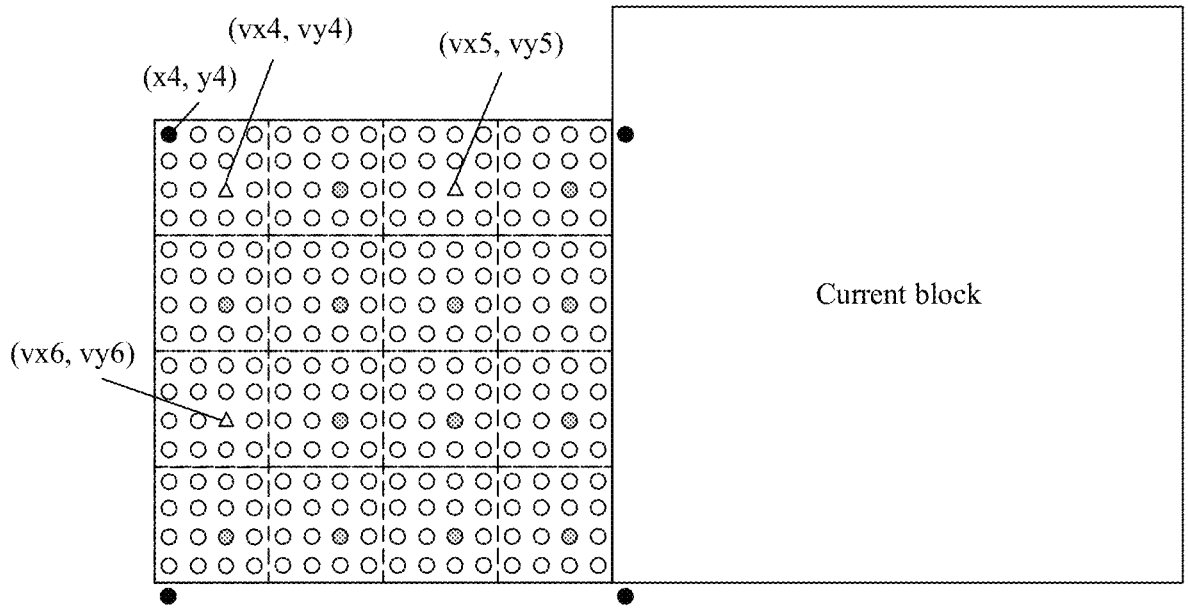
FIG. 10 is a schematic diagram of a scenario in which another example operation is performed on a current block.

In an embodiment of the present invention, it is assumed that the neighboring affine coding block is a 4-parameter affine coding block. As shown in FIG. 10, if coordinates of the top-left corner of the neighboring affine coding block of the current block are (x4, y4), the width is U, the height is V, and a size of a subblock obtained through partitioning is M×N (for example, a size of a subblock of a neighboring affine coding block shown in FIG. 10 is 4×4), a motion vector (vx4, vy4) of a location (x4+M/2, y4+N/2) and a motion vector (vx5, vy5) of a location (x4+M/2+P, y4+N/2) are obtained to form a 4-parameter affine motion model.

Then, a motion vector (vx0, vy0) of a top-left control point (x0, y0) of the current affine coding block is obtained through calculation according to the following formula (27):

$$\begin{cases} vx_0 = vx_4 + \dfrac{(vx_5 - vx_4)}{P} \times (x_0 - x_4 - M/2) - \\ \qquad \dfrac{(vy_5 - vy_4)}{P} \times (y_0 - y_4 - N/2) \\ vy_0 = vy_4 + \dfrac{(vy_5 - vy_4)}{P} \times (x_0 - x_4 - M/2) + \\ \qquad \dfrac{(vx_5 - vx_4)}{P} \times (y_0 - y_4 - N/2) \end{cases} \quad (27)$$

A motion vector (vx1, vy1) of a top-right control point (x1, y1) of the current affine coding block is obtained through calculation according to the following formula (28). Optionally, a value of (x1, y1) herein may be set to (x0+W, y0), where W is the width of the current block.

$$\begin{cases} vx_1 = vx_4 + \dfrac{(vx_5 - vx_4)}{P} \times (x_1 - x_4 - M/2) - \\ \qquad \dfrac{(vy_5 - vy_4)}{P} \times (y_1 - y_4 - N/2) \\ vy_1 = vy_4 + \dfrac{(vy_5 - vy_4)}{P} \times (x_1 - x_4 - M/2) + \\ \qquad \dfrac{(vx_5 - vx_4)}{P} \times (y_1 - y_4 - N/2) \end{cases} \quad (28)$$

Optionally (for example, the current block is a 6-parameter affine coding block), a motion vector (vx2, vy2) of a bottom-left control point (x2, y2) of the current affine coding block is obtained through calculation according to the following formula (29). Optionally, a value of (x2, y2) herein may be set to (x0, y0+H), where H is the height of the current block.

$$\begin{cases} vx_2 = vx_4 + \dfrac{(vx_5 - vx_4)}{P} \times (x_2 - x_4 - M/2) - \\ \quad\quad \dfrac{(vy_5 - vy_4)}{P} \times (y_2 - y_4 - N/2) \\ vy_2 = vy_4 + \dfrac{(vy_5 - vy_4)}{P} \times (x_2 - x_4 - M/2) + \\ \quad\quad \dfrac{(vx_5 - vx_4)}{P} \times (y_2 - y_4 - N/2) \end{cases} \quad (29)$$

In an embodiment of the present invention, it is assumed that the neighboring affine coding block is a 6-parameter affine coding block. FIG. 10 is still used as an example. If coordinates of the top-left corner of the neighboring affine coding block of the current block are (x4, y4), the width is U, the height is V, and a size of a subblock obtained through partitioning is M×N (for example, a size of a subblock of a neighboring affine coding block shown in FIG. 10 is 4×4), a motion vector (vx4, vy4) of a location (x4+M/2, y4+N/2), a motion vector (vx5, vy5) of a location (x4+M/2+P, y4+N/2), and a motion vector (vx6, vy6) of a location (x4+M/2, y4+N/2+Q) are obtained to form a 6-parameter affine motion model.

Then, a motion vector (vx0, vy0) of a top-left control point (x0, y0) of the current affine coding block is obtained through calculation according to the following formula (30):

$$\begin{cases} vx_0 = vx_4 + \dfrac{(vx_5 - vx_4)}{P} \times (x_0 - x_4 - M/2) + \\ \quad\quad \dfrac{(vx_6 - vx_4)}{Q} \times (y_0 - y_4 - N/2) \\ vy_0 = vy_4 + \dfrac{(vy_5 - vy_4)}{P} \times (x_0 - x_4 - M/2) + \\ \quad\quad \dfrac{(vy_6 - vy_4)}{Q} \times (y_0 - y_4 - N/2) \end{cases} \quad (30)$$

A motion vector (vx1, vy1) of a top-right control point (x1, y1) of the current affine coding block is obtained through calculation according to the following formula (31). Optionally, a value of (x1, y1) herein may be set to (x0+W, y0), where W is the width of the current block.

$$\begin{cases} vx_1 = vx_4 + \dfrac{(vx_5 - vx_4)}{P} \times (x_1 - x_4 - M/2) + \\ \quad\quad \dfrac{(vx_6 - vx_4)}{Q} \times (y_1 - y_4 - N/2) \\ vy_1 = vy_4 + \dfrac{(vy_5 - vy_4)}{P} \times (x_1 - x_4 - M/2) + \\ \quad\quad \dfrac{(vy_6 - vy_4)}{Q} \times (y_1 - y_4 - N/2) \end{cases} \quad (31)$$

Optionally (for example, the current block is a 6-parameter affine coding block), a motion vector (vx2, vy2) of a bottom-left control point (x2, y2) of the current affine coding block is obtained through calculation according to the following formula (32). Optionally, a value of (x2, y2) herein may be set to (x0, y0+H), where H is the height of the current block.

$$\begin{cases} vx_2 = vx_4 + \dfrac{(vx_5 - vx_4)}{P} \times (x_2 - x_4 - M/2) + \\ \quad\quad \dfrac{(vx_6 - vx_4)}{Q} \times (y_2 - y_4 - N/2) \\ vy_2 = vy_4 + \dfrac{(vy_5 - vy_4)}{P} \times (x_2 - x_4 - M/2) + \\ \quad\quad \dfrac{(vy_6 - vy_4)}{Q} \times (y_2 - y_4 - N/2) \end{cases} \quad (32)$$

It should be noted that, the method in the embodiments of the present invention may be alternatively applied to all neighboring affine coding blocks without limiting a condition. To be specific, motion vectors of three subblocks are used to form a 6-parameter affine motion model for derivation.

It should be noted that, in the embodiments of the present invention, because the width U and the height V of the coding block each are usually a power of 2, a value of P may be U/2, and a value of Q may be V/2. For example, when U is 8, 16, 32, 64, or 128, P is 4, 8, 16, 32, or 64. For example, when V is 8, 16, 32, 64, or 128, Q is 4, 8, 16, 32, or 64.

It should be noted that the foregoing embodiments are merely used as an example. In another embodiment of the present invention, other two subblocks whose center points have a horizontal distance P and a vertical distance Q may be alternatively used. Details are not described herein.

In addition, in actual implementation, because P and Q each are a power of 2, a division operation in the foregoing formula (27) to formula (32) may be implemented in a right shift manner. In addition, to reduce a precision loss of division, both ends of an equation in the foregoing formula (27) to formula (32) may be left shifted for increasing, and then right shift is performed.

A specific implementation operation may be performed in the following procedure, where Log 2 is a function for taking a logarithm of 2, << represents a left shift, and >> represents a right shift:

log 2P=Log 2(P)

log 2Q=Log 2(Q)

mvScaleHor=vx4<<7 mvScaleVer=vy4<<7 dHorX=(vx5−vx4)<<(7−log 2P)

dVerX=(vy5−vy4)<<(7−log 2Q)

If the neighboring affine coding block is a 6-parameter affine coding block, it is assumed that:

dHorY=(vx6−vx4)<<(7−log 2P)

dVerY=(vy6−vy4)<<(7−log 2Q)

If the neighboring affine coding block is a 4-parameter affine coding block, it is assumed that:

dHorY=−dVerX dVerY=dHorX

Then, the motion vectors of the control points of the current affine coding block may be calculated according to the following formulas:

$$vx0 = \text{Round}(mvScaleHor + dHorX^*(x0-x4-M/2) + dHorY^*(y0-y4-N/2))$$

$$vy0 = \text{Round}(mvScaleVer + dVerX^*(x0-x4-M/2) + dVerY^*(y0-y4-N/2))$$

$$vx1 = \text{Round}(mvScaleHor + dHorX^*(x1-x4-M/2) + dHorY^*(y1-y4-N/2))$$

$$vy1 = \text{Round}(mvScaleVer + dVerX^*(x1-x4-M/2) + dVerY^*(y1-y4-N/2))$$

$$vx2 = \text{Round}(mvScaleHor + dHorX^*(x2-x4-M/2) + dHorY^*(y2-y4-N/2))$$

$$vy2 = \text{Round}(mvScaleVer + dVerX^*(x2-x4-M/2) + dVerY^*(y2-y4-N/2))$$

An operation of a round function is as follows: For any input K, output K is obtained in the following manner:

mvShift=7 offset=1<<(mvShift−1)

$K = K >= 0 ? (K+\text{offset}) >> mvShift : -((-K+\text{offset}) >> mvShift)$

In another embodiment of the present invention, if the neighboring affine coding block is located in a CTU above the current affine coding block, to reduce a quantity of memory reading times, motion vectors of two subblocks that are of the neighboring affine coding block and that are located at the bottom of the CTU may be obtained for derivation. If coordinates of the top-left corner of the neighboring affine coding block are (x4, y4), the width is U, the height is V, and a size of a subblock obtained through partitioning is M×N, a motion vector (vx4, vy4) of a location (x4+M/2, y4+V−N/2) and a motion vector (vx5, vy5) of a location (x4+M/2+P, y4+V−N/2) are obtained to form a 4-parameter affine motion model.

Then, a motion vector (vx0, vy0) of a top-left control point (x0, y0) of the current affine coding block is obtained through calculation according to the following formula (33):

$$\begin{cases} vx_0 = vx_4 + \dfrac{(vx_5 - vx_4)}{P} \times (x_0 - x_4 - M/2) - \\ \qquad \dfrac{(vy_5 - vy_4)}{P} \times (y_0 - y_4 - V + N/2) \\ vy_0 = vy_4 + \dfrac{(vy_5 - vy_4)}{P} \times (x_0 - x_4 - M/2) + \\ \qquad \dfrac{(vx_5 - vx_4)}{P} \times (y_0 - y_4 - V + N/2) \end{cases} \quad (33)$$

A motion vector (vx1, vy1) of a top-right control point (x1, y1) of the current affine coding block is obtained through calculation according to the following formula (34):

$$\begin{cases} vx_1 = vx_4 + \dfrac{(vx_5 - vx_4)}{P} \times (x_1 - x_4 - M/2) - \\ \qquad \dfrac{(vy_5 - vy_4)}{P} \times (y_1 - y_4 - V + N/2) \\ vy_1 = vy_4 + \dfrac{(vy_5 - vy_4)}{P} \times (x_1 - x_4 - M/2) + \\ \qquad \dfrac{(vx_5 - vx_4)}{P} \times (y_1 - y_4 - V + N/2) \end{cases} \quad (34)$$

A motion vector (vx2, vy2) of a bottom-left control point (x2, y2) of the current affine coding block is obtained through calculation according to the following formula 35:

$$\begin{cases} vx_2 = vx_4 + \dfrac{(vx_5 - vx_4)}{P} \times (x_2 - x_4 - M/2) - \\ \qquad \dfrac{(vy_5 - vy_4)}{P} \times (y_2 - y_4 - V + N/2) \\ vy_2 = vy_4 + \dfrac{(vy_5 - vy_4)}{P} \times (x_2 - x_4 - M/2) + \\ \qquad \dfrac{(vx_5 - vx_4)}{P} \times (y_2 - y_4 - V + N/2) \end{cases} \quad (35)$$

It should be noted that, the method in the embodiments of the present invention may be alternatively applied, without limiting a condition, to only a case in which the neighboring affine coding block is a 4-parameter affine coding block. To be specific, if the neighboring affine coding block is a 4-parameter affine coding block, motion vectors of two bottom subblocks whose center points have a distance P are used for derivation.

In another embodiment of the present invention, if the neighboring affine coding block is located in a CTU on the left of the current affine coding block, to reduce a quantity of memory reading times, motion vectors of two subblocks that are of the neighboring affine coding block and that are at rightmost locations in the CTU may be obtained for derivation. If coordinates of the top-left corner of the neighboring affine coding block are (x4, y4), the width is U, the height is V, and a size of a subblock obtained through partitioning is M×N, a motion vector (vx4, vy4) of a location (x4+U−M/2, y4+N/2) and a motion vector (vx5, vy5) of a location (x4+U−M/2, y4+N/2+Q) are obtained to form a 4-parameter affine motion model.

Then, a motion vector (vx0, vy0) of a top-left control point (x0, y0) of the current affine coding block is obtained through calculation according to the following formula (36):

$$\begin{cases} vx_0 = vx_4 - \dfrac{(vy_5 - vy_4)}{P} \times (x_0 - x_4 - U + M/2) + \\ \qquad \dfrac{(vx_5 - vx_4)}{Q} \times (y_0 - y_4 - N/2) \\ vy_0 = vy_4 + \dfrac{(vx_5 - vx_4)}{P} \times (x_0 - x_4 - U + M/2) + \\ \qquad \dfrac{(vy_5 - vy_4)}{Q} \times (y_0 - y_4 - N/2) \end{cases} \quad (36)$$

A motion vector (vx1, vy1) of a top-right control point (x1, y1) of the current affine coding block is obtained through calculation according to the following formula (37):

$$\begin{cases} vx_1 = vx_4 - \dfrac{(vy_5 - vy_4)}{P} \times (x_1 - x_4 - U + M/2) + \\ \qquad \dfrac{(vx_5 - vx_4)}{Q} \times (y_1 - y_4 - N/2) \\ vy_1 = vy_4 + \dfrac{(vx_5 - vx_4)}{P} \times (x_1 - x_4 - U + M/2) + \\ \qquad \dfrac{(vy_5 - vy_4)}{Q} \times (y_1 - y_4 - N/2) \end{cases} \quad (37)$$

A motion vector (vx2, vy2) of a bottom-left control point (x2, y2) of the current affine coding block is obtained through calculation according to the following formula (38):

$$\begin{cases} vx_2 = vx_4 - \dfrac{(vy_5 - vy_4)}{Q} \times (x_2 - x_4 - U + M/2) + \\ \qquad \dfrac{(vx_5 - vx_4)}{Q} \times (y_2 - y_4 - N/2) \\ vy_2 = vy_4 + \dfrac{(vx_5 - vx_4)}{Q} \times (x_2 - x_4 - U + M/2) + \\ \qquad \dfrac{(vy_5 - vy_4)}{Q} \times (y_2 - y_4 - N/2) \end{cases} \quad (38)$$

It should be noted that, the method in the embodiments of the present invention may be alternatively applied, without limiting a condition, to only a case in which the neighboring affine coding block is a 4-parameter affine coding block. To be specific, if the neighboring affine coding block is a 4-parameter affine coding block, motion vectors of two rightmost subblocks whose center points have a distance Q are used for derivation.

In another embodiment of the present invention, if the neighboring affine coding block is located in a CTU above the current affine coding block, and the neighboring affine coding block is a 6-parameter affine coding block, to reduce a quantity of memory reading times, motion vectors of two subblocks that are of the neighboring affine coding block and that are located at the bottom of the CTU and a motion vector of a top subblock of the neighboring affine coding block may be obtained for derivation. If coordinates of the top-left corner of the neighboring affine coding block are (x4, y4), the width is U, the height is V, and a size of a subblock obtained through partitioning is M×N, a motion vector (vx4, vy4) of a location (x4+M/2, y4+V−N/2), a motion vector (vx5, vy5) of a location (x4+M/2+P, y4+V−N/2), and a motion vector (vx6, vy6) of a location (x4+M/2, y4+V−N/2−Q) are obtained to form a 6-parameter affine motion model.

Then, a motion vector (vx0, vy0) of a top-left control point (x0, y0) of the current affine coding block is obtained through calculation according to the following formula (39):

$$\begin{cases} vx_0 = vx_4 + \dfrac{(vx_5 - vx_4)}{P} \times (x_0 - x_4 - M/2) - \\ \qquad \dfrac{(vx_6 - vy_4)}{Q} \times (y_0 - y_4 - V + N/2) \\ vy_0 = vy_4 + \dfrac{(vy_5 - vy_4)}{P} \times (x_0 - x_4 - M/2) - \\ \qquad \dfrac{(vy_6 - vy_4)}{Q} \times (y_0 - y_4 - V + N/2) \end{cases} \quad (39)$$

A motion vector (vx1, vy1) of a top-right control point (x1, y1) of the current affine coding block is obtained through calculation according to the following formula (40):

$$\begin{cases} vx_1 = vx_4 + \dfrac{(vx_5 - vx_4)}{P} \times (x_1 - x_4 - M/2) - \\ \qquad \dfrac{(vx_6 - vy_4)}{Q} \times (y_1 - y_4 - V + N/2) \\ vy_1 = vy_4 + \dfrac{(vy_5 - vy_4)}{P} \times (x_1 - x_4 - M/2) - \\ \qquad \dfrac{(vy_6 - vy_4)}{Q} \times (y_1 - y_4 - V + N/2) \end{cases} \quad (40)$$

A motion vector (vx2, vy2) of a bottom-left control point (x2, y2) of the current affine coding block is obtained through calculation according to the following formula (41):

$$\begin{cases} vx_2 = vx_4 + \dfrac{(vx_5 - vx_4)}{Q} \times (x_2 - x_4 - M/2) - \\ \qquad \dfrac{(vx_6 - vy_4)}{Q} \times (y_2 - y_4 - V + N/2) \\ vy_2 = vy_4 + \dfrac{(vy_5 - vy_4)}{Q} \times (x_2 - x_4 - M/2) - \\ \qquad \dfrac{(vy_6 - vy_4)}{Q} \times (y_2 - y_4 - V + N/2) \end{cases} \quad (41)$$

It should be noted that, the method in the embodiments of the present invention may be alternatively applied, without limiting a condition, to only a case in which the neighboring affine coding block is a 6-parameter affine coding block. To be specific, if the neighboring affine coding block is a 6-parameter affine coding block, motion vectors of two bottom subblocks whose center points have a distance P and a motion vector of a subblock with a vertical distance Q from the bottom subblock are used for derivation.

It should be noted that, the method in the embodiments of the present invention may be alternatively applied to all neighboring affine coding blocks without limiting a condition. To be specific, motion vectors of two bottom subblocks whose center points have a distance P and a motion vector of a subblock with a vertical distance Q from the bottom subblock are used for derivation.

In another embodiment of the present invention, if the neighboring affine coding block is located in a CTU on the left of the current affine coding block, and the neighboring affine coding block is a 6-parameter affine coding block, to reduce a quantity of memory reading times, motion vectors of two subblocks that are of the neighboring affine coding block and that are at rightmost locations in the CTU and a motion vector of a left subblock of the neighboring affine coding block may be obtained for derivation. If coordinates of the top-left corner of the neighboring affine coding block are (x4, y4), the width is U, the height is V, and a size of a subblock obtained through partitioning is M×N, a motion vector (vx4, vy4) of a location (x4+U−M/2, y4+N/2), a motion vector (vx5, vy5) of a location (x4+U−M/2, y4+N/2+Q), and a motion vector (vx6, vy6) of a location (x4+U−M/2−P, y4+N/2) are obtained to form a 6-parameter affine motion model.

Then, a motion vector (vx0, vy0) of a top-left control point (x0, y0) of the current affine coding block is obtained through calculation according to the following formula (42):

$$\begin{cases} vx_0 = vx_4 - \dfrac{(vx_6 - vx_4)}{P} \times (x_0 - x_4 - U + M/2) + \\ \qquad \dfrac{(vx_5 - vx_4)}{Q} \times (y_0 - y_4 - N/2) \\ vy_0 = vy_4 - \dfrac{(vy_6 - vy_4)}{P} \times (x_0 - x_4 - U + M/2) + \\ \qquad \dfrac{(vy_5 - vy_4)}{Q} \times (y_0 - y_4 - N/2) \end{cases} \quad (42)$$

A motion vector (vx1, vy1) of a top-right control point (x1, y1) of the current affine coding block is obtained through calculation according to the following formula (43):

$$\begin{cases} vx_1 = vx_4 - \dfrac{(vx_6 - vx_4)}{P} \times (x_1 - x_4 - U + M/2) + \\ \qquad \dfrac{(vx_5 - vx_4)}{Q} \times (y_1 - y_4 - N/2) \\ vy_1 = vy_4 - \dfrac{(vy_6 - vy_4)}{P} \times (x_1 - x_4 - U + M/2) + \\ \qquad \dfrac{(vy_5 - vy_4)}{Q} \times (y_1 - y_4 - N/2) \end{cases} \quad (43)$$

A motion vector (vx2, vy2) of a bottom-left control point (x2, y2) of the current affine coding block is obtained through calculation according to the following formula (44):

$$\begin{cases} vx_2 = vx_4 - \dfrac{(vx_6 - vx_4)}{P} \times (x_2 - x_4 - U + M/2) + \\ \qquad \dfrac{(vx_5 - vy_4)}{Q} \times (y_2 - y_4 - N/2) \\ vy_2 = vy_4 - \dfrac{(vy_6 - vy_4)}{P} \times (x_2 - x_4 - U + M/2) + \\ \qquad \dfrac{(vy_5 - vy_4)}{Q} \times (y_2 - y_4 - N/2) \end{cases} \quad (44)$$

It should be noted that, the method in the embodiments of the present invention may be alternatively applied, without limiting a condition, to only a case in which the neighboring affine coding block is a 6-parameter affine coding block. To be specific, if the neighboring affine coding block is a 6-parameter affine coding block, motion vectors of two rightmost subblocks whose center points have a distance Q and a motion vector of a subblock with a horizontal distance P from the rightmost subblock are used for derivation.

It should be noted that, the method in the embodiments of the present invention may be alternatively applied to all neighboring affine coding blocks without limiting a condition. To be specific, motion vectors of two rightmost subblocks whose center points have a distance Q and a motion vector of a subblock with a horizontal distance P from the rightmost subblock are used for derivation.

Figure 11:
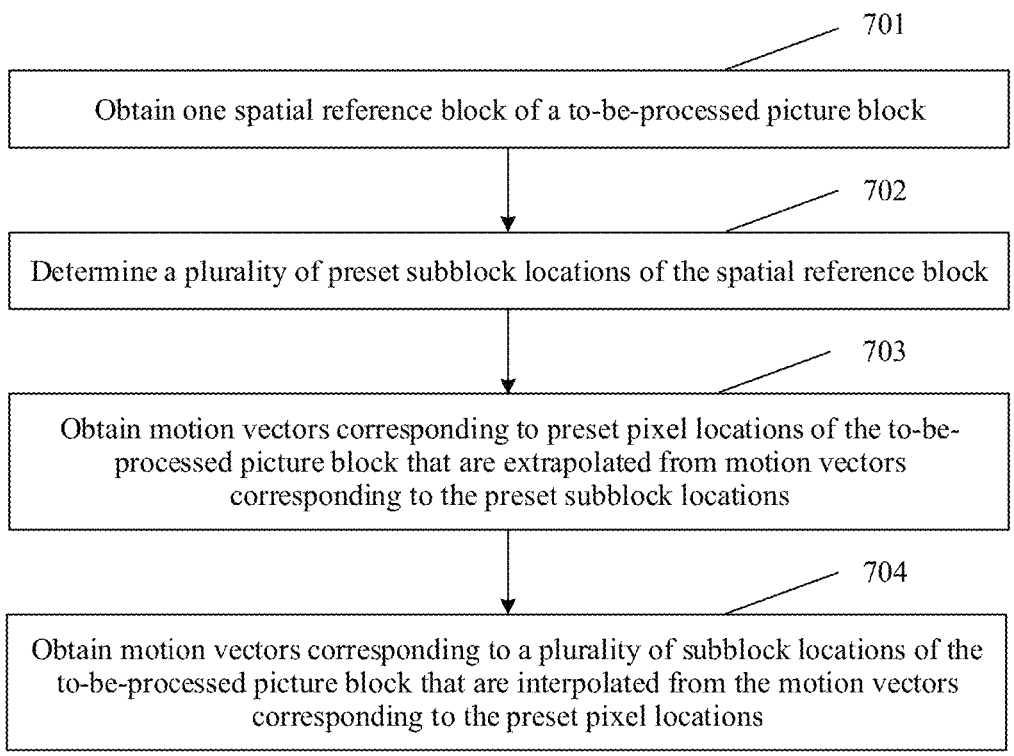
FIG. 11 is a flowchart of a motion vector prediction method based on an affine motion model according to an embodiment of the present invention.

Based on the improved inherited control point motion vector prediction method, the following further describes a motion vector prediction method based on an affine motion model according to an embodiment of the present invention from a perspective of an encoder side or a decoder side. Referring to FIG. 11, the method includes but is not limited to the following steps.

Step 701: Obtain one spatial reference block of a to-be-processed picture block.

The to-be-processed picture block is obtained by partitioning a video picture, and the spatial reference block is a decoded block spatially neighboring to the to-be-processed picture block. On the encoder side, the to-be-processed picture block may also be referred to as a current affine encoding block (affine coding block), and the spatial reference block may also be referred to as a neighboring affine encoding block (affine coding block). On the decoder side, the to-be-processed picture block may also be referred to as a current affine decoding block (affine coding block), and the spatial reference block may also be referred to as a neighboring affine decoding block (affine coding block). For ease of description, in this embodiment, the to-be-processed picture block may be generally referred to as a current block, and the spatial reference block may be generally referred to as a neighboring block.

In a specific embodiment, availability of one or more candidate reference blocks that are of the current block and that are at preset spatial locations may be determined in a preset order, and then the first available candidate reference block in the preset order is obtained and used as the spatial reference block. The candidate reference blocks at the preset spatial locations include a directly top neighboring picture block, a directly left neighboring picture block, a top-right neighboring picture block, a bottom-left neighboring picture block, and a top-left neighboring picture block of the to-be-processed picture block. For example, the availability of the candidate reference blocks is successively checked in the following order: the directly left neighboring picture block→the directly top neighboring picture block→the top-right neighboring picture block→the bottom-left neighboring picture block→the top-left neighboring picture block, until the first available candidate reference block is determined.

FIG. 7 is used as an example. Neighboring-location blocks around the current block may be traversed in order of A1→B1→B0→A0→B2 in FIG. 7, to find a neighboring block in which a neighboring-location block is located.

In a specific embodiment, whether the candidate reference block is available may be determined according to the following method: When the candidate reference block and the to-be-processed picture block are in a same picture region, and the candidate reference block is coded based on the affine motion model, the candidate reference block is determined to be available.

Step 702: Determine two or more preset subblock locations of the spatial reference block.

Specifically, two or more subblocks in the spatial reference block may be determined. Each subblock has a corresponding preset subblock location, and the preset subblock location is consistent with a location used to calculate a motion vector of the subblock during coding. To be specific, for a subblock of the neighboring affine coding block, a motion vector of a pixel at a preset location in the subblock is used to represent motion vectors of all pixels in the subblock. The motion vector of the pixel at the preset location may be used for subsequent motion compensation, to predict a subblock in which the pixel at the preset location is located.

In a specific implementation, the preset subblock location may be a location of a top-left pixel in the subblock, a location of a geometric center of the subblock, a location of a pixel closest to a geometric center in the subblock, a location of a top-right pixel in the subblock, or the like.

In a specific embodiment, two subblocks in the spatial reference block may be determined, and a distance between two preset subblock locations corresponding to the two subblocks is S, where S is 2 raised to the power of K, and K is a nonnegative integer. This helps implement subsequent motion vector derivation in a shift manner, so that implementation complexity is reduced.

In an example, if the affine motion model of the current block is a 4-parameter affine motion model, a plurality of preset subblock locations of the spatial reference block include a first preset location (x4+M/2, y4+N/2) and a second preset location (x4+M/2+P, y4+N/2), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, K is a nonnegative integer, K is less than U, and U is the width of the spatial reference block.

In an example, if the affine motion model of the current block is a 4-parameter affine motion model, a plurality of preset subblock locations include a first preset location (x4+M/2, y4+N/2) and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, Q is 2 raised to the power of R, R is a nonnegative integer, Q is less than V, and V is the height of the spatial reference block.

In an example, if the affine motion model of the current block is a 6-parameter affine motion model, a plurality of preset subblock locations include a first preset location (x4+M/2, y4+N/2), a second preset location (x4+M/2+P, y4+N/2), and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, Q is 2 raised to the power of R, K and R are nonnegative integers, P is less than U, Q is less than V, U is the width of the spatial reference block, and V is the height of the spatial reference block.

In another example, when a top boundary of the current block coincides with a top boundary of a coding tree unit (CTU) including the current block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the current block.

In another example, when a left boundary of the current block coincides with a left boundary of a coding tree unit (CTU) including the current block, and the spatial reference block is directly on the left of the current block, on the top-left of the current block, or on the bottom-left of the current block, at least two of subblocks corresponding to the plurality of preset subblock locations are adjacent to the left boundary of the current block.

Step 703: Obtain motion vectors corresponding to preset pixel locations of the to-be-processed picture block that are extrapolated from motion vectors corresponding to the preset subblock locations.

In this embodiment of the present invention, a candidate control point motion vector of the current block is determined by using an improved inherited control point motion vector prediction method. To be specific, the motion vectors of the preset pixel locations of the current block are extrapolated from motion vectors of at least two subblocks of the neighboring affine coding block (or the neighboring affine decoding block). The preset pixel locations are control points of the current block. For example, if the affine motion model of the current block is the 4-parameter affine motion model, the control points of the current block may be a top-left pixel and a top-right pixel in the current block. If the affine motion model of the current block is the 6-parameter affine motion model, the control points of the current block may be a top-left pixel, a top-right pixel, and a bottom-left pixel in the current block.

Detailed content of the improved inherited control point motion vector prediction method has been described in detail above, and this embodiment may be implemented with reference to the content. For brevity of the specification, details are not described herein again.

Step 704: Obtain motion vectors corresponding to a plurality of subblock locations of the to-be-processed picture block that are interpolated from the motion vectors corresponding to the preset pixel locations.

Specifically, for each subblock of the current block (one subblock may be equivalent to one motion compensation unit, and the width and the height of the subblock are less than the width and the height of the current block), motion information of a pixel at a preset location in the motion compensation unit may be used to represent motion information of all pixels in the motion compensation unit. It is assumed that a size of the motion compensation unit is M×N, the pixel at the preset location may be a center pixel (M/2, N/2), a top-left pixel (0, 0), a top-right pixel (M×1, 0), or a pixel at another location in the motion compensation unit. In this case, a motion vector of each subblock in the current block may be obtained based on control point motion information of the current block and a currently used affine motion model, and subsequently, motion compensation may be performed based on the motion vector of the subblock to obtain a predicted pixel value of the subblock.

Figure 12:
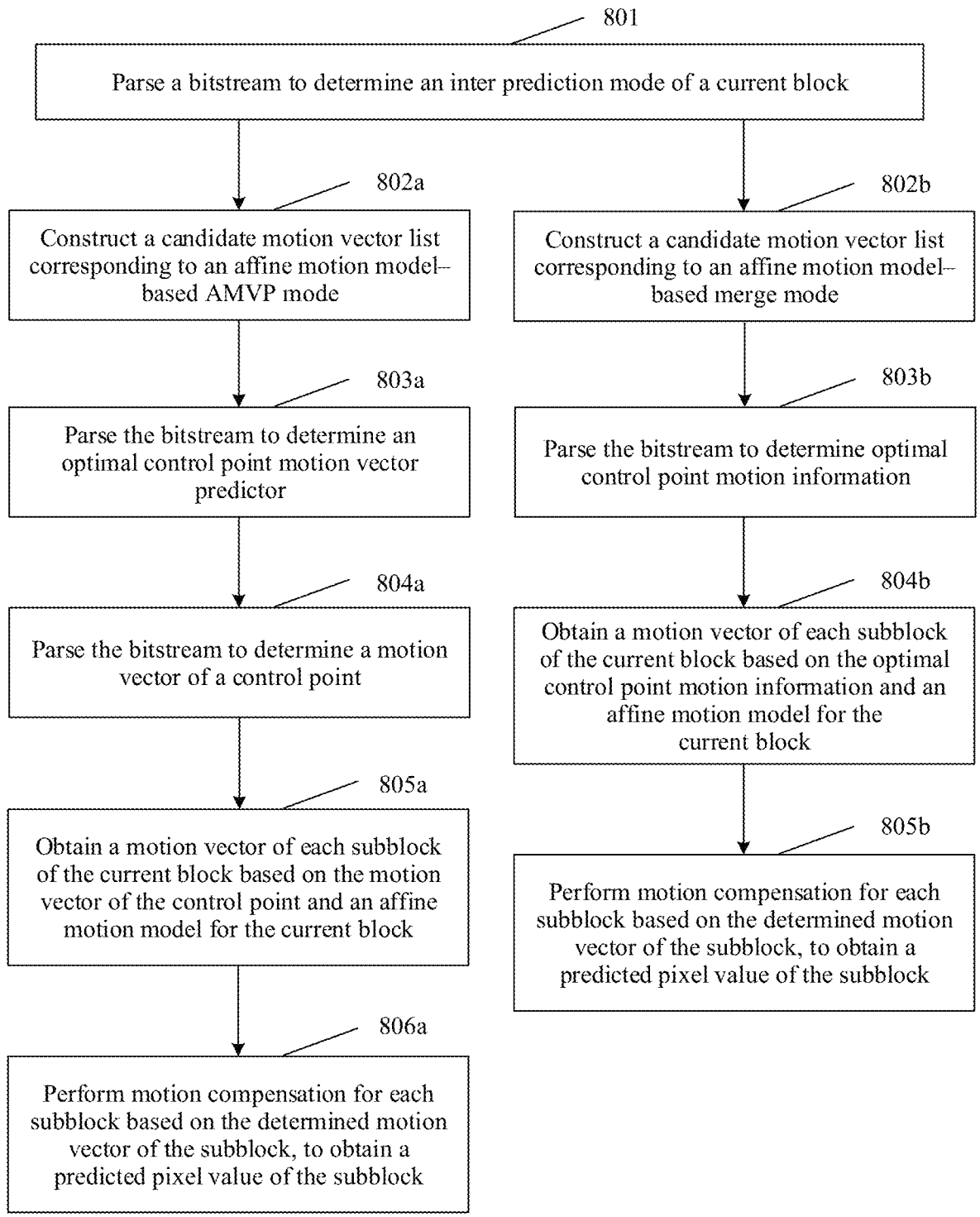
FIG. 12 is a flowchart of another motion vector prediction method based on an affine motion model according to an embodiment of the present invention.
Figure 14:
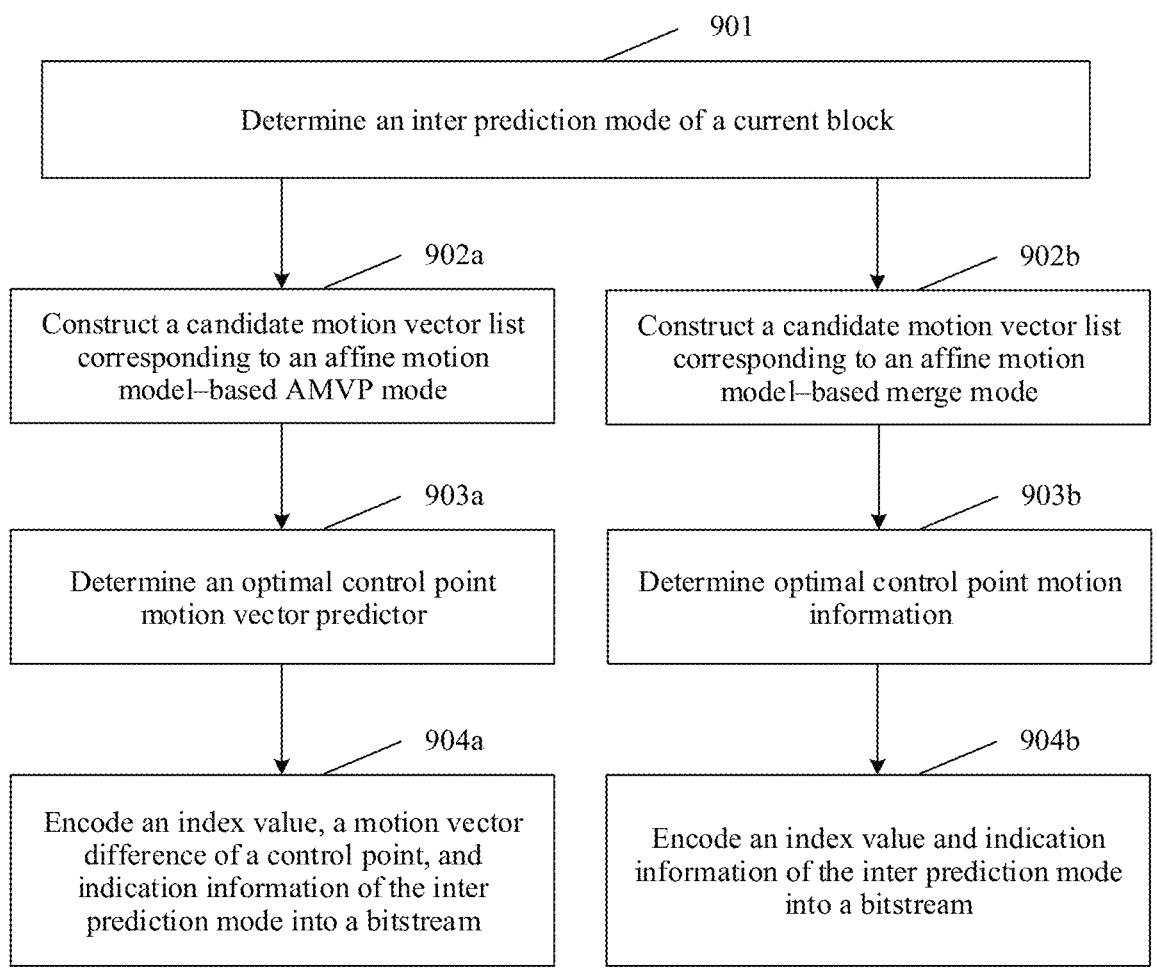
FIG. 14 is a flowchart of another motion vector prediction method based on an affine motion model according to an embodiment of the present invention.
Figure 15:
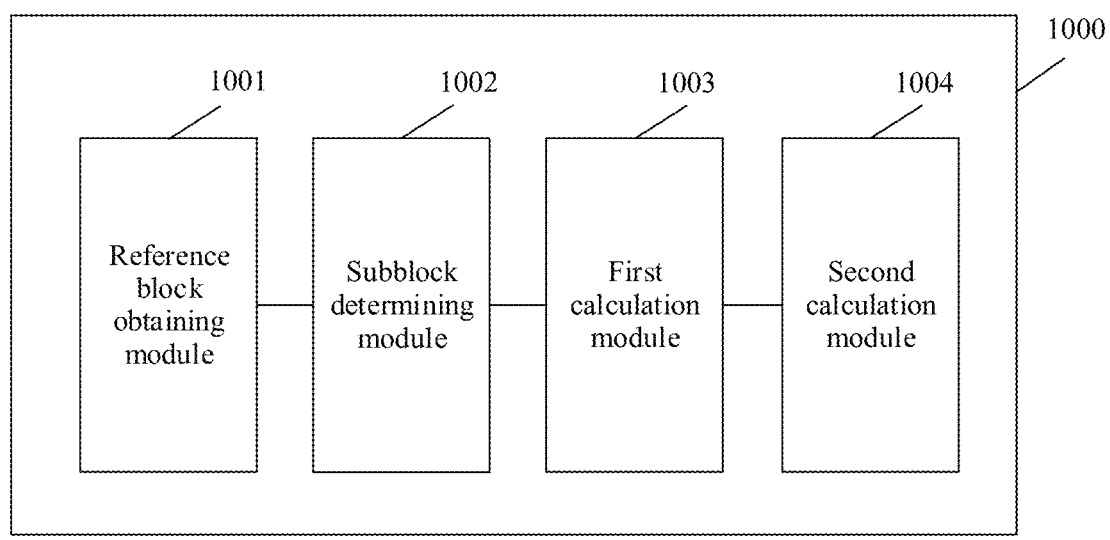
FIG. 15 is a structural block diagram of a device for implementing an embodiment of the present invention.

It should be noted that, for a detailed implementation process of the embodiment in FIG. 11 on the decoder side and the encoder side, refer to subsequent descriptions of the embodiment in FIG. 12 and the embodiment in FIG. 14. For brevity of the specification, details are not described herein.

It can be learned that the improved inherited control point motion vector prediction method is used in this embodiment of the present invention. In the improved inherited control point motion vector prediction method, motion vectors of control points of the current block are derived by using motion vectors of at least two subblocks of the neighboring block, instead of using motion vectors of control points of the neighboring block, then motion vectors of subblocks of the current block are derived based on the motion vectors of the control points, and prediction for the current block is implemented through motion compensation. The motion vectors of the control points of the current block do not need to be stored subsequently. To be specific, the motion vectors of the control points of the current block are used only to derive the motion vectors of the subblocks of the current coding block, but not used for motion vector prediction of the neighboring block. Therefore, in the solutions of the present invention, only the motion vectors of the subblocks need to be stored, and motion compensation is performed by using the motion vectors of the subblocks. This resolves a motion vector storage problem, and avoids a case in which a motion vector inconsistent with that used for another subblock is used to perform motion compensation on a subblock in which a control point is located, so that prediction accuracy is improved.

Based on the improved inherited control point motion vector prediction method, the following further describes a motion vector prediction method based on an affine motion model according to an embodiment of the present invention from a perspective of a decoder side. Referring to FIG. 12, the method includes but is not limited to the following steps.

Step 801: Parse a bitstream to determine an inter prediction mode of a current block.

Specifically, the bitstream may be parsed based on the syntax structure shown in Table 1, to determine the inter prediction mode of the current block.

If it is determined that the inter prediction mode of the current block is an affine motion model-based AMVP mode, that is, syntax elements merge_flag=0 and affine_inter_flag=1 indicate that the inter prediction mode of the current block is the affine motion model-based AMVP mode, step 802a to step 806a are subsequently performed.

If it is determined that the inter prediction mode of the current block is an affine motion model-based merge mode, that is, syntax elements merge_flag=1 and affine_merge_flag=1 indicate that the inter prediction mode of the current block is the affine motion model-based merge mode, step 802b to step 805b are subsequently performed.

Step 802a: Construct a candidate motion vector list corresponding to the affine motion model-based AMVP mode.

In this embodiment of the present invention, a candidate control point motion vector of the current block may be obtained based on an improved inherited control point motion vector prediction method and/or a constructed control point motion vector prediction method, and added to the candidate motion vector list corresponding to the AMVP mode.

In the improved inherited control point motion vector prediction method, in a process of determining the candidate control point motion vector of the current block, candidate control point motion vector predictors (a candidate motion vector 2-tuple/triplet/quadruple) of the current block are derived by using motion vectors of at least two subblocks of a neighboring affine coding block, and are added to the candidate motion vector list.

If a 4-parameter affine motion model is used for the current block, the candidate motion vector list may include a 2-tuple list. The 2-tuple list includes one or more 2-tuples used to construct the 4-parameter affine motion model.

If a 6-parameter affine motion model is used for the current block, the candidate motion vector list may include a triplet list. The triplet list includes one or more triplets used to construct the 6-parameter affine motion model.

If an 8-parameter bilinear model is used for the current block, the candidate motion vector list may include a quadruple list. The quadruple list includes one or more quadruples used to construct the 8-parameter bilinear model.

In a possible application scenario, the candidate motion vector 2-tuple/triplet/quadruple list may be pruned and sorted according to a particular rule, and may be truncated or padded to obtain candidate motion vectors of a particular quantity.

For the improved inherited control point motion vector prediction method, FIG. 7 is used as an example. Neighboring-location blocks around the current block may be traversed in order of A1→B1→B0→A0→B2 in FIG. 7, to find an affine coding block in which a neighboring-location block is located, an affine motion model is constructed by using motion vectors of at least two subblocks of the neighboring affine coding block, and then candidate control point motion vectors (a candidate motion vector 2-tuple/triplet/quadruple) of the current block are derived and added to the candidate motion vector list. It should be noted that another search order is also applicable to this embodiment of the present invention. Details are not described herein.

For detailed content of the improved inherited control point motion vector prediction method, refer to the foregoing related descriptions. For brevity of the specification, details are not described herein again.

In addition, content of a constructed control point motion vector prediction method based on the affine motion model-based AMVP mode is also described in detail in the foregoing (4). For brevity of the specification, details are not described herein again.

Step 803a: Parse the bitstream to determine an optimal control point motion vector predictor.

Specifically, an index value of the candidate motion vector list is obtained by parsing the bitstream, and the optimal control point motion vector predictor is determined, based on the index value, from the candidate motion vector list constructed in step 802a.

For example, if an affine motion model used for the current coding block is the 4-parameter affine motion model (MotionModelIdc is 1), the index value is obtained through parsing. For example, the index value is mvp_l0_flag or mvp_l1_flag. Optimal motion vector predictors of two control points are determined from the candidate motion vector list based on the index value.

For another example, if an affine motion model used for the current coding block is the 6-parameter affine motion model (MotionModelIdc is 2), the index value is obtained through parsing, and optimal motion vector predictors of three control points are determined from the candidate motion vector list based on the index value.

For another example, if an affine motion model used for the current coding block is the 8-parameter bilinear model, the index value is obtained through parsing, and optimal motion vector predictors of four control points are determined from the candidate motion vector list based on the index value.

Step 804a: Parse the bitstream to determine a motion vector of a control point.

Specifically, a motion vector difference of the control point is obtained by parsing the bitstream, and then the motion vector of the control point is obtained based on the motion vector difference of the control point and the optimal control point motion vector predictor determined in step 803a.

For example, the affine motion model used for the current coding block is the 4-parameter affine motion model (MotionModelIdc is 1). Forward prediction is used as an example, and motion vector differences of the two control points are respectively mvd_coding(x0, y0, 0, 0) and mvd_coding(x0, y0, 0, 1). The motion vector differences of the two control points of the current block are obtained by parsing the bitstream. For example, motion vector differences of a top-left control point and a top-right control point may be obtained by parsing the bitstream. Then, a motion vector difference and a motion vector predictor of each control point are added to obtain a motion vector of the control point. In other words, motion vectors of the top-left control point and the top-right control point of the current block are obtained.

For another example, the affine motion model used for the current coding block is the 6-parameter affine motion model (MotionModelIdc is 2). Forward prediction is used as an example, and motion vector differences of the three control points are respectively mvd_coding(x0, y0, 0, 0), mvd_coding(x0, y0, 0, 1), and mvd_coding(x0, y0, 0, 2). The motion vector differences of the three control points of the current block are obtained by parsing the bitstream. For example, motion vector differences of a top-left control point, a top-right control point, and a bottom-left control point are obtained by parsing the bitstream. Then, a motion vector difference and a motion vector predictor of each control point are added to obtain a motion vector of the control point. In other words, motion vectors of the top-left control point, the top-right control point, and the bottom-left control point of the current block are obtained.

It should be noted that, in this embodiment of the present invention, another affine motion model and another control point location may also be used. Details are not described herein.

Step 805a: Obtain a motion vector of each subblock in the current block based on the motion vector of the control point and the affine motion model used for the current block.

For each subblock in the current affine coding block (one subblock may be equivalent to one motion compensation unit, and the width and the height of the subblock are less than the width and the height of the current block), motion information of a pixel at a preset location in the motion compensation unit may be used to represent motion information of all pixels in the motion compensation unit. It is assumed that a size of the motion compensation unit is M×N, the pixel at the preset location may be a center pixel (M/2, N/2), a top-left pixel (0, 0), a top-right pixel (M×1, 0), or a pixel at another location in the motion compensation unit.

Figure 13:
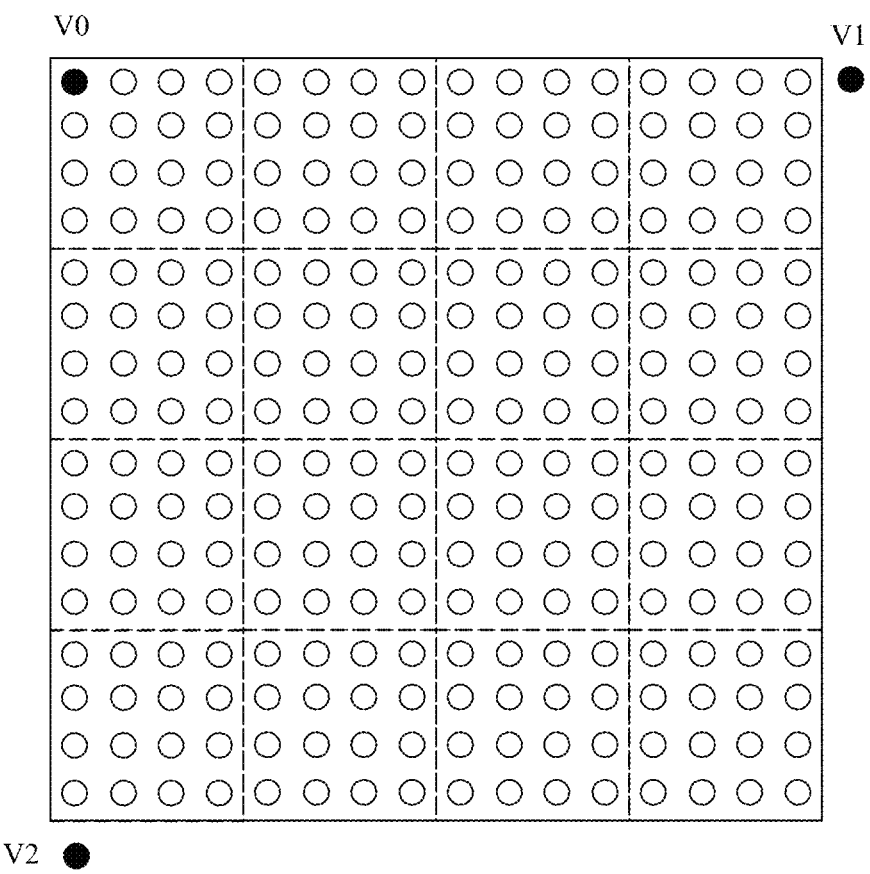
FIG. 13 is a schematic diagram of a scenario in which another example operation is performed on a current block.

The following uses a center point of the motion compensation unit as an example for description. FIG. 13 shows a current affine coding block and a motion compensation unit (subblock). Each small box in the figure represents one motion compensation unit. In FIG. 13, V0 represents a motion vector of a top-left control point of the current affine coding block, V1 represents a motion vector of a top-right control point of the current affine coding block, and V2 represents a motion vector of a bottom-left control point of the current affine coding block.

Coordinates of the center point of the motion compensation unit relative to a top-left pixel of the current affine coding block may be obtained through calculation according to the following formula (45):

$$\begin{cases} x_{(i,j)} = M \times i + \frac{M}{2}, \ i = 0, 1 \ldots \\ y_{(i,j)} = N \times j + \frac{N}{2}, \ j = 0, 1 \ldots \end{cases} \quad (45)$$

Herein, i is an $i^{th}$ motion compensation unit (from left to right) in a horizontal direction, j is a ja motion compensation unit (from top to bottom) in a vertical direction, and $(x_{(i,j)}, y_{(i,j)})$ represent coordinates of a center point of an $(i, j)^{th}$ motion compensation unit relative to the pixel at the top-left control point of the current affine coding block.

If the affine motion model used for the current affine coding block is the 6-parameter affine motion model, $(x_{(i,j)}, y_{(i,j)})$ are substituted into a formula (46) in the 6-parameter affine motion model, to obtain a motion vector of a center point of each motion compensation unit, and the motion vector is used as motion vectors $(vx_{(i,j)}, vy_{(i,j)})$ of all pixels in the motion compensation unit:

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (46)$$

If the affine motion model used for the current affine coding block is the 4-parameter affine motion model, $(x_{(i,j)}, y_{(i,j)})$ are substituted into a formula (47) in the 4-parameter affine motion model, to obtain a motion vector of a center point of each motion compensation unit, and the motion vector is used as motion vectors $(vx_{(i,j)}, vy_{(i,j)})$ of all pixels in the motion compensation unit:

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{H}y + vy_0 \end{cases} \quad (47)$$

Step 806a: Perform motion compensation for each subblock based on the determined motion vector of the subblock, to obtain a predicted pixel value of the subblock.

Step 802b: Construct a candidate motion vector list corresponding to the affine motion model-based merge mode.

In this embodiment of the present invention, a candidate control point motion vector of the current block may be obtained based on an improved inherited control point motion vector prediction method and/or a constructed control point motion vector prediction method, and added to the candidate motion vector list corresponding to the merge mode.

In the improved inherited control point motion vector prediction method, in a process of determining the candidate control point motion vector of the current block, candidate control point motion vectors (a candidate motion vector 2-tuple/triplet/quadruple) of the current block are derived by using motion vectors of at least two subblocks of a neighboring affine coding block, and are added to the candidate motion vector list.

In a possible application scenario, the candidate motion vector list may be pruned and sorted according to a particular rule, and may be truncated or padded to obtain motion vectors of a particular quantity.

FIG. 8 is used as an example. Neighboring-location blocks around the current block may be traversed in order of A1→B1→B0→A0→B2, to find an affine coding block in which the neighboring-location block is located, an affine motion model is constructed by using motion vectors of at least two subblocks of the neighboring affine coding block, and then candidate control point motion vectors (a candidate motion vector 2-tuple/triplet/quadruple) of the current block are derived and added to the candidate motion vector list. It should be noted that another search order is also applicable to this embodiment of the present invention. Details are not described herein.

Specifically, in the foregoing traversal process, if the candidate motion vector list is empty, the candidate control point motion information is added to the candidate list. If the candidate motion vector list is not empty, motion information in the candidate motion vector list is successively traversed, and whether motion information that is the same as the candidate control point motion information exists in the candidate motion vector list is checked. If no motion information that is the same as the candidate control point motion information exists in the candidate motion vector list, the candidate control point motion information is added to the candidate motion vector list.

To determine whether two pieces of candidate motion information are the same, whether forward/backward reference frames of the two pieces of candidate motion information are the same and whether horizontal components and vertical components of forward/backward motion vectors are the same need to be successively determined. The two pieces of motion information are considered to be different only when all the foregoing elements are different.

If a quantity of pieces of motion information in the candidate motion vector list reaches a maximum list length MaxAffineNumMrgCand (MaxAffineNumMrgCand is a positive integer, such as 1, 2, 3, 4, or 5), the candidate list is constructed. If a quantity of pieces of motion information in the candidate motion vector list does not reach a maximum list length, a next neighboring-location block is traversed.

For content of the improved inherited control point motion vector prediction method, refer to the foregoing detailed descriptions. For brevity of the specification, details are not described herein again.

In addition, content of a constructed control point motion vector prediction method based on the affine motion model-based merge mode is also described in detail in the foregoing (4). For brevity of the specification, details are not described herein again.

Step S803b: Parse the bitstream to determine optimal control point motion information.

Specifically, an index value of the candidate motion vector list is obtained by parsing the bitstream, and the optimal control point motion information is determined, based on the index value, from the candidate motion vector list constructed in step 802b.

Step 804b: Obtain a motion vector of each subblock in the current block based on the optimal control point motion information and the affine motion model used for the current coding block. For detailed implementation of this step, refer to descriptions of step 805a. For brevity of this specification, details are not described herein again.

Step 805b: Perform motion compensation for each subblock based on the determined motion vector of the subblock, to obtain a predicted pixel value of the subblock.

It can be learned that, in this embodiment of the present invention, the improved inherited control point motion vector prediction method is used. In the improved inherited control point motion vector prediction method, a motion vector of a control point of the neighboring block does not need to be used, but the motion vectors of the at least two subblocks of the neighboring affine coding block are used. After a motion vector of a subblock of each affine coding block is derived, a motion vector of a control point does not need to be stored. To be specific, the motion vector of the control point of the current coding block is used only to derive the motion vector of the subblock of the current coding block, but not used for motion vector prediction of the neighboring block. Therefore, in the solutions of the present invention, only the motion vector of the subblock needs to be stored, and motion compensation is performed by using the motion vector of the subblock. This resolves a motion vector storage problem, and improves prediction accuracy.

Based on the improved inherited control point motion vector prediction method, the following further describes a motion vector prediction method based on an affine motion model according to an embodiment of the present invention from a perspective of an encoder side. Referring to FIG. 14, the method includes but is not limited to the following steps.

Step 901: Determine an inter prediction mode of a current block.

In a specific implementation, a plurality of inter prediction modes may be preset for inter prediction on the encoder side. For example, the plurality of inter prediction modes include the affine motion model-based AMVP mode and the afine motion model-based merge mode that are described above. The encoder side traverses the plurality of inter prediction modes to determine an optimal inter prediction mode for predicting the current block.

In another specific implementation, only one inter prediction mode may be preset for inter prediction on the encoder side. In this case, the encoder side directly determines that a default inter prediction mode is currently used. The default inter prediction mode is the affine motion model-based AMVP mode or the affine motion model-based merge mode.

In this embodiment of the present invention, if it is determined that the inter prediction mode of the current block is the affine motion model-based AMVP mode, step 902a to step 904a are subsequently performed.

In this embodiment of the present invention, if it is determined that the inter prediction mode of the current block is the affine motion model-based merge mode, step 902b to step 904b are subsequently performed.

Step 902a: Construct a candidate motion vector list corresponding to the affine motion model-based AMVP mode.

In this embodiment of the present invention, a candidate control point motion vector predictor (for example, a candidate motion vector 2-tuple/triplet/quadruple) of the current block may be obtained based on an improved inherited control point motion vector prediction method and/or a constructed control point motion vector prediction method, and added to the candidate motion vector list corresponding to the AMVP mode.

For specific implementation of this step, refer to the description of step 802a in the foregoing embodiment. Details are not described herein again.

Step 903a: Determine an optimal control point motion vector predictor based on rate-distortion costs.

In an example, the encoder side may obtain a motion vector of each motion compensation subunit of the current block by using a control point motion vector predictor (for example, a candidate motion vector 2-tuple/triplet/quadruple) in the candidate motion vector list according to the formula (3), (5), or (7). Further, the encoder side obtains a pixel value of a corresponding location in a reference frame to which the motion vector of each motion compensation subunit points, and uses the pixel value as a predicted value of the motion compensation subunit to perform affine motion model-based motion compensation. An average value of differences between original values and predicted values of all pixels in the current coding block is calculated. A control point motion vector predictor corresponding to a minimum average value is selected as an optimal control point motion vector predictor, and used as motion vector predictors of two, three, or four control points of the current block.

Step 904a: Encode an index value, a motion vector difference of a control point, and indication information of the inter prediction mode into a bitstream.

In an example, the encoder side may perform motion search within a specific search range by using the optimal control point motion vector predictor as a start search point to obtain a control point motion vector (CPMV), and calculate a difference (control point motion vector differences, CPMVD) between the control point motion vector and the control point motion vector predictor. Then, the encoder side encodes the index value indicating a location of the control point motion vector predictor in the candidate motion vector list and the CPMVD into the bitstream, and may further encode the indication information of the inter prediction mode into the bitstream, to facilitate subsequent transmission to a decoder side.

In specific implementation, for a syntax element encoded into the bitstream, refer to the foregoing descriptions in Table 1 and Table 2. Details are not described herein again.

Step 902b: Construct a candidate motion vector list corresponding to the affine motion model-based merge mode.

In this embodiment of the present invention, a candidate control point motion vector (for example, a candidate motion vector 2-tuple/triplet/quadruple) of the current block may be obtained based on an improved inherited control point motion vector prediction method and/or a constructed control point motion vector prediction method, and added to the candidate motion vector list corresponding to the merge mode.

For specific implementation of this step, refer to the description of step 802b in the foregoing embodiment. Details are not described herein again.

Step 903b: Determine optimal control point motion information based on rate-distortion costs.

In an example, the encoder side may obtain a motion vector of each motion compensation subunit of the current coding block by using a control point motion vector (for example, a candidate motion vector 2-tuple/triplet/quadruple) in the candidate motion vector list according to the formula (3), (5), or (7). Further, the encoder side obtains a pixel value of a location in a reference frame to which the motion vector of each motion compensation subunit points, and uses the pixel value as a predicted value of the motion compensation subunit to perform affine motion compensation. An average value of differences between original values and predicted values of all pixels in the current coding block is calculated. A control point motion vector corresponding to a minimum average value is selected as an optimal control point motion vector, and the optimal control point motion vector is used as motion vectors of two, three, or four control points of the current coding block.

Step 904b: Encode an index value and indication information of the inter prediction mode into a bitstream.

In an example, the encoder side may encode the index value indicating a location of the control point motion vector in the candidate list, and the indication information of the inter prediction mode into the bitstream, to facilitate subsequent transmission to a decoder side.

In specific implementation, for a syntax element encoded into the bitstream, refer to the foregoing descriptions in Table 1 and Table 2. Details are not described herein again.

It should be noted that the foregoing embodiment describes only a process in which the encoder side performs encoding and sends the bitstream. According to the foregoing descriptions, a person skilled in the art understands that the encoder side may alternatively perform, in another procedure, another method described in the embodiments of the present invention. For example, when the encoder side predicts the current block, for specific implementation of a process of reconstructing the current block, refer to a related method (as shown in the embodiment in FIG. 12) described above on the decoder side. Details are not described herein again.

It can be learned that, in this embodiment of the present invention, the improved inherited control point motion vector prediction method is used. In the improved inherited control point motion vector prediction method, a motion vector of a control point of a neighboring affine coding block does not need to be stored, but motion vectors of at least two subblocks of the neighboring affine coding block are used. Therefore, a candidate control point motion vector of the current block is derived based on the motion vectors of the at least two subblocks, and the list is established. The optimal candidate control point motion vector is obtained, and the index value corresponding to the optimal candidate control point motion vector in the list is sent to the decoder side. The motion vector of the control point does not need to be stored. To be specific, the motion vector of the control point of the current coding block is used only to derive the motion vector of the subblock of the current coding block, but not used for motion vector prediction of the neighboring block subsequently. Therefore, in the solutions of the present invention, only the motion vector of the subblock needs to be stored, and motion compensation is performed by using the motion vector of the subblock. This resolves a motion vector storage problem, and improves prediction accuracy.

Based on a same inventive concept as the foregoing method, an embodiment of the present invention further provides a device 1000. The device 1000 includes a reference block obtaining module 1001, a subblock determining module 1002, a first calculation module 1003, and a second calculation module 1004.

The reference block obtaining module 1001 is configured to obtain one spatial reference block of a to-be-processed picture block in video data.

The subblock determining module 1002 is configured to determine a plurality of preset subblock locations of the spatial reference block.

The first calculation module 1003 is configured to obtain motion vectors corresponding to preset pixel locations of the to-be-processed picture block that are extrapolated from motion vectors corresponding to the preset subblock locations.

The second calculation module 1004 is configured to obtain motion vectors corresponding to a plurality of subblock locations of the to-be-processed picture block that are interpolated from the motion vectors corresponding to the preset pixel locations.

In a possible embodiment, the reference block obtaining module 1001 is specifically configured to: determine, in a preset order, availability of one or more candidate reference blocks that are of the to-be-processed picture block and that are at preset spatial locations; and obtain the first available candidate reference block in the preset order, where the first available candidate reference block is used as the spatial reference block.

When the candidate reference block and the to-be-processed picture block are in a same picture region, and the candidate reference block is coded based on the affine motion model, the candidate reference block is determined to be available.

In a possible embodiment, the candidate reference blocks at the preset spatial locations include a directly top neighboring picture block, a directly left neighboring picture block, a top-right neighboring picture block, a bottom-left neighboring picture block, and a top-left neighboring picture block of the to-be-processed picture block.

The reference block obtaining module 1001 is specifically configured to successively check the availability of the candidate reference blocks in the following order: the directly left neighboring picture block→the directly top neighboring picture block→the top-right neighboring picture block→the bottom-left neighboring picture block→the top-left neighboring picture block, until the first available candidate reference block is determined.

In a possible embodiment, the subblock location of the spatial reference block or the to-be-processed picture block is a location of a top-left pixel in a subblock; a location of a geometric center of a subblock; or a location of a pixel closest to a geometric center in a subblock.

In a possible embodiment, a distance between two of the plurality of preset subblock locations is S, where S is 2 raised to the power of K, and K is a nonnegative integer.

In a possible embodiment, the affine motion model is a 4-parameter affine motion model, and the plurality of preset subblock locations include a first preset location (x4+M/2, y4+N/2) and a second preset location (x4+M/2+P, y4+N/2), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, K is a nonnegative integer, K is less than U, and U is the width of the spatial reference block.

In a possible embodiment, the affine motion model is a 4-parameter affine motion model, and the plurality of preset subblock locations include a first preset location (x4+M/2, y4+N/2) and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, Q is 2 raised to the power of R, R is a nonnegative integer, Q is less than V, and V is the height of the spatial reference block.

In a possible embodiment, the preset pixel locations include at least two of a top-left pixel location of the to-be-processed picture block, a top-right pixel location of the to-be-processed picture block, and a bottom-left pixel location of the to-be-processed picture block, and the first calculation module 1003 is specifically configured to obtain, through calculation according to the following formulas, the motion vectors corresponding to the preset pixel locations of the to-be-processed picture block:

$$\begin{cases} vx_0 = vx_4 + \frac{(vx_5 - vx_4)}{P} \times (x_0 - x_4 - M/2) - \\ \quad \frac{(vy_5 - vy_4)}{P} \times (y_0 - y_4 - N/2) \\ vy_0 = vy_4 + \frac{(vy_5 - vy_4)}{P} \times (x_0 - x_4 - M/2) + \\ \quad \frac{(vx_5 - vx_4)}{P} \times (y_0 - y_4 - N/2) \end{cases};$$

$$\begin{cases} vx_1 = vx_4 + \frac{(vx_5 - vx_4)}{P} \times (x_1 - x_4 - M/2) - \\ \quad \frac{(vy_5 - vy_4)}{P} \times (y_1 - y_4 - N/2) \\ vy_1 = vy_4 + \frac{(vy_5 - vy_4)}{P} \times (x_1 - x_4 - M/2) + \\ \quad \frac{(vx_5 - vx_4)}{P} \times (y_1 - y_4 - N/2) \end{cases}; \text{ and}$$

$$\begin{cases} vx_2 = vx_4 + \frac{(vx_5 - vx_4)}{P} \times (x_2 - x_4 - M/2) - \\ \quad \frac{(vy_5 - vy_4)}{P} \times (y_2 - y_4 - N/2) \\ vy_2 = vy_4 + \frac{(vy_5 - vy_4)}{P} \times (x_2 - x_4 - M/2) + \\ \quad \frac{(vx_5 - vx_4)}{P} \times (y_2 - y_4 - N/2) \end{cases}.$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

In a possible embodiment, the preset pixel locations include the top-left pixel location of the to-be-processed picture block and the top-right pixel location of the to-be-processed picture block, and the second calculation module 1004 is specifically configured to obtain, through calculation according to the following formula, the motion vectors corresponding to the plurality of subblock locations of the to-be-processed picture block:

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases}.$$

Herein, W is the width of the to-be-processed picture block, vx is a horizontal component of a motion vector corresponding to (x, y) in the plurality of subblock locations, and vy is a vertical component of the motion vector corresponding to (x, y) in the plurality of subblock locations.

In a possible embodiment, the affine motion model is a 6-parameter affine motion model, and the plurality of preset subblock locations include a first preset location (x4+M/2, y4+N/2), a second preset location (x4+M/2+P, y4+N/2), and a third preset location (x4+M/2, y4+N/2+Q), where x4 is a horizontal coordinate of a top-left pixel of the spatial reference block, y4 is a vertical coordinate of the top-left pixel of the spatial reference block, M is the subblock width, N is the subblock height, P is 2 raised to the power of K, Q is 2 raised to the power of R, K and R are nonnegative integers, P is less than U, Q is less than V, U is the width of the spatial reference block, and V is the height of the spatial reference block.

In a possible embodiment, the preset pixel locations include a top-left pixel location of the to-be-processed picture block, a top-right pixel location of the to-be-processed picture block, and a bottom-left pixel location of the to-be-processed picture block, and the first calculation module 1003 is specifically configured to obtain, through calculation according to the following formulas, the motion vectors corresponding to the preset pixel locations of the to-be-processed picture block:

$$\begin{cases} vx_0 = vx_4 + \dfrac{(vx_5 - vx_4)}{P} \times (x_0 - x_4 - M/2) - \\ \qquad \dfrac{(vx_6 - vx_4)}{Q} \times (y_0 - y_4 - N/2) \\ vy_0 = vy_4 + \dfrac{(vy_5 - vy_4)}{P} \times (x_0 - x_4 - M/2) + \\ \qquad \dfrac{(vy_6 - vy_4)}{Q} \times (y_0 - y_4 - N/2) \end{cases} ;$$

$$\begin{cases} vx_1 = vx_4 + \dfrac{(vx_5 - vx_4)}{P} \times (x_1 - x_4 - M/2) - \\ \qquad \dfrac{(vx_6 - vx_4)}{Q} \times (y_1 - y_4 - N/2) \\ vy_1 = vy_4 + \dfrac{(vy_5 - vy_4)}{P} \times (x_1 - x_4 - M/2) + \\ \qquad \dfrac{(vy_6 - vy_4)}{Q} \times (y_1 - y_4 - N/2) \end{cases} ; \text{ and}$$

$$\begin{cases} vx_2 = vx_4 + \dfrac{(vx_5 - vx_4)}{P} \times (x_2 - x_4 - M/2) - \\ \qquad \dfrac{(vx_6 - vx_4)}{Q} \times (y_2 - y_4 - N/2) \\ vy_2 = vy_4 + \dfrac{(vy_5 - vy_4)}{P} \times (x_2 - x_4 - M/2) + \\ \qquad \dfrac{(vy_6 - vy_4)}{Q} \times (y_2 - y_4 - N/2) \end{cases} .$$

Herein, $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $vx_6$ is a horizontal component of a motion vector corresponding to the third preset location, $vy_6$ is a vertical component of the motion vector corresponding to the third preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

In a possible embodiment, the second calculation module 1004 is specifically configured to obtain, through calculation according to the following formula, the motion vectors corresponding to the plurality of subblock locations of the to-be-processed picture block:

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} .$$

Herein, W is the width of the to-be-processed picture block, H is the height of the to-be-processed picture block, vx is a horizontal component of a motion vector corresponding to (x, y) in the plurality of subblock locations, and vy is a vertical component of the motion vector corresponding to (x, y) in the plurality of subblock locations.

In a possible embodiment, when a top boundary of the to-be-processed picture block coincides with a top boundary of a coding tree unit CTU including the to-be-processed picture block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the to-be-processed picture block.

In a possible embodiment, when a left boundary of the to-be-processed picture block coincides with a left boundary of a coding tree unit CTU including the to-be-processed picture block, and the spatial reference block is directly on the left of the to-be-processed picture block, on the top-left of the to-be-processed picture block, or on the bottom-left of the to-be-processed picture block, at least two of subblocks corresponding to the plurality of preset subblock locations are adjacent to the left boundary of the to-be-processed picture block.

In the foregoing embodiment of the present invention, the interpolated motion vectors corresponding to the plurality of subblock locations are separately used to predict a plurality of subblocks.

It should be noted that the reference block obtaining module 1001, the subblock determining module 1002, the first calculation module 1003, and the second calculation module 1004 may be used in an inter prediction process on an encoder side or a decoder side. Specifically, on the encoder side, the modules may be used in the inter prediction unit 244 in the prediction processing unit 260 of the encoder 20. On the decoder side, the modules may be used in the inter prediction unit 344 in the prediction processing unit 360 of the decoder 30.

It should be further noted that for specific implementation processes of the reference block obtaining module 1001, the subblock determining module 1002, the first calculation module 1003, and the second calculation module 1004, refer to detailed descriptions in the embodiments in FIG. 11, FIG. 12, and FIG. 14. For brevity of the specification, details are not described herein.

In one or more examples, the described functions may be implemented by hardware, software, firmware, or any combination thereof. If implemented by software, the functions may be stored in or transmitted over a computer-readable medium as one or more instructions or code and executed by a hardware-based processing unit. The computer-readable medium may include a computer-readable storage medium, which corresponds to a tangible medium such as a data storage medium or a communications medium. The communications medium includes, for example, according to a communications protocol, any medium that facilitates transmission of a computer program from one place to another. In this manner, the computer-readable medium may generally correspond to a non-transitory tangible computer-readable storage medium or a communications medium, for example, a signal or a carrier. The data storage medium may be any usable medium that can be accessed by one or more computers or one or more processors to retrieve instructions, code, and/or data structures for implementing the technologies described in the present invention. A computer program product may include a computer-readable medium.

By way of example but not limitation, such computer-readable storage medium may include a RAM, a ROM, an EEPROM, a CD-ROM or another optical disk memory, a magnetic disk memory or another magnetic storage device, a flash memory, or any other medium that can be used to store desired program code in a form of an instruction or a data structure and that can be accessed by a computer. In addition, any connection may be appropriately referred to as a computer-readable medium. For example, if instructions are transmitted from a website, a server, or another remote source by using a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in the definition of medium. However, it should be understood that the computer-readable storage medium and the data storage medium do not include connections, carriers, signals, or other transitory media, but actually mean non-transitory tangible storage media. As used in this specification, a disk and a disc include a compact disc (CD), a laser disc, an optical disc, a digital versatile disc (DVD), a floppy disk, and a Blu-ray disc. The disk usually reproduces data magnetically, but the disc reproduces data optically by using a laser. A combination of the foregoing items should also be included in a scope of the computer-readable medium.

In the foregoing embodiments, the descriptions in each embodiment have respective focuses. For a part that is not described in detail in an embodiment, refer to related descriptions in other embodiments.

What is claimed is:

1. A video data coding method based on an affine motion model, wherein the method is applied to a video data coding device, and the method comprises:
   obtaining one spatial reference block of a to-be-processed picture block;
   determining a plurality of preset subblock locations of the spatial reference block;
   obtaining motion vectors corresponding to preset pixel locations of the to-be-processed picture block that are extrapolated from motion vectors corresponding to the preset subblock locations of the spatial reference block;
   obtaining motion vectors corresponding to a plurality of subblock locations of the to-be-processed picture block that are interpolated from the motion vectors corresponding to the preset pixel locations of the to-be-processed picture block;
   performing motion compensation for a plurality of subblocks of the to-be-processed picture block based on the motion vectors corresponding to the plurality of subblock locations of the to-be-processed picture block, to obtain predicted pixel values of the plurality of subblocks of the to-be-processed picture block; and
   wherein the affine motion model is one of the following (a), (b) or (c):
   (a) a 4-parameter affine motion model, and the plurality of preset subblock locations comprise a first preset location (x4+M/2, Y4+N/2) and a second preset location (x4+M/2+P, Y4+N/2), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, K is a nonnegative integer, K is less than U, and U is a width of the spatial reference block;
   (b) a 4-parameter affine motion model, and the plurality of preset subblock locations comprise a first preset location (x4+M/2, Y4+N/2) and a third preset location (x4+M/2, Y4+N/2+Q), wherein x4 is a horizontal coordinate of a top-left pixel of the spatial reference block, y4 is a vertical coordinate of the top-left pixel of the spatial reference block, M is a subblock width, N is a subblock height, Q is 2 raised to the power of R, R is a nonnegative integer, Q is less than V, and V is a height of the spatial reference block: or
   (c) a 6-parameter affine motion model, and the plurality of preset subblock locations comprise a first preset location (x4+M/2, Y4+N/2), a second preset location (x4+M/2+P, Y4+N/2), and a third preset location (x4+M/2, Y4+N/2+Q), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, is 2 raised to the power of R, K and R are nonnegative integers, P is less than U, Q is less than V, U is a width of the spatial reference block, and V is a height of the spatial reference block.

2. The method according to claim 1, wherein the subblock location of the spatial reference block or the to-be-processed picture block is:
   a location of a top-left pixel in a subblock;
   a location of a geometric center of a subblock; or
   a location of a pixel closest to a geometric center in a subblock.

3. The method according to claim 1, wherein a distance between two of the plurality of preset subblock locations is S, wherein S is 2 raised to the power of K, and K is a nonnegative integer.

4. The method according to claim 1, wherein the affine motion model corresponds to 4-parameter affine motion model (a).

5. The method according to claim 1, wherein the affine motion model corresponds to 4-parameter affine motion model (b).

6. The method according to claim 4, wherein the preset pixel locations comprise at least two of a top-left pixel location of the to-be-processed picture block, a top-right pixel location of the to-be-processed picture block, and a bottom-left pixel location of the to-be-processed picture block, and
   wherein the obtaining the motion vectors corresponding to the preset pixel locations of the to-be-processed picture block comprises: obtaining, the motion vectors corresponding to the preset pixel locations of the to-be-processed picture block, through the following:

$$\begin{cases} vx_0 = vx_4 + \dfrac{(vx_5 - vx_4)}{P} \times (x_0 - x_4 - M/2) + \\ \qquad \dfrac{(vx_6 - vx_4)}{Q} \times (y_0 - y_4 - N/2) \\ vy_0 = vy_4 + \dfrac{(vy_5 - vy_4)}{P} \times (x_0 - x_4 - M/2) + \\ \qquad \dfrac{(vy_6 - vy_4)}{Q} \times (y_0 - y_4 - N/2) \end{cases};$$

$$\begin{cases} vx_1 = vx_4 + \dfrac{(vx_5 - vx_4)}{P} \times (x_1 - x_4 - M/2) + \\ \qquad \dfrac{(vx_6 - vx_4)}{Q} \times (y_1 - y_4 - N/2) \\ vy_1 = vy_4 + \dfrac{(vy_5 - vy_4)}{P} \times (x_1 - x_4 - M/2) + \\ \qquad \dfrac{(vy_6 - vy_4)}{Q} \times (y_1 - y_4 - N/2) \end{cases}; \text{ and}$$

$$\begin{cases} vx_2 = vx_4 + \dfrac{(vx_5 - vx_4)}{P} \times (x_2 - x_4 - M/2) + \\ \qquad \dfrac{(vx_6 - vx_4)}{Q} \times (y_2 - y_4 - N/2) \\ vy_2 = vy_4 + \dfrac{(vy_5 - vy_4)}{P} \times (x_2 - x_4 - M/2) + \\ \qquad \dfrac{(vy_6 - vy_4)}{Q} \times (y_2 - y_4 - N/2) \end{cases},$$

wherein $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of a motion vector corresponding to the first preset location, $vx_5$ is a horizontal component of a motion vector corresponding to the second preset location, $vy_5$ is a vertical component of the motion vector corresponding to the second preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

7. The method according to claim 6, wherein the preset pixel locations comprise the top-left pixel location of the to-be-processed picture block and the top-right pixel location of the to-be-processed picture block, and wherein the obtaining the motion vectors corresponding to a plurality of subblock locations of the to-be-processed picture block comprises: obtaining, the motion vectors corresponding to the plurality of subblock locations of the to-be-processed picture block, through the following:

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases},$$

wherein

W is a width of the to-be-processed picture block, vx is a horizontal component of a motion vector corresponding to (x, y) in the plurality of subblock locations, and vy is a vertical component of the motion vector corresponding to (x, y) in the plurality of subblock locations.

8. The method according to claim 1, wherein the affine motion model corresponds to the 6-parameter affine motion model (c).

9. The method according to claim 8, wherein the preset pixel locations comprise a top-len pixel location of the to-be-processed picture block, a top-right pixel location of the to-be-processed picture block, and a bottom-left pixel location of the to-be-processed picture block, and wherein the obtaining the motion vectors corresponding to preset pixel locations of the to-be-processed picture block comprises: obtaining, the motion vectors corresponding to the preset pixel locations of the to-be-processed picture block, through the following:

$$\begin{cases} vx_0 = vx_4 + \dfrac{(vx_5 - vx_4)}{P} \times (x_0 - x_4 - M/2) - \\ \qquad \dfrac{(vy_5 - vy_4)}{P} \times (y_0 - y_4 - N/2) \\ vy_0 = vy_4 + \dfrac{(vy_5 - vy_4)}{P} \times (x_0 - x_4 - M/2) + \\ \qquad \dfrac{(vx_5 - vx_4)}{P} \times (y_0 - y_4 - N/2) \end{cases};$$

$$\begin{cases} vx_1 = vx_4 + \dfrac{(vx_5 - vx_4)}{P} \times (x_1 - x_4 - M/2) - \\ \qquad \dfrac{(vy_5 - vy_4)}{P} \times (y_1 - y_4 - N/2) \\ vy_1 = vy_4 + \dfrac{(vy_5 - vy_4)}{P} \times (x_1 - x_4 - M/2) + \\ \qquad \dfrac{(vx_5 - vx_4)}{P} \times (y_1 - y_4 - N/2) \end{cases}; \text{ and}$$

$$\begin{cases} vx_2 = vx_4 + \dfrac{(vx_5 - vx_4)}{P} \times (x_2 - x_4 - M/2) - \\ \qquad \dfrac{(vy_5 - vy_4)}{P} \times (y_2 - y_4 - N/2) \\ vy_2 = vy_4 + \dfrac{(vy_5 - vy_4)}{P} \times (x_2 - x_4 - M/2) + \\ \qquad \dfrac{(vx_5 - vx_4)}{P} \times (y_2 - y_4 - N/2) \end{cases},$$

Wherein $vx_0$ is a horizontal component of a motion vector corresponding to the top-left pixel location of the to-be-processed picture block, $vy_0$ is a vertical component of the motion vector corresponding to the top-left pixel location of the to-be-processed picture block, $vx_1$ is a horizontal component of a motion vector corresponding to the top-right pixel location of the to-be-processed picture block, $vy_1$ is a vertical component of the motion vector corresponding to the top-right pixel location of the to-be-processed picture block, $vx_2$ is a horizontal component of a motion vector corresponding to the bottom-left pixel location of the to-be-processed picture block, $vy_2$ is a vertical component of the motion vector corresponding to the bottom-left pixel location of the to-be-processed picture block, $vx_4$ is a horizontal component of a motion vector corresponding to the first preset location, $vy_4$ is a vertical component of the motion vector corresponding to the first preset location, $vx_5$ is a horizontal component of a motion vector corresponding to the second preset location, $vy_5$ is a vertical component of the motion vector corresponding to the second preset location, $vx_6$ is a horizontal component of a motion vector corresponding to the third preset location, $vy_6$ is a vertical component of the motion vector corresponding to the third preset location, $x_0$ is a horizontal coordinate of the top-left pixel location of the to-be-processed picture block, $y_0$ is a vertical coordinate of the top-left pixel location of the to-be-processed picture block, $x_1$ is a horizontal coordinate of the top-right pixel location of the to-be-processed picture block, $y_1$ is a vertical coordinate of the top-right pixel location of the to-be-processed picture block, $x_2$ is a horizontal coordinate of the bottom-left pixel location of the to-be-processed picture block, and $y_2$ is a vertical coordinate of the bottom-left pixel location of the to-be-processed picture block.

10. The method according to claim 9, wherein the obtaining the motion vectors corresponding to the plurality of subblock locations of the to-be-processed picture block comprises:

obtaining, the motion vectors corresponding to the plurality of subblock locations of the to-be-processed picture block, through the following:

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases},$$

wherein

W is a width of the to-be-processed picture block, H is a height of the to-be-processed picture block, vx is a horizontal component of a motion vector corresponding to (x, y) in the plurality of subblock locations, and vy is a vertical component of the motion vector corresponding to (x, y) in the plurality of subblock locations.

11. The method according to claim 1, wherein in response to a top boundary of the to-be-processed picture block coinciding with a top boundary of a coding tree unit (CTU) comprising the to-be-processed picture block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the to-be-processed picture block.

12. The method according to claim 1, wherein in response to a left boundary of the to-be-processed picture block coinciding with a left boundary of a coding tree unit (CTU) comprising the to-be-processed picture block, and the spatial reference block is directly on the left of the to-be-processed picture block, on the top-left of the to-be-processed picture block, or on the bottom-left of the to-be-processed picture block, at least two of subblocks corresponding to the plurality of preset subblock locations are adjacent to the left boundary of the to-be-processed picture block.

13. A video data coding device comprising:

a non-transitory memory storage, configured to store video data in a form of a bitstream; and a video coder coupled to the memory storage, and configured for:

obtaining one spatial reference block of a to-be-processed picture block in the video data;

determining a plurality of preset subblock locations of the spatial reference block;

obtaining motion vectors corresponding to preset pixel locations of the to-be-processed picture block that are extrapolated from motion vectors corresponding to the preset subblock locations of the spatial reference block;

obtaining motion vectors corresponding to a plurality of subblock locations of the to-be-processed picture block that are interpolated from the motion vectors corresponding to the preset pixel locations of the to-be-processed picture block;

performing motion compensation for a plurality of subblocks of the to-be-processed picture block based on the motion vectors corresponding to the plurality of subblock locations of the to-be-processed picture block, to obtain predicted pixel values of the plurality of subblocks of the to-be-processed picture block; and wherein the affine motion model is one of the following (a), (b) or (c):

(a) a 4-parameter affine motion model, and the plurality of preset subblock locations comprise a first preset location (x4+M/2, Y4+N/2) and a second preset location (x4+M/2+P, Y4+N/2), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, K is a nonnegative integer, K is less than U, and U is a width of the spatial reference block;

(b) a 4-parameter affine motion model, and the plurality of preset subblock locations comprise a first preset location (x4+M/2, y4+N/2) and a third preset location (x4+M/2, Y4+N/2+Q), wherein x4 is a horizontal coordinate of a top-left pixel of the spatial reference block, y4 is a vertical coordinate of the top-left pixel of the spatial reference block, M is a subblock width, N is a subblock height, Q is 2 raised to the power of R, R is a nonnegative integer, Q is less than V, and V is a height of the spatial reference block: or (c) a 6-parameter affine motion model, and the plurality of preset subblock locations comprise a first preset location (x4+M/2, y4+N/2), a second preset location (x4+

M/2+P, Y4+N/2), and a third preset location (x4+M/2, Y4+N/2+Q), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, Q is 2 raised to the power of R, K and R are nonnegative integers, P is less than U, Q is less than V, U is a width of the spatial reference block, and V is a height of the spatial reference block.

14. The device according to claim 13, wherein the subblock location of the spatial reference block or the to-be-processed picture block is:
a location of a top-left pixel in a subblock;
a location of a geometric center of a subblock; or
a location of a pixel closest to a geometric center in a subblock.

15. The device according to claim 13, wherein a distance between two of the plurality of preset subblock locations is S, wherein S is 2 raised to the power of K, and K is a nonnegative integer.

16. The device according to claim 13, wherein the affine motion model corresponds to 4-parameter affine motion model (a).

17. The device according to claim 13, wherein the affine motion model corresponds to 4-parameter affine motion model (b).

18. The device according to claim 16, wherein the preset pixel locations comprise at least two of a top-left pixel location of the to-be-processed picture block, a top-right pixel location of the to-be-processed picture block, and a bottom-left pixel location of the to-be-processed picture block, and
wherein the obtaining the motion vectors corresponding to the preset pixel locations of the to-be-processed picture block comprises: obtaining, the motion vectors corresponding to the preset pixel locations of the to-be-processed picture block, through the following:

$$\begin{cases} vx_0 = vx_4 + \frac{(vx_5 - vx_4)}{P} \times (x_0 - x_4 - M/2) + \\ \frac{(vx_6 - vx_4)}{Q} \times (y_0 - y_4 - N/2) \\ vy_0 = vy_4 + \frac{(vy_5 - vy_4)}{P} \times (x_0 - x_4 - M/2) + \\ \frac{(vy_6 - vy_4)}{Q} \times (y_0 - y_4 - N/2) \end{cases};$$

$$\begin{cases} vx_1 = vx_4 + \frac{(vx_5 - vx_4)}{P} \times (x_1 - x_4 - M/2) + \\ \frac{(vx_6 - vx_4)}{Q} \times (y_1 - y_4 - N/2) \\ vy_1 = vy_4 + \frac{(vy_5 - vy_4)}{P} \times (x_1 - x_4 - M/2) + \\ \frac{(vy_6 - vy_4)}{Q} \times (y_1 - y_4 - N/2) \end{cases}; \text{ and}$$

$$\begin{cases} vx_2 = vx_4 + \frac{(vx_5 - vx_4)}{P} \times (x_2 - x_4 - M/2) + \\ \frac{(vx_6 - vx_4)}{Q} \times (y_2 - y_4 - N/2) \\ vy_2 = vy_4 + \frac{(vy_5 - vy_4)}{P} \times (x_2 - x_4 - M/2) + \\ \frac{(vy_6 - vy_4)}{Q} \times (y_2 - y_4 - N/2) \end{cases},$$

wherein
$vx_0$ is a horizontal component of a motion vector corresponding to the top-left pixel location of the to-be-processed picture block,
$vy_0$ is a vertical component of the motion vector corresponding to the top-left pixel location of the to-be-processed picture block,
$vx_1$ is a horizontal component of a motion vector corresponding to the top-right pixel location of the to-be-processed picture block,
$vy_1$ is a vertical component of the motion vector corresponding to the top-right pixel location of the to-be-processed picture block,
$vx_2$ is a horizontal component of a motion vector corresponding to the bottom-left pixel location of the to-be-processed picture block,
$vy_2$ is a vertical component of the motion vector corresponding to the bottom-left pixel location of the to-be-processed picture block,
$vx_4$ is a horizontal component of a motion vector corresponding to the first preset location,
$vy_4$ is a vertical component of the motion vector corresponding to the first preset location,
$vx_5$ is a horizontal component of a motion vector corresponding to the second preset location,
$vy_5$ is a vertical component of the motion vector corresponding to the second preset location,
$x_0$ is a horizontal coordinate of the top-left pixel location of the to-be-processed picture block,
$y_0$ is a vertical coordinate of the top-left pixel location of the to-be-processed picture block,
$x_1$ is a horizontal coordinate of the top-right pixel location of the to-be-processed picture block,
$y_1$ is a vertical coordinate of the top-right pixel location of the to-be-processed picture block,
$x_2$ is a horizontal coordinate of the bottom-left pixel location of the to-be-processed picture block, and
$y_2$ is a vertical coordinate of the bottom-left pixel location of the to-be-processed picture block.

19. The device according to claim 18, wherein the preset pixel locations comprise the top-left pixel location of the to-be-processed picture block and the top-right pixel location of the to-be-processed picture block, and
wherein the obtaining the motion vectors corresponding to the plurality of subblock locations of the to-be-processed picture block comprises:
obtaining, the motion vectors corresponding to the plurality of subblock locations of the to-be-processed picture block, through the following:

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases},$$

wherein
W is a width of the to-be-processed picture block, vx is a horizontal component of a motion vector corresponding to (x, y) in the plurality of subblock locations, and vy is a vertical component of the motion vector corresponding to (x, y) in the plurality of subblock locations.

20. The device according to claim 13, wherein the affine motion model corresponds to 6-parameter affine motion model (c).

21. The device according to claim 20, wherein the preset pixel locations comprise a top-left pixel location of the to-be-processed picture block, a top-right pixel location of the to-be-processed picture block, and a bottom-left pixel location of the to-be-processed picture block, and
wherein the obtaining the motion vectors corresponding to the preset pixel locations of the to-be-processed picture block comprises: obtaining, the motion vectors corresponding to the preset pixel locations of the to-be-processed picture block, through the following:

$$\begin{cases} vx_0 = vx_4 + \frac{(vx_5 - vx_4)}{P} \times (x_0 - x_4 - M/2) - \\ \qquad \frac{(vy_5 - vy_4)}{P} \times (y_0 - y_4 - N/2) \\ vy_0 = vy_4 + \frac{(vy_5 - vy_4)}{P} \times (x_0 - x_4 - M/2) + \\ \qquad \frac{(vx_5 - vx_4)}{P} \times (y_0 - y_4 - N/2) \end{cases};$$

$$\begin{cases} vx_1 = vx_4 + \frac{(vx_5 - vx_4)}{P} \times (x_1 - x_4 - M/2) - \\ \qquad \frac{(vy_5 - vy_4)}{P} \times (y_1 - y_4 - N/2) \\ vy_1 = vy_4 + \frac{(vy_5 - vy_4)}{P} \times (x_1 - x_4 - M/2) + \\ \qquad \frac{(vx_5 - vx_4)}{P} \times (y_1 - y_4 - N/2) \end{cases}; \text{ and}$$

$$\begin{cases} vx_2 = vx_4 + \frac{(vx_5 - vx_4)}{P} \times (x_2 - x_4 - M/2) - \\ \qquad \frac{(vy_5 - vy_4)}{P} \times (y_2 - y_4 - N/2) \\ vy_2 = vy_4 + \frac{(vy_5 - vy_4)}{P} \times (x_2 - x_4 - M/2) + \\ \qquad \frac{(vx_5 - vx_4)}{P} \times (y_2 - y_4 - N/2) \end{cases},$$

and
wherein $vx_0$ is a horizontal component of a motion vector corresponding to the top-left pixel location of the to-be-processed picture block,
$vy_0$ is a vertical component of the motion vector corresponding to the top-left pixel location of the to-be-processed picture block,
$vx_1$ is a horizontal component of a motion vector corresponding to the top-right pixel location of the to-be-processed picture block,
$vy_1$ is a vertical component of the motion vector corresponding to the top-right pixel location of the to-be-processed picture block,
$vx_2$ is a horizontal component of a motion vector corresponding to the bottom-left pixel location of the to-be-processed picture block,
$vy_2$ is a vertical component of the motion vector corresponding to the bottom-left pixel location of the to-be-processed picture block,
$vx_4$ is a horizontal component of a motion vector corresponding to the first preset location,
$vy_4$ is a vertical component of the motion vector corresponding to the first preset location,
$vx_5$ is a horizontal component of a motion vector corresponding to the second preset location,
$vy_5$ is a vertical component of the motion vector corresponding to the second preset location,
$vx_6$ is a horizontal component of a motion vector corresponding to the third preset location,
$vy_6$ is a vertical component of the motion vector corresponding to the third preset location,
$x_0$ is a horizontal coordinate of the top-left pixel location of the to-be-processed picture block,
$y_0$ is a vertical coordinate of the top-left pixel location of the to-be-processed picture block,
$x_1$ is a horizontal coordinate of the top-right pixel location of the to-be-processed picture block,
$y_1$ is a vertical coordinate of the top-right pixel location of the to-be-processed picture block,
$x_2$ is a horizontal coordinate of the bottom-left pixel location of the to-be-processed picture block, and
$y_2$ is a vertical coordinate of the bottom-left pixel location of the to-be-processed picture block.

22. The device according to claim 21, wherein the video coder is configured for obtaining, the motion vectors corresponding to the plurality of subblock locations of the to-be-processed picture block, through the following:

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases}, \text{ wherein}$$

wherein
W is a width of the to-be-processed picture block, H is a height of the to-be-processed picture block, vx is a horizontal component of a motion vector corresponding to (x, y) in the plurality of subblock locations, and vy is a vertical component of the motion vector corresponding to (x, y) in the plurality of subblock locations.

23. The device according to claim 13, wherein in response to a top boundary of the to-be-processed picture block coinciding with a top boundary of a coding tree unit CTU comprising the to-be-processed picture block, and the spatial reference block is directly above the to-be-processed picture block, on the top-left of the to-be-processed picture block, or on the top-right of the to-be-processed picture block, at least two of subblocks corresponding to the plurality of preset subblock locations are adjacent to the top boundary of the to-be-processed picture block.

24. The device according to claim 13, wherein in response to a left boundary of the to-be-processed picture block coinciding with a left boundary of a coding tree unit CTU comprising the to-be-processed picture block, and the spatial reference block is directly on the left of the to-be-processed picture block, on the top-left of the to-be-processed picture block, or on the bottom-left of the to-be-processed picture block, at least two of subblocks corresponding to the plurality of preset subblock locations are adjacent to the left boundary of the to-be-processed picture block.

25. A non-transitory computer-readable medium having processor-executable instructions stored thereon which, when executed by a processor of a computer device, causes the computer device to perform operations including:
obtaining one spatial reference block of a to-be-processed picture block in the video data;
determining a plurality of preset subblock locations of the spatial reference block;
obtaining motion vectors corresponding to preset pixel locations of the to-be-processed picture block that are extrapolated from motion vectors corresponding to the preset subblock locations of the spatial reference block;

obtaining motion vectors corresponding to a plurality of subblock locations of the to-be-processed picture block that are interpolated from the motion vectors corresponding to the preset pixel locations of the to-be-processed picture block;

performing motion compensation for a plurality of subblocks of the to-be-processed picture block based on the motion vectors corresponding to the plurality of subblock locations of the to-be-processed picture block, to obtain predicted pixel values of the plurality of subblocks of the to-be-processed picture block; and wherein the affine motion model is one of the following (a), (b) or (c):

(d) 4-parameter affine motion model, and the plurality of preset subblock locations comprise a first preset location (x4+M/2, y4+N/2) and a second preset location (x4+M/2+P, y4+N/2), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, K is a nonnegative integer, K is less than U, and U is a width of the spatial reference block;

(e) a 4-parameter affine motion model, and the plurality of preset subblock locations comprise a first preset location (x4+M/2, Y4+N/2) and a third preset location (x4+M/2, Y4+N/2+Q), wherein x4 is a horizontal coordinate of a top-left pixel of the spatial reference block, y4 is a vertical coordinate of the top-left pixel of the spatial reference block, M is a subblock width, N is a subblock height, Q is 2 raised to the power of R, R is a nonnegative integer, Q is less than V, and V is a height of the spatial reference block: or a 6-parameter affine motion model, and the plurality of preset subblock locations comprise a first preset location (x4+M/2, Y4+N/2), a second preset location (x4+M/2+P, y4+N/2), and a third preset location (x4+M/2, y4+N/2+Q), wherein x4 is a horizontal coordinate of a top-left pixel of the spatial reference block, y4 is a vertical coordinate of the top-left pixel of the spatial reference block, M is a subblock width, N is a subblock height, P is 2 raised to the power of K, Q is 2 raised to the power of R, K and R are nonnegative integers, P is less than U, Q is less than V, U is a width of the spatial reference block, and V is a height of the spatial reference block.

* * * * *

UNITED STATES PATENT AND TRADEMARK OFFICE
CERTIFICATE OF CORRECTION

PATENT NO. : 11,539,975 B2
APPLICATION NO. : 17/196642
DATED : December 27, 2022
INVENTOR(S) : Chen et al.

It is certified that error appears in the above-identified patent and that said Letters Patent is hereby corrected as shown below:

In the Claims

Claim 1: Column 76, Lines 7-8: "tion (x4+M/2, Y4+N/2) and a second preset location (x4+M/2+P, Y4+N/2), wherein x4 is a horizontal coor-" should read -- tion (x4+M/2, y4+N/2) and a second preset location (x4+M/2+P, y4+N/2), wherein x4 is a horizontal coor- --

Claim 1: Column 76, Lines 18-19: "tion (x4+M/2, Y4+N/2) and a third preset location (x4+M/2, Y4+N/2+Q), wherein x4 is a horizontal coor-" should read -- tion (x4+M/2, y4+N/2) and a third preset location (x4+M/2, y4+N/2+Q), wherein x4 is a horizontal coor- --

Claim 1: Column 76, Lines 28-30: "tion (x4+M/2, Y4+N/2), a second preset location (x4+M/2+P, Y4+N/2), and a third preset location (x4+M/2, Y4+N/2+Q), wherein x4 is a horizontal coordinate of a" should read -- tion (x4+M/2, y4+N/2), a second preset location (x4+M/2+P, y4+N/2), and a third preset location (x4+M/2, y4+N/2+Q), wherein x4 is a horizontal coordinate of a --

Claim 6: Column 77, Lines 1-28: the left-hand formula should appear as follows:

$$\begin{cases} vx_0 = vx_4 + \frac{(vx_5-vx_4)}{P} \times (x_0 - x_4 - M/2) - \frac{(vy_5-vy_4)}{P} \times (y_0 - y_4 - N/2) \\ vy_0 = vy_4 + \frac{(vy_5-vy_4)}{P} \times (x_0 - x_4 - M/2) + \frac{(vx_5-vx_4)}{P} \times (y_0 - y_4 - N/2) \end{cases},$$

$$\begin{cases} vx_1 = vx_4 + \frac{(vx_5-vx_4)}{P} \times (x_1 - x_4 - M/2) - \frac{(vy_5-vy_4)}{P} \times (y_1 - y_4 - N/2) \\ vy_1 = vy_4 + \frac{(vy_5-vy_4)}{P} \times (x_1 - x_4 - M/2) + \frac{(vx_5-vx_4)}{P} \times (y_1 - y_4 - N/2) \end{cases}; \text{ and}$$

$$\begin{cases} vx_2 = vx_4 + \frac{(vx_5-vx_4)}{P} \times (x_2 - x_4 - M/2) - \frac{(vy_5-vy_4)}{P} \times (y_2 - y_4 - N/2) \\ vy_2 = vy_4 + \frac{(vy_5-vy_4)}{P} \times (x_2 - x_4 - M/2) + \frac{(vx_5-vx_4)}{P} \times (y_2 - y_4 - N/2) \end{cases},$$

Signed and Sealed this
Thirteenth Day of June, 2023

*Katherine Kelly Vidal*
*Director of the United States Patent and Trademark Office*

Claim 7: Column 78, Lines 15-18: the right-hand formula should appear as follows:
$$\begin{cases} vx = \frac{vx_1 - vx_0}{W} x - \frac{vy_1 - vy_0}{W} y + vx_0 \\ vy = \frac{vy_1 - vy_0}{W} x + \frac{vx_1 - vx_0}{W} y + vy_0 \end{cases},$$

Claim 9: Column 78, Line 29: "pixel locations comprise a top-len pixel location of the" should read -- pixel locations comprise a top-left pixel location of the --

Claim 9: Column 78, Lines 40-65: the right-hand formula should appear as follows:
$$\begin{cases} vx_0 = vx_4 + \frac{(vx_5 - vx_4)}{P} \times (x_0 - x_4 - M/2) + \frac{(vx_6 - vx_4)}{Q} \times (y_0 - y_4 - N/2) \\ vy_0 = vy_4 + \frac{(vy_5 - vy_4)}{P} \times (x_0 - x_4 - M/2) + \frac{(vy_6 - vy_4)}{Q} \times (y_0 - y_4 - N/2) \end{cases},$$

$$\begin{cases} vx_1 = vx_4 + \frac{(vx_5 - vx_4)}{P} \times (x_1 - x_4 - M/2) + \frac{(vx_6 - vx_4)}{Q} \times (y_1 - y_4 - N/2) \\ vy_1 = vy_4 + \frac{(vy_5 - vy_4)}{P} \times (x_1 - x_4 - M/2) + \frac{(vy_6 - vy_4)}{Q} \times (y_1 - y_4 - N/2) \end{cases}; \text{ and}$$

$$\begin{cases} vx_2 = vx_4 + \frac{(vx_5 - vx_4)}{P} \times (x_2 - x_4 - M/2) + \frac{(vx_6 - vx_4)}{Q} \times (y_2 - y_4 - N/2) \\ vy_2 = vy_4 + \frac{(vy_5 - vy_4)}{P} \times (x_2 - x_4 - M/2) + \frac{(vy_6 - vy_4)}{Q} \times (y_2 - y_4 - N/2) \end{cases},$$

Claim 9: Column 79, Line 1: "Wherein" should read -- wherein --

Claim 10: Column 79, Lines 54-56: the left-hand formula should appear as follows:
$$\begin{cases} vx = \frac{vx_1 - vx_0}{W} x + \frac{vx_2 - vy_0}{H} y + vx_0 \\ vy = \frac{vy_1 - vy_0}{W} x + \frac{vy_2 - vx_0}{H} y + vy_0 \end{cases},$$

Claim 13: Column 80, Lines 47-48: "tion (x4+M/2, Y4+N/2) and a second preset location (x4+M/2+P, Y4+N/2), wherein x4 is a horizontal coor-" should read -- tion (x4+M/2, y4+N/2) and a second preset location (x4+M/2+P, y4+N/2), wherein x4 is a horizontal coor- --

Claim 13: Column 80, Line 58: "(x4+M/2, Y4+N/2+Q), wherein x4 is a horizontal coor-" should read -- (x4+M/2, y4+N/2+Q), wherein x4 is a horizontal coor- --

Claim 13: Column 81, Lines 1-2: "M/2+P, Y4+N/2), and a third preset location (x4+M/2, Y4+N/2+Q), wherein x4 is a horizontal coordinate of a" should read -- tion (x4+M/2, y4+N/2), a second preset location (x4+M/2+P, y4+N/2), and a third preset location (x4+M/2, y4+N/2+Q), wherein x4 is a horizontal coordinate of a --

CERTIFICATE OF CORRECTION (continued)　　　　　　　　　　　　　　　　Page 3 of 4
U.S. Pat. No. 11,539,975 B2

Claim 18: Column 81, Lines 40-65: the left-hand formula should appear as follows:

$$\begin{cases} vx_0 = vx_4 + \frac{(vx_5-vx_4)}{P} \times (x_0 - x_4 - M/2) - \frac{(vy_5-vy_4)}{P} \times (y_0 - y_4 - N/2) \\ vy_0 = vy_4 + \frac{(vy_5-vy_4)}{P} \times (x_0 - x_4 - M/2) + \frac{(vx_5-vx_4)}{P} \times (y_0 - y_4 - N/2) \end{cases};$$

$$\begin{cases} vx_1 = vx_4 + \frac{(vx_5-vx_4)}{P} \times (x_1 - x_4 - M/2) - \frac{(vy_5-vy_4)}{P} \times (y_1 - y_4 - N/2) \\ vy_1 = vy_4 + \frac{(vy_5-vy_4)}{P} \times (x_1 - x_4 - M/2) + \frac{(vx_5-vx_4)}{P} \times (y_1 - y_4 - N/2) \end{cases}; \text{and}$$

$$\begin{cases} vx_2 = vx_4 + \frac{(vx_5-vx_4)}{P} \times (x_2 - x_4 - M/2) - \frac{(vy_5-vy_4)}{P} \times (y_2 - y_4 - N/2) \\ vy_2 = vy_4 + \frac{(vy_5-vy_4)}{P} \times (x_2 - x_4 - M/2) + \frac{(vx_5-vx_4)}{P} \times (y_2 - y_4 - N/2) \end{cases},$$

Claim 19: Column 82, Lines 54-56: the right-hand formula should appear as follows:

$$\begin{cases} vx = \frac{vx_1-vx_0}{W}x - \frac{vy_1-vy_0}{W}y + vx_0 \\ vy = \frac{vy_1-vy_0}{W}x + \frac{vx_1-vx_0}{W}y + vy_0 \end{cases},$$

Claim 21: Column 83, Lines 14-38: the left-hand formula should appear as follows:

$$\begin{cases} vx_0 = vx_4 + \frac{(vx_5-vx_4)}{P} \times (x_0 - x_4 - M/2) + \frac{(vx_6-vx_4)}{Q} \times (y_0 - y_4 - N/2) \\ vy_0 = vy_4 + \frac{(vy_5-vy_4)}{P} \times (x_0 - x_4 - M/2) + \frac{(vy_6-vy_4)}{Q} \times (y_0 - y_4 - N/2) \end{cases};$$

$$\begin{cases} vx_1 = vx_4 + \frac{(vx_5-vx_4)}{P} \times (x_1 - x_4 - M/2) + \frac{(vx_6-vx_4)}{Q} \times (y_1 - y_4 - N/2) \\ vy_1 = vy_4 + \frac{(vy_5-vy_4)}{P} \times (x_1 - x_4 - M/2) + \frac{(vy_6-vy_4)}{Q} \times (y_1 - y_4 - N/2) \end{cases}; \text{and}$$

$$\begin{cases} vx_2 = vx_4 + \frac{(vx_5-vx_4)}{P} \times (x_2 - x_4 - M/2) + \frac{(vx_6-vx_4)}{Q} \times (y_2 - y_4 - N/2) \\ vy_2 = vy_4 + \frac{(vy_5-vy_4)}{P} \times (x_2 - x_4 - M/2) + \frac{(vy_6-vy_4)}{Q} \times (y_2 - y_4 - N/2) \end{cases},$$

Claim 21: Column 83, Line 41: "and" should be deleted

Claim 22: Column 84, Lines 24-26: the right-hand formula should appear as follows:

$$\begin{cases} vx = \frac{vx_1-vx_0}{W}x + \frac{vx_2-vy_0}{H}y + vx_0 \\ vy = \frac{vy_1-vy_0}{W}x + \frac{vy_2-vx_0}{H}y + vy_0 \end{cases}, \text{wherein}$$

Claim 22: Column 84, Line 29: "wherein" should be deleted

Claim 25: Column 85, Line 14: "(d) 4-parameter affine motion model, and the plurality of" should read -- (a) a 4-parameter affine motion model, and the plurality of --

Claim 25: Column 86, Line 1: "(e) a 4-parameter affine motion model, and the plurality of" should read -- (b) a 4-parameter affine motion model, and the plurality of --

CERTIFICATE OF CORRECTION (continued)
U.S. Pat. No. 11,539,975 B2

Claim 25: Column 86, Lines 3-4: "tion (x4+M/2, Y4+N/2) and a third preset location (x4+M/2, Y4+N/2+Q), wherein x4 is a horizontal coor-" should read -- tion (x4+M/2, y4+N/2) and a third preset location (x4+M/2, y4+N/2+Q), wherein x4 is a horizontal coor- --

Claim 25: Column 86, Line 11: "a 6-parameter affine motion model, and the plurality of" should read -- (c) a 6-parameter affine motion model, and the plurality of --

Claim 25: Column 86, Line 13: "tion (x4+M/2, Y4+N/2), a second preset location (x4+" should read -- tion (x4+M/2, y4+N/2), a second preset location (x4+ --